US007358948B2

(12) United States Patent
Shiomi et al.

(10) Patent No.: US 7,358,948 B2
(45) Date of Patent: Apr. 15, 2008

(54) DRIVING METHOD OF LIQUID CRYSTAL DISPLAY APPARATUS, DRIVING APPARATUS OF LIQUID CRYSTAL DISPLAY APPARATUS, AND PROGRAM THEREOF

(75) Inventors: Makoto Shiomi, Tenri (JP); Kazunari Tomizawa, Kyoto (JP); Koichi Miyachi, Kyoto (JP); Tomoo Furukawa, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 771 days.

(21) Appl. No.: 10/804,027

(22) Filed: Mar. 19, 2004

(65) Prior Publication Data

US 2005/0024310 A1 Feb. 3, 2005

(30) Foreign Application Priority Data

Mar. 19, 2003 (JP) ............................ 2003-075992

(51) Int. Cl.
*G09G 3/36* (2006.01)
*G09G 5/00* (2006.01)
*G06F 3/038* (2006.01)

(52) U.S. Cl. ............................ 345/89; 345/87; 345/94; 345/95; 345/96; 345/98; 345/208; 345/209; 345/210

(58) Field of Classification Search .................. 345/89
See application file for complete search history.

(56) References Cited

U.S. PATENT DOCUMENTS 6,661,488 B1 12/2003 Takeda et al.
6,791,525 B2 * 9/2004 Matsumura et al. ........ 345/100
6,833,886 B2 12/2004 Suzuki et al.
6,853,384 B2 2/2005 Miyata et al.
6,952,192 B2 10/2005 Ohmuro et al.
6,977,636 B2 12/2005 Jinda et al.
7,038,647 B2 5/2006 Shigeta et al.

(Continued)

FOREIGN PATENT DOCUMENTS

JP 2650479 5/1997

(Continued)

OTHER PUBLICATIONS

European Search Report for Corresponding European Application.

*Primary Examiner*—Sumati Lefkowitz
*Assistant Examiner*—Alexander S. Beck
(74) *Attorney, Agent, or Firm*—Harness, Dickey & Pierce

(57) ABSTRACT

A liquid crystal display apparatus includes a plurality of areas in which response speeds greatly different from each other coexist in a pixel. A first replacement process section replaces the image data of the desired target frame with a first gradation, when a gradation transition from a current frame to a desired target frame corresponds to the above gradation transition. A second replacement process section replaces the image data of the current frame with a second value. The first value is set to a value causing the pixel to respond at a relatively higher speed without the occurrence of the excessive brightness. Without avoiding the deterioration of the image, it is possible to drive a liquid crystal display apparatus including areas whose response speeds are different from each other coexist in the pixel, such as a liquid crystal display apparatus of vertically aligned mode and normally black mode.

6 Claims, 26 Drawing Sheets

U.S. PATENT DOCUMENTS

| | | | |
|---|---|---|---|
| 7,190,340 | B2 | 3/2007 | Sugino |
| 2001/0033353 | A1 | 10/2001 | Shimoshikiryo |
| 2001/0040546 | A1 | 11/2001 | Ohmuro et al. |
| 2002/0075436 | A1 | 6/2002 | Kubo et al. |
| 2003/0001810 | A1 | 1/2003 | Yamaguchi et al. |
| 2004/0041770 | A1 | 3/2004 | Kubo et al. |
| 2005/0041186 | A1 | 2/2005 | Shimoshikiryo |

FOREIGN PATENT DOCUMENTS

| | | |
|---|---|---|
| JP | 2002-202511 | 7/2002 |

* cited by examiner

FIG. 11

| CURRENT FRAME GRADATION \ DESIRED TARGET GRADATION | 0 | 16 | 32 | 48 | 64 | 80 | 96 | 112 | 128 | 160 | 192 | 224 | 255 |
|---|---|---|---|---|---|---|---|---|---|---|---|---|---|
| 0 | 0 | 22 | 75 | 131 | 154 | 173 | 185 | 194 | 199 | 214 | 226 | 244 | 255 |
| 16 | 0 | 16 | 58 | 114 | 143 | 161 | 174 | 185 | 193 | - | - | - | - |
| 32 | 0 | 4 | 32 | 77 | 114 | 138 | 152 | 164 | 175 | 201 | 217 | 241 | 255 |
| 48 | 0 | 0 | 18 | 48 | 81 | 113 | 134 | 148 | 160 | - | - | - | - |
| 64 | 0 | 0 | 10 | 33 | 64 | 93 | 121 | 137 | 150 | 189 | 210 | 239 | 255 |
| 80 | 0 | 0 | 4 | 26 | 51 | 80 | 106 | 129 | 143 | - | - | - | - |
| 96 | 0 | 0 | 0 | 20 | 42 | 70 | 96 | 120 | 137 | 178 | 205 | 236 | 255 |
| 112 | 0 | 0 | 0 | 17 | 35 | 63 | 88 | 112 | 132 | - | - | - | - |
| 128 | 0 | 0 | 0 | 13 | 31 | 56 | 81 | 105 | 128 | 170 | 201 | 234 | 255 |
| 160 | 0 | - | 0 | - | 22 | - | 63 | - | 108 | 160 | 196 | 231 | 255 |
| 192 | 0 | - | 0 | - | 14 | - | 49 | - | 93 | 152 | 192 | 228 | 255 |
| 224 | 0 | - | 0 | - | 8 | - | 34 | - | 72 | 141 | 183 | 224 | 255 |
| 255 | 0 | - | 0 | - | 0 | - | 23 | - | 53 | 127 | 174 | 220 | 255 |

FIG. 12

| CURRENT FRAME GRADATION \ DESIRED TARGET GRADATION | 0 | 16 | 32 | 48 | 64 | 80 | 96 | 112 | 128 | 160 | 192 | 224 | 255 |
|---|---|---|---|---|---|---|---|---|---|---|---|---|---|
| 0 | 0 | 25 | 88 | 144 | 170 | 189 | 198 | 205 | 210 | 223 | 233 | 247 | 255 |
| 16 | 0 | 16 | 67 | 130 | 156 | 175 | 189 | 197 | 203 | — | — | — | — |
| 32 | 0 | 0 | 32 | 85 | 128 | 149 | 165 | 177 | 187 | 207 | 223 | 243 | 255 |
| 48 | 0 | 0 | 14 | 48 | 86 | 120 | 142 | 156 | 169 | — | — | — | — |
| 64 | 0 | 0 | 4 | 30 | 64 | 98 | 128 | 144 | 157 | 194 | 214 | 240 | 255 |
| 80 | 0 | 0 | 0 | 21 | 46 | 80 | 110 | 133 | 147 | — | — | — | — |
| 96 | 0 | 0 | 0 | 14 | 36 | 68 | 96 | 122 | 139 | 183 | 208 | 237 | 255 |
| 112 | 0 | 0 | 0 | 10 | 29 | 57 | 85 | 112 | 133 | — | — | — | — |
| 128 | 0 | 0 | 0 | 5 | 25 | 48 | 77 | 102 | 128 | 173 | 203 | 235 | 255 |
| 160 | 0 | — | 0 | — | 13 | — | 53 | — | 103 | 160 | 196 | 232 | 255 |
| 192 | 0 | — | 0 | — | 4 | — | 38 | — | 83 | 150 | 192 | 229 | 255 |
| 224 | 0 | — | 0 | — | 0 | — | 23 | — | 58 | 136 | 181 | 224 | 255 |
| 255 | 0 | — | 0 | — | 0 | — | 11 | — | 36 | 112 | 168 | 219 | 255 |

FIG. 13

| CURRENT FRAME GRADATION \ DESIRED TARGET GRADATION | 0 | 16 | 32 | 48 | 64 | 80 | 96 | 112 | 128 | 160 | 192 | 224 | 255 |
|---|---|---|---|---|---|---|---|---|---|---|---|---|---|
| 0 | 0 | 28 | 112 | 161 | 189 | 202 | 211 | 217 | 222 | 234 | 242 | 255 | 255 |
| 16 | 0 | 16 | 79 | 144 | 173 | 193 | 202 | 208 | 214 | - | - | - | - |
| 32 | 0 | 0 | 32 | 96 | 140 | 163 | 180 | 192 | 199 | 217 | 231 | 246 | 255 |
| 48 | 0 | 0 | 10 | 48 | 94 | 134 | 153 | 168 | 181 | - | - | - | - |
| 64 | 0 | 0 | 0 | 26 | 64 | 105 | 135 | 152 | 166 | 201 | 220 | 242 | 255 |
| 80 | 0 | 0 | 0 | 15 | 42 | 80 | 114 | 138 | 153 | - | - | - | - |
| 96 | 0 | 0 | 0 | 7 | 29 | 64 | 96 | 126 | 143 | 189 | 212 | 240 | 255 |
| 112 | 0 | 0 | 0 | 0 | 22 | 49 | 82 | 112 | 135 | - | - | - | - |
| 128 | 0 | 0 | 0 | 0 | 17 | 39 | 70 | 99 | 128 | 177 | 206 | 237 | 255 |
| 160 | 0 | - | 0 | - | 1 | - | 40 | - | 93 | 160 | 198 | 234 | 255 |
| 192 | 0 | - | 0 | - | 0 | - | 24 | - | 68 | 146 | 192 | 230 | 255 |
| 224 | 0 | - | 0 | - | 0 | - | 8 | - | 37 | 123 | 176 | 224 | 255 |
| 255 | 0 | - | 0 | - | 0 | - | 0 | - | 18 | 83 | 158 | 218 | 255 |

FIG. 14

| CURRENT FRAME GRADATION | DESIRED TARGET GRADATION | | | | | | | | | | | | |
|---|---|---|---|---|---|---|---|---|---|---|---|---|---|
| | 0 | 16 | 32 | 48 | 64 | 80 | 96 | 112 | 128 | 160 | 192 | 224 | 255 |
| 0 | 0 | 35 | 130 | 182 | 203 | 215 | 223 | 229 | 233 | 243 | 248 | 255 | 255 |
| 16 | 0 | 16 | 94 | 161 | 191 | 205 | 214 | 220 | 226 | – | – | – | – |
| 32 | 0 | 0 | 32 | 110 | 153 | 179 | 195 | 203 | 210 | 227 | 239 | 250 | 255 |
| 48 | 0 | 0 | 3 | 48 | 105 | 144 | 166 | 182 | 195 | – | – | – | – |
| 64 | 0 | 0 | 0 | 21 | 64 | 113 | 143 | 162 | 178 | 208 | 226 | 246 | 255 |
| 80 | 0 | 0 | 0 | 7 | 35 | 80 | 120 | 144 | 162 | – | – | – | – |
| 96 | 0 | 0 | 0 | 0 | 22 | 57 | 96 | 130 | 149 | 196 | 218 | 243 | 255 |
| 112 | 0 | 0 | 0 | 0 | 13 | 40 | 77 | 112 | 138 | – | – | – | – |
| 128 | 0 | 0 | 0 | 0 | 6 | 29 | 61 | 94 | 128 | 182 | 211 | 240 | 255 |
| 160 | 0 | – | 0 | – | 0 | – | 26 | – | 82 | 160 | 201 | 236 | 255 |
| 192 | 0 | – | 0 | – | 0 | – | 10 | – | 47 | 140 | 192 | 231 | 255 |
| 224 | 0 | – | 0 | – | 0 | – | 0 | – | 18 | 98 | 170 | 224 | 255 |
| 255 | 0 | – | 0 | – | 0 | – | 0 | – | 0 | 44 | 142 | 216 | 255 |

DRIVING METHOD OF LIQUID CRYSTAL DISPLAY APPARATUS, DRIVING APPARATUS OF LIQUID CRYSTAL DISPLAY APPARATUS, AND PROGRAM THEREOF

This nonprovisional application claims priority under 35 U.S.C. §119(a) on patent application No. 2003-75992 filed in Japan on Mar. 19, 2003, the entire contents of which are hereby incorporated by reference.

FIELD OF THE INVENTION

The present invention generally relates to (i) a driving method of a liquid crystal display apparatus. Preferably, it relates to one in which areas whose response speeds are different from each other coexist in a liquid crystal cell. Such a liquid crystal display apparatus may include a liquid crystal display apparatus for driving, based on a normally black mode, including liquid crystal cells of a vertically aligned mode. It further may relate to a driving apparatus of the liquid crystal display apparatus. In addition, it may relate to a program for driving the liquid crystal display apparatus.

BACKGROUND OF THE INVENTION

Liquid crystal display apparatuses have been widely used in the art as a screen for a word processor or a computer. Recently, such liquid crystal display apparatuses have rapidly become popular for a screen of a TV.

Most of the liquid crystal display apparatuses adopt a TN (Twisted Nematic) mode. When being obliquely viewed, the liquid crystal display apparatuses have problems of easy reduction of contrast and easy reversal of a gradation characteristic, respectively.

In view of the circumstances, a liquid crystal display apparatus of a VA (Vertically Aligned) mode has recently attract attention. A liquid crystal cell of the liquid crystal display apparatus of the VA mode is configured such that a nematic liquid crystal having a negative dielectric anisotropy property and a vertically aligned layer are combined. Note that a liquid crystal display apparatus having such a configuration is disclosed in FIG. 1 and FIG. 2 of Japanese patent unexamined patent publication No. 2002-202511 or in FIG. 38, FIG. 42, and FIG. 44 of Japanese patent examined patent publication No. 2947350.

When no voltage is supplied, liquid crystal molecules of a liquid crystal cell in the liquid crystal display apparatus align vertically with respect to a surface of a substrate in accordance with control force derived from the vertically aligned layer. In contrast, when a voltage is supplied, the liquid crystal molecules align obliquely in accordance with an electric field formed obliquely with respect to the surface of the substrate. This causes the light passing through the liquid crystal cell to have a retardation (a phase contrast) that varies depending on the supplied voltage.

Note that absorption axes of polarization plates provided on both sides of the liquid crystal cell are disposed so as to be orthogonal to each other. The light incident on the polarization plate on an outgoing light side becomes elliptically polarized light that varies depending on a retardation caused by the liquid crystal cell, accordingly. On this account, one part of the incident light passes through the polarization plate. This allows the outgoing light from the polarization plate to be controlled in accordance with the supplied voltage, thereby enabling to carry out the gradation display.

According to the configuration, when no voltage is supplied, since the liquid crystal molecules in the vicinity of the alignment layer are almost vertically aligned, it is possible to bring a marked improvement in contrast and also possible to bring a superiority in viewing angle property.

Meanwhile, a liquid crystal display apparatus, in general, has a slower response speed than a CRT (Cathode-Ray Tube) or other display device. A response sometimes is not completed, because of a gradation transition, within a rewriting period of time (16.7 msec) that corresponds to an ordinary frame frequency (60 Hz).

In view of the circumstances, a method is adopted in which a driving signal is modulated and driven so as to facilitate a transition from a current gradation to a target gradation, thereby improving the response speed. Note that a liquid crystal display apparatus adopting such a method is disclosed in FIG. 4 of Japanese patent examined patent publication No. 2650479.

According to the method, for example, in the case where a gradation transition from a current frame FR(k−1) to a target frame FR(k) is carried out based on a rise driving that causes the gradation to increase, a voltage is supplied to a pixel so as to facilitate the transition from a current gradation to a target gradation. More specifically, a voltage having a higher level than a voltage level indicative of an image data D(I, j, k) of the target frame FR(k) is supplied to a pixel. On the contrary, in the case where a gradation transition from a current frame FR(k−1) to a target frame FR(k) is carried out based on a decay driving that causes the gradation to decrease, a voltage is supplied to a pixel so as to facilitate the transition from a current gradation to a target gradation. More specifically, a voltage having a lower level than a voltage level indicative of an image data D(I, j, k) of the target frame FR(k) is supplied to a pixel.

As a result, when a gradation transition occurs, a brightness level of a pixel changes more rapidly, and reaches, in a shorter period of time, near a brightness level that corresponds to an image data D(I, j, k) of the target frame FR(k), as compared to a brightness level in a case where a voltage level indicative of an image data D(I, j, k) of the target frame FR(k) is supplied from the beginning. This ensures to improve the response speed of the liquid crystal display apparatus even when the response speed of the liquid crystal is slow.

However, in the liquid crystal display apparatus of the vertically aligned mode and the normally black mode, a mere facilitation of the gradation transition like other liquid crystal is likely to occur that the image deteriorates and that the response speed is not fully improved.

SUMMARY OF THE INVENTION

An embodiment of the present invention is made in view of the foregoing problems, (i) by having carried on research in an effort to realize both of the improvement in the response speed and the prevention of the deterioration of the image, respectively, in the liquid crystal display apparatus of vertically aligned mode and normally black mode, and (ii) by having found that "in a liquid crystal display apparatus of vertically aligned mode, when causing liquid crystal molecules which are almost vertically aligned to be inclined, a plurality of areas in which response speeds are greatly different from each other coexist in a pixel, such that (i) the display quality drastically deteriorates because of the occurrence of an excessive brightness or (ii) a gradation does not reach a desired one in several frames because of the occurrence of a later described angular response, irrespective of the setting of a degree to which a gradation transition is facilitated."

In view of the circumstances, an object of an embodiment of the present invention is to provide a driving method of a liquid crystal display apparatus, such as a liquid crystal display apparatus of vertically aligned mode and normally black mode, which can improve in the response speed and prevent the deterioration of the image although the liquid crystal display apparatus having a plurality of areas in which the response speeds are greatly different from each other coexist in a pixel is driven. An object of another embodiment is to provide a driving method of such a liquid crystal display apparatus, and another object is to provide a program.

In order to achieve an object, a driving method of a liquid crystal display apparatus, in accordance with an embodiment of the present invention, in which a liquid crystal cell of vertically aligned mode is driven in a normally black mode, includes the step of (a) correcting a desired target gradation so as to facilitate a gradation transition from a current gradation to the desired target gradation. The method further includes the step of: judging whether or not a combination of the current gradation and the desired target gradation corresponds to a predetermined first combination which causes (i) a time required for a gradation in a second area of a pixel to reach a second target gradation to become not less than a predetermined second tolerance, when facilitating the gradation transition to such a degree that a gradation in a first area of the pixel does not exceed a predetermined first tolerance indicative of a first target gradation, and (ii) the gradation in the second area of the pixel to exceed the first tolerance, when facilitating the gradation transition to such a degree that a time required for the gradation in the first area of the pixel to reach the first target gradation becomes less than the second tolerance. It further includes the step of replacing the desired target gradation with a predetermined first gradation prior to the first step such that a combination of the desired target gradation and a next gradation does not correspond to the first combination irrespective of the next gradation, when the combination of the current gradation and the desired target gradation corresponds to the first combination. Finally, it includes the step of replacing the current gradation with a predetermined second gradation to be reached by a current gradation transition, prior to the first step, when a combination of the current gradation and a previous gradation corresponds to the first combination.

Here, in the liquid crystal cell of vertically aligned mode, the liquid crystal molecules align almost vertically to the substrate substantially when no voltage is supplied. In the liquid crystal cell, the electric field oblique to the surface of the substrate is generated in response to the voltage supplied to the pixel electrode. The oblique electric field causes the liquid crystal molecules, in the area (referred to as the first region) in the vicinity of the pixel electrode generating the oblique electric field, to obliquely align at an angle that varies depending on the supplied voltage. The liquid crystal molecules in the area (referred to as the second region) away from the pixel electrode obliquely align at the same angle because of the continuity of the liquid crystal.

In the liquid crystal cell, the alignment direction of the liquid crystal molecules in the second region is determined by the continuity of the liquid crystal. This causes the response speed in the second region to have a tendency of being slower than the first region. This is true especially when (i) the alignment direction (in-plane components of the alignment direction that are parallel to the substrate) of the liquid crystal molecules in the second area is not determined and (ii) both of the alignment direction and the tilt angle are determined by the continuity of the liquid crystal, the difference between the response speeds in the respective areas becomes drastically great as compared with the case where the alignment direction has already been determined and only the tilt angle should be determined.

In this case, in the correcting step, the gradation in the second area of the pixel exceeds the first tolerance, when facilitating the gradation transition to such a degree that a time required for the gradation in the first area of the pixel to reach the first target gradation becomes less than the second tolerance, thereby causing the user to perceive this as the excessive brightness. Meanwhile, when facilitating the gradation, in the area of the pixel in which the response speed is fast, to such a degree that a gradation in the first area of the pixel does not exceed the first tolerance indicative of the second target gradation, the following phenomenon occurs. Namely, the time required for the gradation in the second area of the pixel to reach the first target gradation to become not less than the second tolerance. Hereinafter, this kind of phenomenon is referred to as angular response. In this case, the gradation in the area of the pixel in which the response speed is fast is reduced to the desired target gradation after the facilitation of the gradation transition. On this account, the gradations of the entire pixels are reduced, so as to be perceived as the black trail by the user of the liquid crystal display apparatus.

In other words, when a combination of the current gradation and the desired target gradation corresponds to the first combination, the excessive brightness or the black trail occurs no matter how the degree of the facilitation of the gradation transition may be set.

In contrast, according to the driving method of the liquid crystal display apparatus having the foregoing arrangement, when it is judged that the combination of the current gradation and the desired target gradation corresponds to the first combination, the desired target gradation is replaced with the first gradation prior to the desired target correcting step (the first correcting step), and the current gradation is replaced with the second gradation prior to the next correcting step (the second correcting step).

Since the first gradation is predetermined such that the combination of the desired target gradation and the next gradation does not correspond to the first combination irrespective of the next gradation, it is possible to set the facilitation of the gradation transition in the second correcting step to such a degree that both the excessive brightness and the angular response do not occur. As such, although the combination of the desired target gradation and the next gradation corresponds to the first combination, it is possible to reach the desired gradation until the gradation after next is specified, i.e., by the first and second gradation transitions.

As a result, in an arrangement in which it is intended to carry out a gradation transition to a desired gradation via a single facilitation of the gradation transition although the combination of the current gradation and the desired target gradation corresponds to the first combination, it is possible to suppress the degree of the occurrence of the excessive brightness even more, as compared with a case where the occurrence of the black trail is avoided by setting the facilitation of the gradation transition to such a degree as to obtain the same response time as that of an embodiment of the present invention. This ensures the realizing of a liquid crystal display apparatus having a higher display quality.

In order to achieve the foregoing objects, another driving method of a liquid crystal display apparatus in accordance with an embodiment of the present invention, in place of the first and second replacing steps, may be arranged so as to further include the steps of adding a predetermined first value to the desired target gradation prior to the correcting step, when the combination of the current gradation and the desired target gradation corresponds to the first combination; and subtracting a predetermined second value from the current gradation, prior to the correcting step, when a combination of the current gradation and a previous gradation corresponds to the first combination.

In the case where the gradation transition from the previous gradation to the current gradation corresponds to the first combination, the angular response occurs when trying to facilitate the gradation transition from the previous gradation to the current gradation. Because of this, it takes a long time for the brightness of the pixel to reach the target brightness.

In contrast, according to the above arrangement, when it is judged that the gradation transition from the previous gradation to the current gradation corresponds to the first combination, the second value is subtracted from the current gradation, prior to the correcting step, in the second calculating step. Accordingly, the gradation transition from the current gradation to the desired target gradation is facilitated more drastically as compared with the case where the second calculating step is not carried out. This thereby allows the shortening of the time for the pixel to reach the target gradation.

As a result, in an arrangement in which it is intended to carry out a gradation transition to a desired gradation via a single facilitation of the gradation transition although the combination of the current gradation and the desired target gradation corresponds to the first combination, it is possible to suppress the degree of the occurrence of the excessive brightness even more, as compared with a case where the occurrence of the black trail is avoided by setting the facilitation of the gradation transition to such a degree as to obtain the same response time as that of an embodiment of the present invention. This permits realizing of a liquid crystal display apparatus having a higher display quality.

Further, the second calculating step is carried out prior to the correcting step. Based on this, although the second value is subtracted from the current gradation irrespective of the current gradation and the desired target gradation that have not been subject to the second calculating step, the degree to which the gradation transition is facilitated varies depending on the above both gradations that have not been subject to the second calculating step. Accordingly, it is possible to facilitate the lower gradations, i.e., to facilitate the gradation transition in which the response speed is slow and a greater correction is required, without increasing the circuit size or the calculation amount, for carrying out the second calculating step.

In order to obtain one or more of the foregoing objects, a driving method of a liquid crystal display apparatus, in accordance with an embodiment of the present invention, wherein areas in which response speeds are different from each other coexist. The method includes the step of (a) correcting a desired target gradation so as to facilitate a gradation transition from a current gradation to the desired target gradation, (b) adjusting corrections in a desired target correcting and a next correcting such that deterioration of display quality due to different response speeds in the respective areas is reduced, when a combination of the current gradation and the desired target gradation corresponds to a first combination that causes the deterioration of the display quality to occur.

In the case where the areas in which response speeds different from each other coexist in the pixel, when a degree of the facilitation of the gradation transition is set so as to be optimum to one area, such a degree is not optimum to the other areas. Thus, when intending to carry out the gradation transition of the pixel to the desired target gradation based on a single facilitation of the gradation transition, (i) the area in which an excessive brightness occurs may come out in the pixel because the gradation transition is facilitated too much or (ii) a response time may increase and a black trail etc. may occur because the gradation transition is not fully facilitated. This can cause the display quality to deteriorate.

In contrast, according to the arrangement of an embodiment of the present invention, the corrections in the desired target correcting step and the next correcting step are respectively carried out, when the combination of the current gradation and the desired target gradation corresponds to the predetermined first combination that causes the deterioration of the display quality to occur.

Thus, the gradation transition of the pixel to the desired target gradation is carried out by the first and second correcting steps, not by a single correcting step. On this account, in an arrangement in which the gradation transition of the pixel to the desired target gradation is intended to be carried out based on a single correcting step even though the combination of the current gradation and the desired target gradation corresponds to the first combination, it is possible to suppress the degree of the occurrence of the excessive brightness even more, as compared with a case where the occurrence of the black trail is avoided by setting the facilitation of the gradation transition to such a degree as to obtain the same response time as that of an embodiment of the present invention. This permits realizing of a liquid crystal display apparatus having a higher display quality.

In order to achieve one or more of the foregoing objects, a driving apparatus of one embodiment of the present invention, of a liquid crystal display apparatus in which a liquid crystal cell of vertically aligned mode is driven in a normally black mode, includes (a) correction means for correcting a desired target gradation so as to facilitate a gradation transition from a current gradation to the desired target gradation, (b) judgment means for judging whether or not a combination of the current gradation and the desired target gradation corresponds to a predetermined first combination which causes (i) a time required for a gradation in a second area of a pixel to reach a second target gradation to become not less than a predetermined second tolerance, when facilitating the gradation transition to such a degree that a gradation in a first area of the pixel does not exceed a predetermined first tolerance indicative of a first target gradation, and (ii) the gradation in the second area of the pixel to exceed the first tolerance, when facilitating the gradation transition to such a degree that a time required for the gradation in the first area of the pixel to reach the first target gradation becomes less than the second tolerance; (c) first replacement means for replacing the desired target gradation with a predetermined first gradation such that a combination of the desired target gradation and a next gradation does not correspond to the first combination irrespective of the next gradation, when the combination of the current gradation and the desired target gradation corresponds to the first combination, and for supplying the first gradation to said correction means; and (d) second replacement means for replacing the current gradation with a predetermined second gradation to be reached by a current gradation transition, when a combination of the current gradation and a previous gradation corresponds to the first combination, the second gradation, and for supplying the second gradation to said correction means.

The driving apparatus of the liquid crystal display apparatus having the above arrangement can drive the liquid crystal cell of the vertically aligned mode in the normally black mode based on an embodiment of the driving method of the liquid crystal display apparatus, the method comprising the foregoing first and second replacing steps. On this account, in an arrangement in which the gradation transition of the pixel to the desired target gradation is intended to be carried out based on a single correcting step, even though the combination of the current gradation and the desired target gradation corresponds to the first combination, it is possible to suppress the degree of the occurrence of the excessive brightness even more, as compared with a case where the occurrence of the black trail is avoided by setting the facilitation of the gradation transition to such a degree as to obtain the same response time as that of an embodiment of the present invention. This permits realizing of a liquid crystal display apparatus having a higher display quality.

In order to achieve the foregoing objects, another embodiment of a driving apparatus of a liquid crystal display apparatus includes, in place of the first and second replacement means, first calculation means for adding a predetermined first value to the desired target gradation, when the combination of the current gradation and the desired target gradation corresponds to the first combination, and for supplying an added result to said correction means. It further includes second calculation means for subtracting a predetermined second value from the current gradation, when a combination of the current gradation and a previous gradation corresponds to the first combination, and for supplying a subtracted result to said correction means.

The driving apparatus of the liquid crystal display apparatus having the above arrangement can drive the liquid crystal cell of the vertically aligned mode in the normally black mode based on an embodiment of the driving method of the liquid crystal display apparatus. The method includes the foregoing first and second replacing steps. On this account, in an arrangement in which the gradation transition of the pixel to the desired target gradation is intended to be carried out based on a single correcting step, even though the combination of the current gradation and the desired target gradation corresponds to the first combination, it is possible to suppress the degree of the occurrence of the excessive brightness even more, as compared with a case where the occurrence of the black trail is avoided by setting the facilitation of the gradation transition to such a degree as to obtain the same response time as that of an embodiment of the present invention. This permits realizing of a liquid crystal display apparatus having a higher display quality.

With the arrangement, when the combination of the current gradation and the desired target gradation corresponds to the first combination that causes the occurrence of deterioration of the display quality due to the difference between the response speeds in the respective areas, the corrections in the target desired correcting step and the next correcting step are adjusted in the adjusting step.

Thus, the gradation transition of the pixel is carried out by the two correcting steps, not by a single correcting step. On this account, in an arrangement in which the gradation transition of the pixel to the desired target gradation is intended to be carried out based on a single correcting step even though the combination of the current gradation and the desired target gradation corresponds to the first combination, it is possible to suppress the degree of the occurrence of the excessive brightness even more, as compared with a case where the occurrence of the black trail is avoided by setting the facilitation of the gradation transition to such a degree as to obtain the same response time as that of an embodiment of the present invention. This permits realizing of a liquid crystal display apparatus having a higher display quality.

For a fuller understanding of the nature and advantages of the invention, reference should be made to the ensuing detailed description wherein exemplary embodiments are described, taken in conjunction with the accompanying drawings.

BRIEF DESCRIPTION OF THE DRAWINGS

FIG. 8 shows an operation of an image display apparatus of a comparative example with respect to the present embodiment.

FIG. 9 shows another operation of the image display apparatus of the comparative example shown in FIG. 8.

FIG. 9 shows another operation of the image display apparatus of the comparative example shown in FIG. 8.

FIG. 11 is an explanatory diagram showing an angular response generation area in the case of a panel temperature of 20 degrees centigrade.

FIG. 12 is an explanatory diagram showing an angular response generation area in the case of a panel temperature of 15 degrees centigrade.

FIG. 13 is an explanatory diagram showing an angular response generation area in the case of a panel temperature of 10 degrees centigrade.

FIG. 14 is an explanatory diagram showing an angular response generation area in the case of a panel temperature of 5 degrees centigrade.

FIG. 15 shows an operation of an image display apparatus in accordance with the present embodiment.

FIG. 1 shows another embodiment in accordance with the present invention.

FIG. 17 shows an operation of the image display apparatus.

FIG. 18 shows a further embodiment in accordance with the present invention.

FIG. 19 shows still a further embodiment in accordance with the present invention.

FIG. 20 shows yet another embodiment in accordance with the present invention.

FIG. 22 shows still a further embodiment in accordance with the present invention.

FIG. 23 shows another arrangement of the liquid crystal cell.

FIG. 24 shows a further arrangement of the liquid crystal cell.

FIG. 25 shows a further arrangement of the liquid crystal cell.

FIG. 26 shows still a further arrangement of the liquid crystal cell.

FIG. 27 shows still yet another arrangement of the liquid crystal cell.

DESCRIPTION OF THE EMBODIMENTS (First Embodiment)

The following description deals with one embodiment of the present invention with reference to FIG. 1 through FIG. 15. More specifically, in an image display apparatus 1 in accordance with the present embodiment, although a liquid crystal cell of a vertically aligned mode and a normally black mode is driven, it is possible to realize (i) the improvement in a response speed, and (ii) the prevention of the image deterioration.

Figure 2:
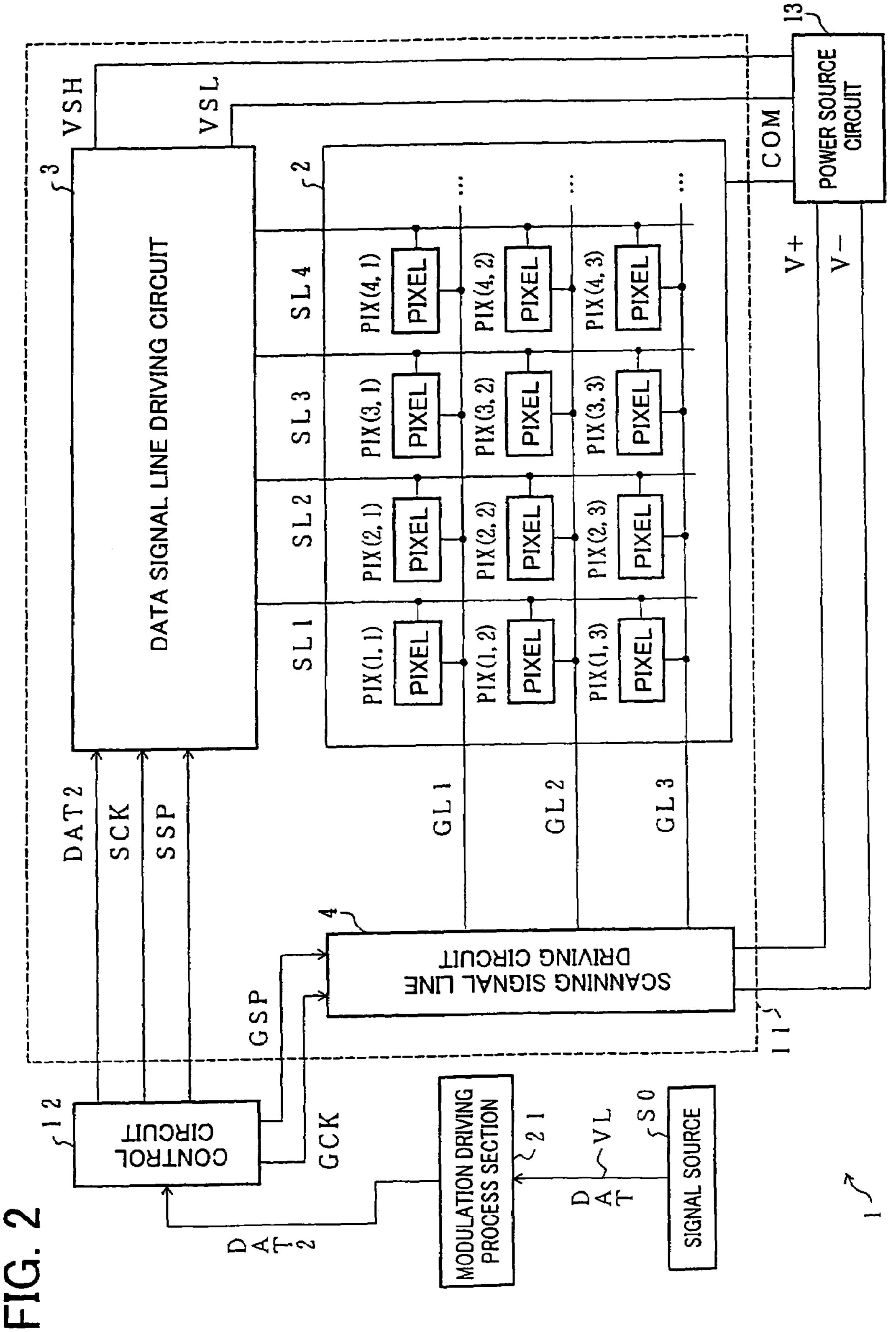
FIG. 2 is a block diagram showing a main part of the image display apparatus.

A panel 11 (a liquid crystal display apparatus) of the image display apparatus 1, as shown in FIG. 2, includes (a) a pixel array 2 having pixels PIX(1, 1) through PIX(n, m) that are provided in a matrix manner, (b) a data signal line driving circuit 3 that drives data signal lines SL1 through SLn of the pixel array 2, and (c) a scanning signal line driving circuit 4 that drives scanning signal lines GL1 through GLn of the pixel array 2. The image display apparatus 1 further includes (d) a control circuit 12 that supplies control signals to the driving circuits 3 and 4, respectively, and (e) a modulation driving process section 21 (a driving apparatus) that carries out a modulation, in response to a supplied image signal, with respect to an image signal to be supplied to the control circuit 12 so as to facilitate the gradation transition. Note that these circuits operate upon receipt of the power supply from a power source circuit 13.

The following description deals with a schematic arrangement of the entire image display apparatus 1 and operations thereof. This is prior to the detail description of an arrangement of the modulation driving process section 21. For convenience, for example, like the i-th data signal line SLi, a reference is made by addition of figure or alphabetical character indicative of a position, only when a position is to be specified. Otherwise, a reference is made by omitting characters indicative of a position, when it is not necessary to specify a position or when a generic name is given.

The pixel array 2 includes a plurality of data signal lines SL1 through SLn (here, n data signal lines), a plurality of scanning signal lines GL1 through GLm (here, m scanning signal lines) that intersect with the data signal lines SL1 through SLn, respectively. When it is assumed that an arbitrary integer i falls within a range of 1 and n, and that an arbitrary integer j falls within a range of 1 and m, a pixel PIX(i, j) is provided for each combination of the data signal line Sli and the scanning signal line GLj.

According to the present embodiment, the pixel PIX(i, j) is provided in an area defined by neighboring two data signal lines SL(i−1) and SLi and by neighboring two scanning signal lines GL(j−1) and GLj.

Figure 3:
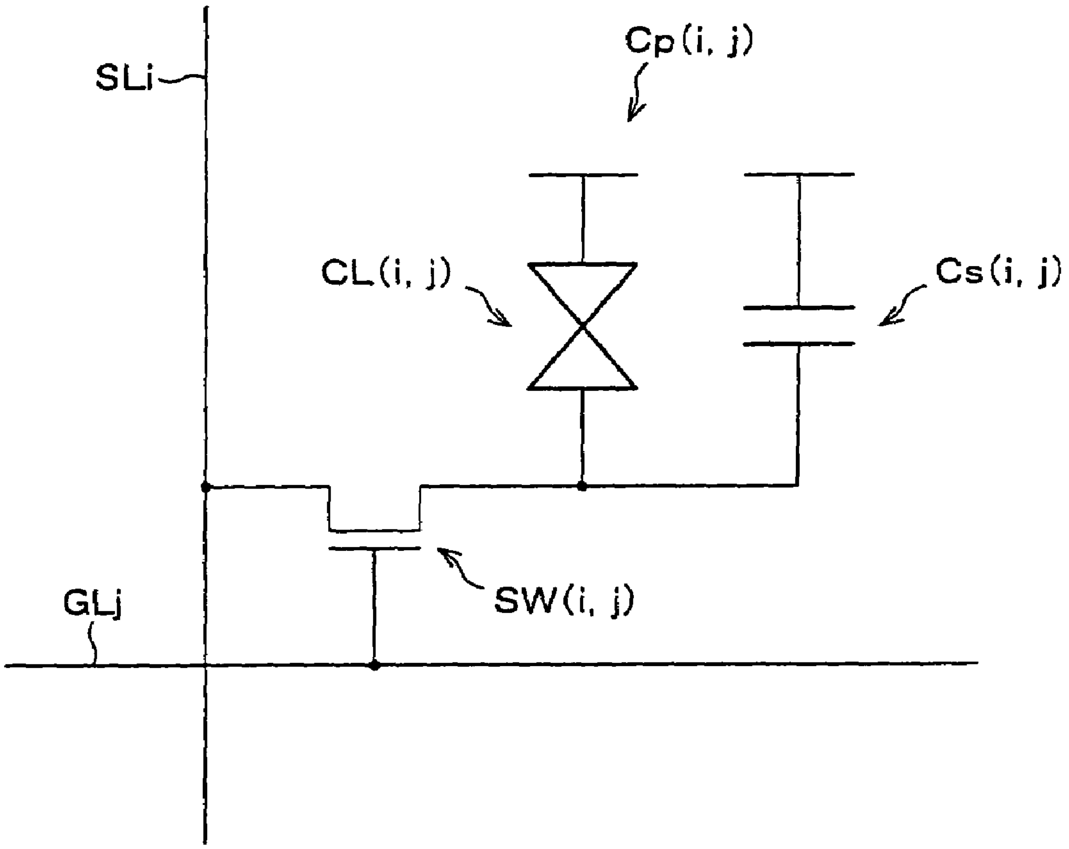
FIG. 3 is a circuit diagram showing a configuration of a pixel provided in the image display apparatus.

The pixel PIX(i, j), for example as shown in FIG. 3, includes (i) a field effect transistor SW(i, j), served as a switching device, in which a gate terminal is connected to the scanning signal line GLj while a drain terminal is connected to the data signal line SLi, and (ii) an pixel capacity Cp(i, j) whose one electrode (later described pixel electrode 121*a*) is connected to a source terminal of the field effect transistor SW(i, j). The other electrode (later described opposed electrode 121*b*) of the pixel capacity Cp(i, j) is connected to a common electrode line that is common to the entire pixels PIX. The pixel capacity Cp(i, j) is composed of a liquid crystal capacity CL(i, j) and an auxiliary capacity Cs(i, j) that is added according to need.

When the scanning signal line GLj is selected in the pixel PIX(i, j), the field effect transistor SW(i, j) turns on. This allows the voltage that has been supplied to the data signal line SLi to be supplied to the pixel capacity Cp(i, j). Thereafter, the selection period of the scanning signal line GLj is over, and the field effect transistor SW(i, j) turns off. During the turning off, the pixel capacity Cp(i, j) keeps a predecessor voltage. The predecessor voltage corresponds to a voltage that was supplied across the pixel capacity Cp(i, j) at the time when the field effect transistor SW(i, j) turns off.

Note that the transmittance of the liquid crystal varies depending on a voltage to be supplied to the liquid crystal capacity CL(i, j). Accordingly, when the scanning signal line GLj is selected and a voltage that varies depending on an image data D to be supplied to the pixel PIX(i, j) is supplied to the data signal line SLi, it is possible to change a display state of the pixel PIX(i, j) in accordance with the image data D.

The liquid crystal display apparatus of the present embodiment adopts a liquid cell of a vertically aligned mode that serves as a liquid crystal cell. In the liquid cell of a vertically aligned mode, liquid crystal molecules are almost vertically aligned with respect to a substrate when no voltage is supplied, whereas the liquid crystal molecules are obliquely aligned with respect to a vertically aligned state of the liquid crystal molecules in accordance with a voltage to be supplied to the liquid crystal capacity CL(i, j) of the pixel PIX(i, j). Such a liquid crystal cell is used in a normally black mode in which a black display is carried out when no voltage is supplied.

Figure 4:
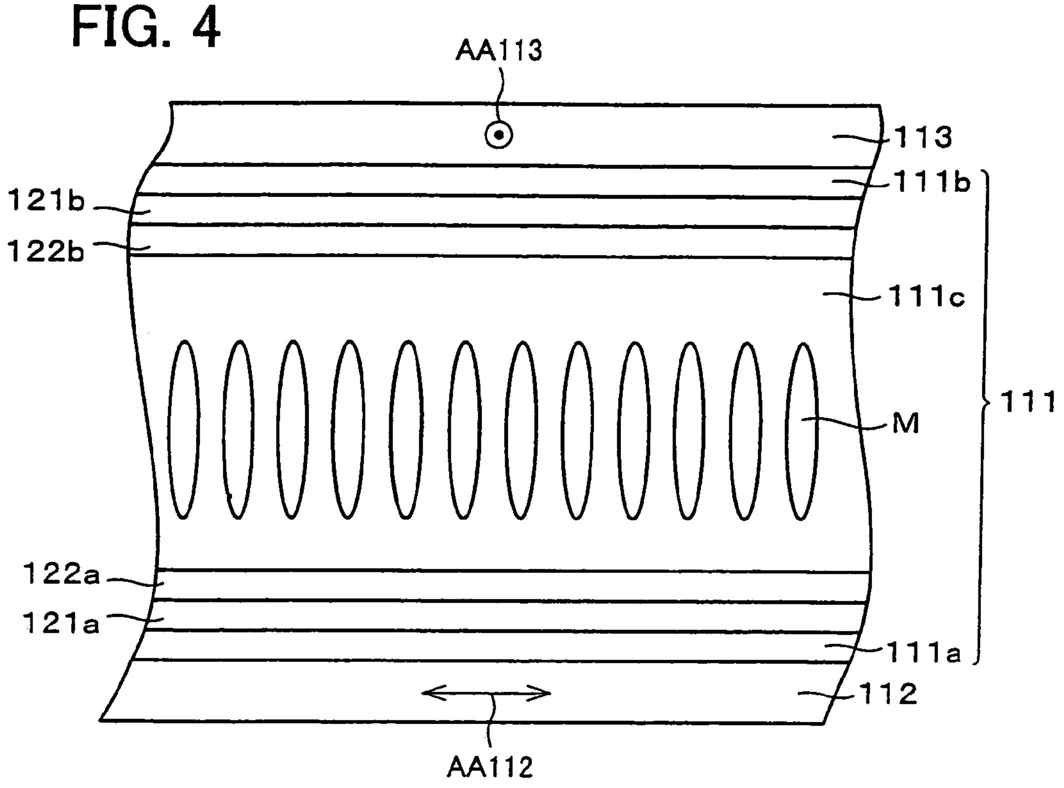
FIG. 4 is a pattern diagram showing a case where no voltage is supplied, FIG. 4 showing a liquid crystal cell provided in the image display apparatus.

To be more specific, as shown in FIG. 4, the pixel array 2 of the present embodiment includes a liquid crystal cell 111 (a liquid crystal display apparatus) of a vertically aligned mode (a VA mode), and polarization plates 112 and 113 provided on both sides of the liquid crystal cell 111.

The liquid crystal cell 111 includes (i) a TFT (Thin Film Transistor) substrate 111*a* provided with pixel electrodes 121*a* corresponding to respective pixels PIX, (ii) an opposed substrate 111*b* provided with an opposed electrode 121*b*, and (iii) a liquid crystal layer 111*c* that is made of a nematic liquid crystal having a negative dielectric anisotropy and is held tight by the substrates 111*a* and 111*b*. Note that the image display apparatus 1 of the present embodiment can carry out a color display, and the opposed substrate 111*b* is provided with color filters (not shown) corresponding to colors of the respective pixels PIX.

The TFT substrate 111*a* is further provided with a vertically aligned layer 122*a* on a surface of a side of the liquid crystal layer 111*c*. Similarly, the opposed substrate 111*b* is provided with a vertically aligned layer 122*b* on a surface of a side of the liquid crystal layer 111*c*. This arrangement causes liquid crystal molecules M, of the liquid crystal layer 111*c* which is provided between the both substrates 111*a* and 111*b*, to be almost vertically aligned with respect to the surfaces of the substrates 111*a* and 111*b*, when no voltage is supplied between the electrodes 121*a* and 121*b*.

Figure 5:
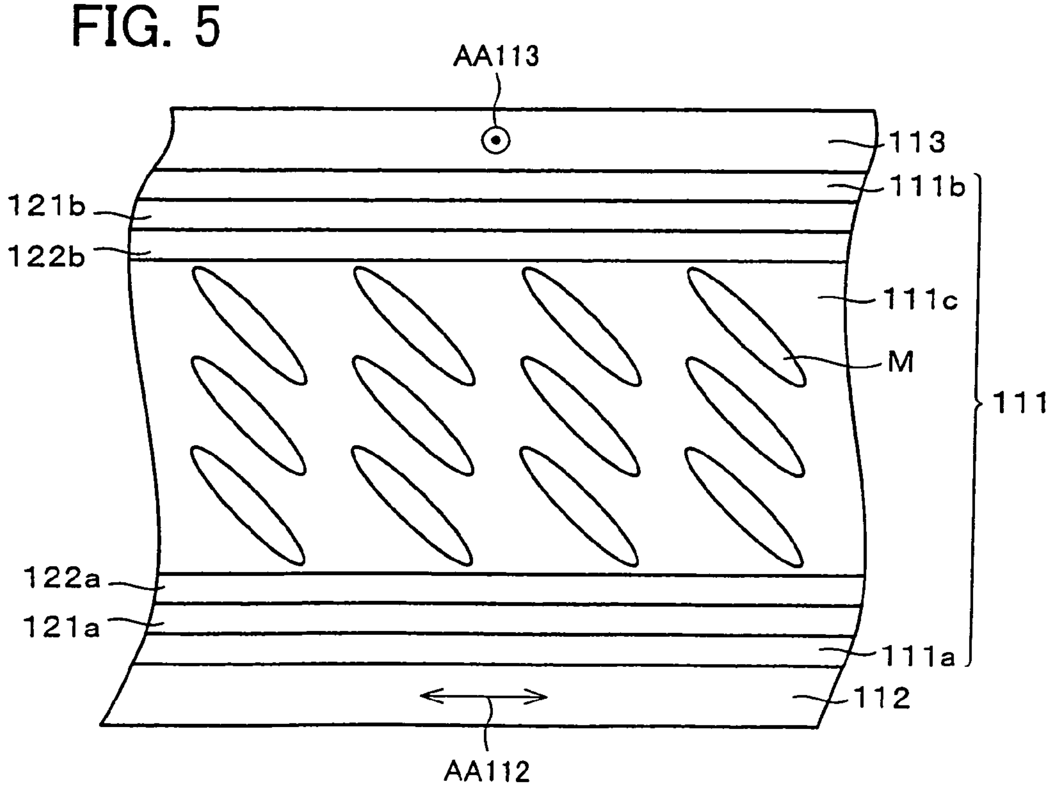
FIG. 5 is a pattern diagram showing a case where a voltage is supplied, FIG. 5 showing a liquid crystal cell provided in the image display apparatus.

In contrast, when a voltage is supplied between the electrodes 121*a* and 121*b*, the liquid crystal molecules M are changed from a state in which the major axis of the crystal molecules M points in a normal line direction to a state in which the crystal molecules M are aligned at an oblique angle that varies depending on the voltage thus supplied (see FIG. 5). Note that normal line directions and in-plane directions of the substrates 111*a* and 111*b* will be merely referred to as a normal line direction and a in-plane direction, respectively, aside from cases where a specific distinction is required. This is because the substrates 111*a* and 111*b* face to each other.

Note that the liquid crystal cell 111 of the present embodiment is a liquid crystal cell of a multidomain alignment. The liquid crystal cell 111 is controlled such that each of the pixels PIX is divided into a plurality of domains, and such that alignment directions, i.e., directions (in-plane components of alignment directions) in which the liquid crystal molecules M obliquely align in response to an applied voltage differ from domain to domain.

Figure 6:
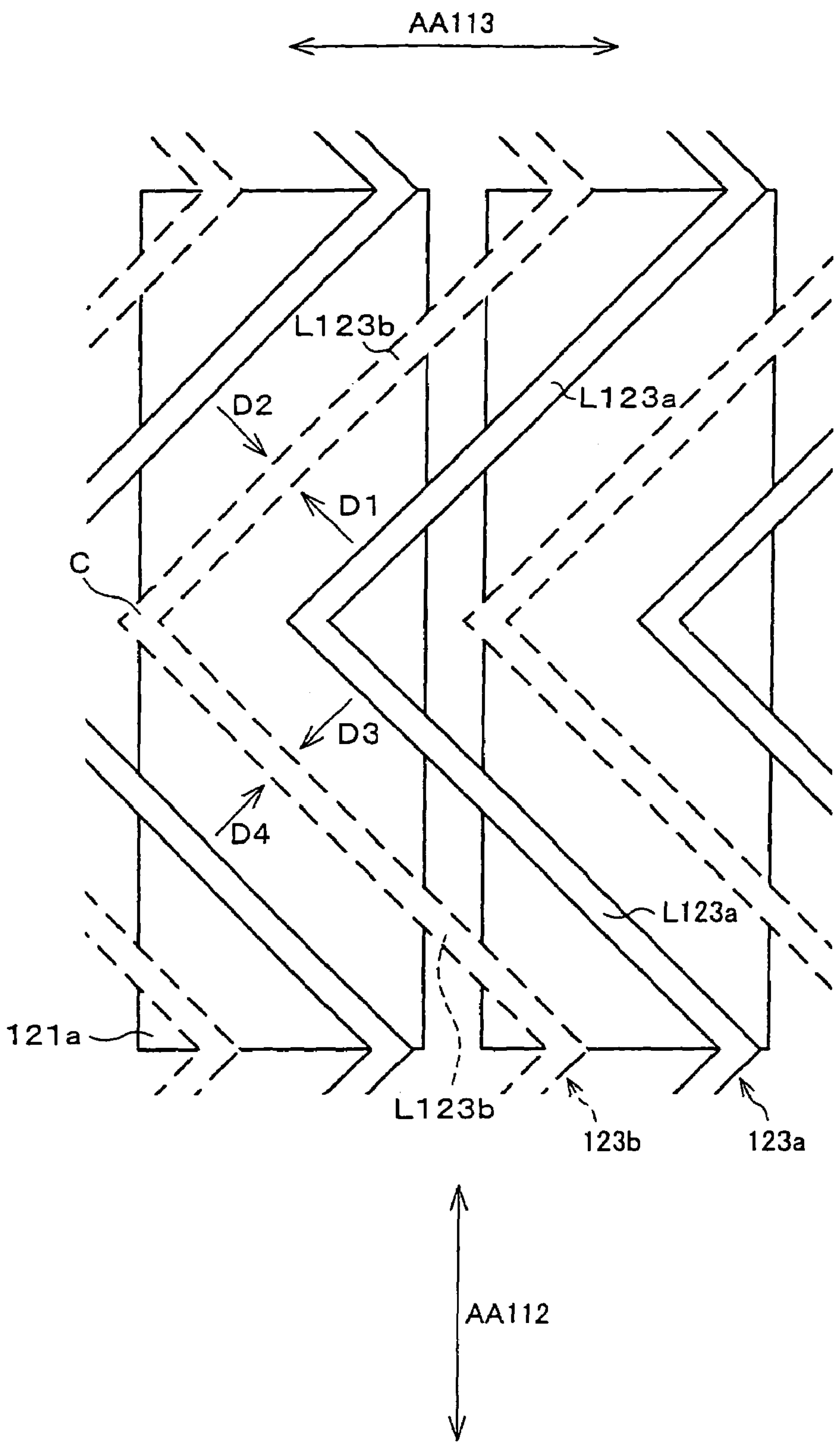
FIG. 6 is a plan view showing a vicinity of a pixel electrode, FIG. 6 showing an arrangement of the liquid crystal cell.

More specifically, as shown in FIG. 6, the pixel electrode 121*a* includes a sequence of projections 123, provided in a stripe manner, that have a sectional shape of dancette and have an in-plane shape of zigzag so as to bend at substantially a right angle. The opposed electrode 121*b* includes slits 123*b* (opening sections: areas where no electrode is formed), provided in a stripe manner, that have an in-plane shape of zigzag so as to bend at substantially a right angle. An interval between the sequence of the projections 123*a* and the slits 123*b* is set to a predetermined interval. The sequence of the projections 123*a* is formed by applying photosensitive resin onto the pixel electrode 121*a* and then fabricating the photosensitive resin thus applied based on the photo lithography.

The electrodes 121*a* and 121*b* are formed by forming ITO (Indium Tin Oxide) films on the substrates 111*a* and 111*b*, by applying photo resists onto the ITO films, by exposing and developing, and then by etching electrode patterns, respectively. The slits 123*b* is formed by carrying out patterning such that the areas corresponding to the slits 123*b* are removed during forming of the opposed electrode 121*b*.

Note that, in the vicinity of the sequence of the projections 123*a*, the liquid crystal molecules align so as to be perpendicular to an oblique plane of the sequence of the projections 123*a*. Further, during supplying of the voltage, the electric field in the vicinity of the sequence of the projections 123*a* inclines so as to be parallel to the oblique plane of the sequence of the projections 123*a*. Since this causes each major axis of the liquid crystal molecules to incline in a direction that is perpendicular to the electric field, the liquid crystal molecules align in a direction oblique to the surface of the substrate. Further, because of the continuity of the liquid crystal, the liquid crystal molecules away from the oblique plane of the sequence of the projections 123*a* also align in a direction similar to that of the liquid crystal molecules in the vicinity of the oblique plane of the sequence of the projections 123*a*.

In like manner, during supplying of the voltage, a electric field, inclined to the surface of the substrate, is generated in the vicinity of an edge of the slits 123*b*, the edge indicating a boundary between the slits 123*b* and the opposed electrode 121*b*. This causes the liquid crystal molecules to align in a direction oblique to the surface of the substrate. Further, because of the continuity of the liquid crystal, the liquid crystal molecules in the vicinity of the edge also align in a direction similar to that of the liquid crystal molecules in the vicinity of the edge.

Here, it is assumed in each of the sequence of the projections 123*a* and the slits 123*b* that a part between neighboring two corner parts C is referred to as a line part. In an area between a line part 123*a* of the sequence of the projections 123*a* and its neighboring line part 123*b* of the slits 123*b*, an in-plane component of the liquid crystal molecules in an alignment direction is identical with that in a direction from the line part L123*a* toward the line part L123*b*.

Note that each of the sequence of the projections 123*a* and the slits 123*b* bends at the corner part C at substantially a right angle. This allows the alignment directions of the liquid crystal molecules are divided into four in the pixel PIX, thereby resulting in that domains D1 through D4 whose alignment directions of the liquid crystal molecules are different from each other are formed in the pixel PIX.

Meanwhile, the polarization plates 112 and 113 shown in FIG. 4 are disposed such that an absorption axis AA112 of the polarization plate 112 is orthogonal to an absorption axis AA113 of the polarization plate 113 (see FIG. 6). Further, the polarization plates 112 and 113 shown in FIG. 4 are disposed such that the respective absorption axes AA112 and AA113 are at an angle of 45 degree with the in-plane components of the liquid crystal molecules in the alignment directions in the respective domains D1 through D4 (see FIG. 6).

Note that FIG. 4 shows, as an example of the absorption axes AA112 and AA113 that are orthogonal to each other, the case where the absorption axis AA112 is parallel to the sheet surface of FIG. 4 and the absorption axis AA1 13 is perpendicular to the sheet surface of FIG. 4. Alternatively, the absorption axes AA112 and AA113 may be spun 90 degrees, i.e., the absorption axis AA112 may be perpendicular to the sheet surface of FIG. 4 and the absorption axis AA113 may be parallel to the sheet surface of FIG. 4.

In the pixel array 2 described above, while an voltage is supplied between the pixel electrode 121*a* and the opposed electrode 121*b*, the liquid crystal molecules in the liquid cell 111, as shown in FIG. 5, align at an angle with the normal line direction of the substrate, such an angle varying depending on the voltage thus supplied. This allows the light passing through the liquid crystal cell 111 to have a retardation that varies depending on the voltage thus supplied.

Note that the polarization plates 112 and 113 are disposed such that the absorption axis AA112 of the polarization plate 112 is orthogonal to the absorption axis AA113 of the polarization plate 113. This allows the light incident on a polarization plate on an outgoing side (for example, the polarization plate 112) to become elliptically polarized light that varies depending on the retardation caused by the liquid crystal cell 111, such that the incident light partially passes through the polarization plate (the polarization plate 112). Thus, it is possible to control the amount of the outgoing light from the polarization plate 112 in response to the voltage thus supplied, thereby permitting carrying out of the gradation display.

Further, as described above, in the liquid crystal cell 111, the domains D1 through D4 whose alignment directions of the liquid crystal molecules are different from each other are formed in the pixel. Accordingly, even in cases where the liquid crystal molecules do not cause the transmitted light to have a retardation because of viewing the liquid crystal cell 111 from a direction that is parallel to the alignment direction of the liquid crystal molecules belonging to a domain (for example, the domain D1), the liquid crystal molecules in residual domains (here, the domains D2 through D4) can cause the transmitted light to have a retardation. This allows the respective domains to optically compensate for each other. As a result, it is possible to improve the display quality when obliquely viewing the liquid crystal cell 111, thereby enlarging a viewing angle.

In contrast, while no voltage is supplied between the pixel electrode 121*a* and the opposed electrode 121*b*, the liquid crystal molecules in the liquid crystal cell 111, as shown in FIG. 4, are in a vertically aligned state. At this state (i.e., when no voltage is supplied), the light incident on the liquid crystal cell 111 from the normal line direction has no retardation caused by the respective liquid crystal molecules, so as to pass through the liquid crystal cell 111 while keeping the polarization state. This causes the light incident on a polarization plate on an outgoing side (here, for example, the polarization plate 112) to become linear polarized light whose polarization direction is substantially parallel to the absorption axis AA112 of the polarization plate 112, thereby resulting in that the light can not pass through the polarization plate 112. As a result, the pixel array 2 can not display the black color.

Thus, in the pixel array 2 of the present embodiment, a voltage is supplied between the pixel electrode 121*a* and the opposed electrode 121*b* so as to cause an electric field whose direction is oblique to the surface of the substrate to be generated. This thereby allows the liquid crystal molecules to obliquely align. Accordingly, it is possible to change the transmittance of the pixel PIX in accordance with a level of a voltage to be supplied to the pixel electrode 121*a*, thereby permitting the carrying out of the gradation display.

Meanwhile, the scanning signal line driving circuit 4 shown in FIG. 2 supplies to each of the scanning signal lines GL1 through GLm a signal, such as a voltage signal, indicative of whether or not the scanning signal line is in a selection period. The scanning signal line driving circuit 4 changes the scanning signal line GLj, via which the signal indicative of whether or not the scanning signal line is in a selection period is supplied, in accordance with, for example, a timing signal such as the clock signal GCK or the start pulse signal GSP that are supplied from the control circuit 12. This allows the respective scanning signal lines GLl through GLm to be sequentially selected in response to a predetermined timing.

In response to a predetermined timing, the data signal line driving circuit 3 carries out a sampling of the image data D that are supplied to the respective pixels PIX in a time-sharing manner, so as to extract the image data D thus sampled. The data signal line driving circuit 3 also supplies output signals, which vary depending on the respective image data D, to the respective pixels PIX(1, j) through PIX(n, j) corresponding to the scanning signal line GLj which the scanning signal line driving circuit 4 has selected, via the respective data signal lines SL1 through SLn.

Note that the data signal line driving circuit 3 determines the above sampling timing and the output timing of the output signal in accordance with the timing signals such as the clock signal SCK and the start pulse signal SSP that are supplied from the control circuit 12.

In the pixels PIX(1, j) through PIX(n, j), levels of the voltages to be supplied to the pixel electrodes 121*a* are controlled in accordance with the output signals to be supplied to corresponding data signal lines SL1 through SLn, respectively, while the corresponding scanning signal line GLj is selected. This allows the transmittances of the respective pixels PIX(1, j) through PIX(n, j) to be controlled, such that respective brightness are determined.

Note that the scanning signal line driving circuit 4 sequentially selects the scanning signal lines GLl through GLm. Accordingly, the entire pixels PIX(1, 1) through PIX(n, m) of the pixel array 2 can be set so as to have respective brightness which their respective image data D indicates, thereby permitting updating of the image to be displayed by the pixel array 2.

In the image display apparatus 1, an image signal DAT supplied from an image signal source S0 to the modulation driving process section 21 may be transmitted in frame unit (in a unit of full screen). Alternatively, the image signal DAT may be transmitted for every plural fields into which one frame is divided. The following description deals with a case as an example where the image signal DAT is transmitted for every plural fields.

More specifically, in the present embodiment, the image signal DAT, supplied from the image signal source S0 to the modulation driving process section 21, is transmitted for every plural fields (for example, for every two (2) fields) into which one frame is divided.

More concretely, when transmitting the image signal DAT to the modulation driving process section 21 of the image display apparatus 1 via an image signal line VL, the image signal source S0 transmits the entire image data for a specific field, and thereafter transmits image data for the next field, for example. Thus, the image signal source S0 transmits image data for respective fields in a time-sharing manner.

The field is made of a plurality of horizontal lines. For example, in a specific field, via the image signal line VL, entire image data for a specific horizontal line are transmitted and thereafter image data for a horizontal line to be transmitted next are transmitted. Thus, the image data for the respective horizontal lines are transmitted in a time-sharing manner.

Note in the present embodiment that one frame is constituted by two fields. Among the horizontal lines constituting one frame, image data of an even-numbered horizontal line is transmitted in an even field. Image data of an odd-numbered horizontal line is transmitted in an odd field. Further, when transmitting image data corresponding to the amount of one horizontal line, the image signal source S0 also drives the image signal line VL in a time-sharing manner. This allows the respective image data to be sequentially transmitted in a predetermined order.

For example, in the case of a liquid crystal television, the image signal source S0 corresponds to a tuner section that selects a channel of a television broadcasting signal, and that outputs the television broadcasting signal of the channel thus selected. For example, in the case of a liquid crystal monitor that displays an image signal from an external device such as a computer, the image signal source S0 corresponds to a signal processing section that processes an image signal from the external device, and that outputs a monitor signal thus processed.

Figure 1:
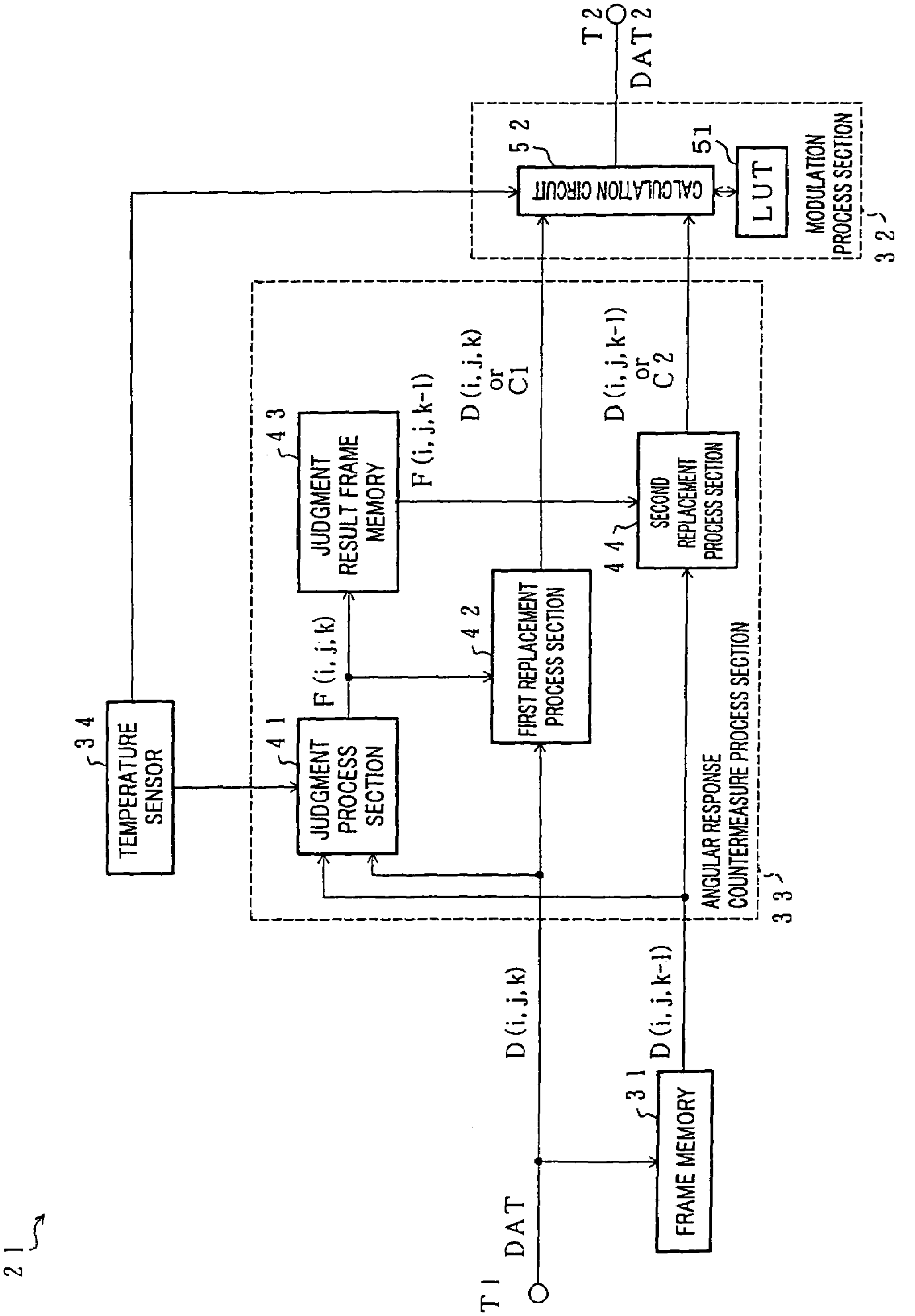
FIG. 1 is a block diagram showing a main part of a modulation driving process section of an image display apparatus, FIG. 1 showing an embodiment in accordance with the present invention.

The modulation driving process section 21 of the present embodiment, as shown in FIG. 1, includes (i) a frame memory 31 that stores image data, corresponding to the amount of one frame, to be supplied via an input terminal T1, and (ii) a modulation process section 32 that executes a correcting step in which image data of a desired target frame FR(k) is modulated in accordance with two image data so as to facilitate a gradation transition from a current frame FR(k−1) to the desired target frame FR(k), and in which the image data (correction image data) thus modulated is outputted via an output terminal T2. The two image data are (a) first image data of the desired target frame FR(k) to be supplied via the input terminal Ti1 and (b) second image data to be supplied to a same pixel PIX(i, j) to which the first image data are supplied, respectively, the second image data being image data of the current frame FR(k−1) that have been read out from the frame memory 31. Note that the image data DAT2 outputted via the output terminal T2 are supplied to the control circuit 12 shown in FIG. 2. The data signal line driving circuit 3 drives the respective pixels PIX(i, j) in response to the correction image signal DAT2.

On this account, even when the response speed of the liquid crystal cell 111 is slow, by enhancing the gradation transition from the current frame FR(k−1) to the desired target frame FR(k), it is possible for the brightness of the pixel PIX(i, j) to reach a target gradation (a gradation which image data D(i, j, k) of the desired target frame FR(k) indicates) in a shorter period of time.

With regard to an image display apparatus which includes a liquid cell of a vertically aligned mode and drives the liquid crystal cell with facilitation of the gradation transition, researches have been conducted by inventors of an embodiment of the present invention so as to realize the improvement in the display quality. The inventors found that (i) areas in which response speeds are different coexist in the pixel PIX(i, j), when making descend the liquid crystal molecules that almost vertically aligned in a liquid crystal cell of a vertically aligned mode, and (ii) in this case, no matter what degree the facilitation of the gradation transition is set, (a) the occurrence of excessive brightness causes the display quality to deteriorate or (b) the occurrence of angular response causes the pixel PIX(i, j) not to reach a target gradation value in a few frames, thereby drastically deteriorating the display quality. In view of the circumstances, the inventors have arrived at the image display apparatus 1 including an angular response countermeasure process section 33 (see FIG. 1) so as to improve the response speed of the pixel PIX(i, j), without the occurrence of the excessive brightness.

More specifically, as has been earlier described, according to the pixel array 2 of the present embodiment, a liquid crystal cell of a vertically aligned mode is adopted as the liquid crystal cell 111, and the liquid crystal cell 111 is used in a normally black mode in which the black display is carried out when no voltage is supplied. In the liquid crystal cell 111, as has been earlier described, the liquid crystal molecules in the area (see an area indicated by A1 in FIG. 7) in the vicinity of the sequence of the projections 123*a* and in the area (see an area indicated by A2 in FIG. 7) are affected by the oblique electric field, and the liquid crystal molecules obliquely align.

In contrast, the liquid crystal molecules in an area B away from the sequence of the projections 123*a* and the slits 123*b* align in a direction that will be determined after the liquid crystal molecules in the areas A1 and A2 (hereinafter, referred to as the area A) align. This is because of the continuity of the liquid crystal. This causes the response speed in the area B to be slower than that in the area A.

Note that, even in the area B, when the alignment direction of the liquid crystal molecules (the in-plane component in the alignment direction) is already determined, the difference between the response speeds in the respective areas A and B is relatively small. However, when no voltage is supplied to the pixel electrode 121*a*, the liquid crystal molecules in the respective areas A and B almost vertically align, and the alignment direction is not yet determined, no matter what domain the liquid crystal molecules belong to. Even in cases where a voltage is supplied to the pixel electrode 121*a*, when such a voltage is small like cases where a voltage for carrying out a gradation display of not more than 32-gradation is supplied in a pixel array 2 capable of carrying out a 256-gradation display, the liquid crystal molecules whose alignment direction is not determined remain among the liquid crystal molecules in the area B.

Since these remaining liquid crystal molecules have no determined alignment direction, the alignment direction and its tilt angle will be determined, respectively, after the supplied voltage increases. As a result, the response speed becomes slow as compared with the liquid crystal molecules which need to determine only the tilt angle because the alignment direction has already been determined.

Figure 8:
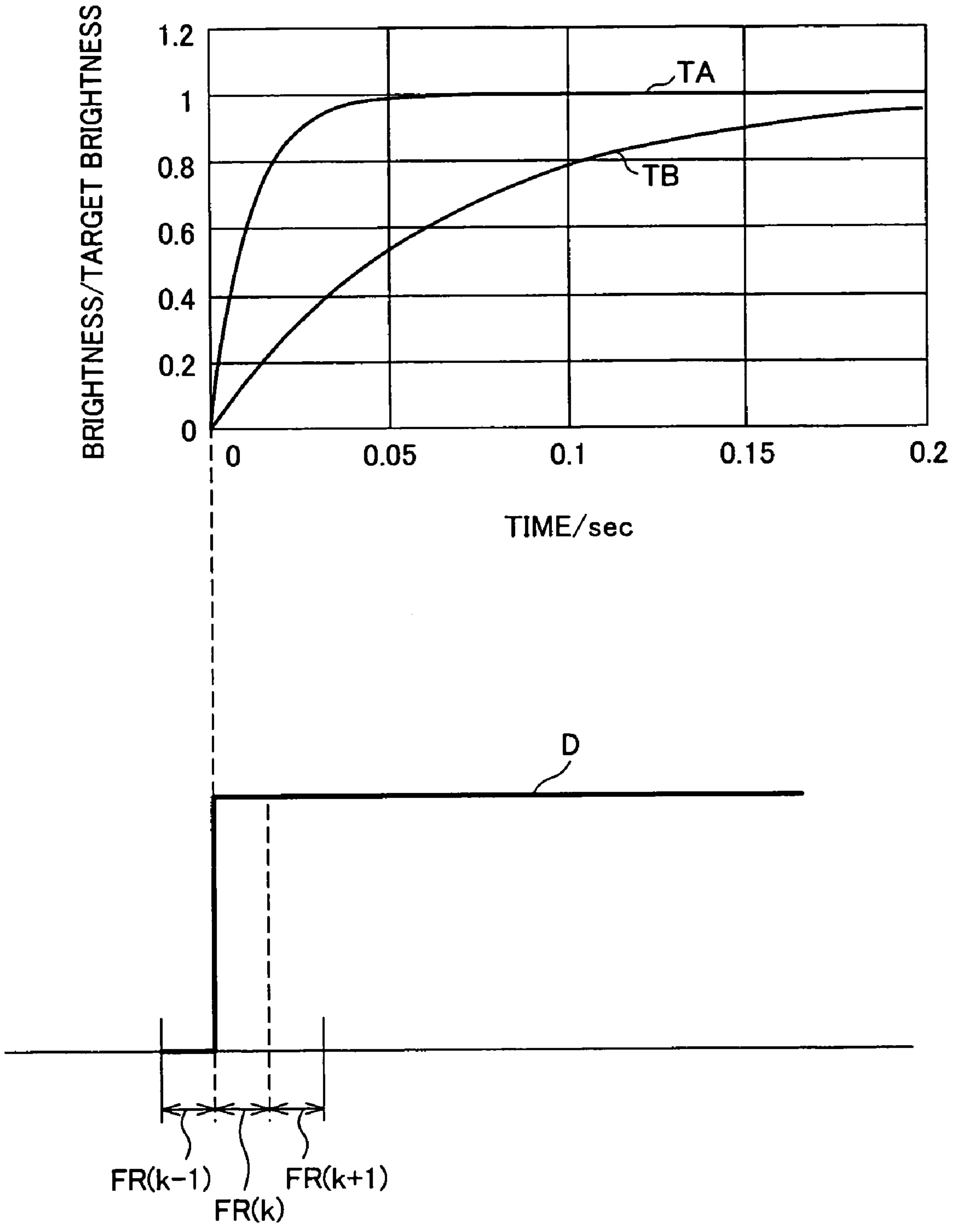
FIG. 8 is a graph showing how the brightness of each area and image data for driving the pixel change with time, respectively, when no gradation transition is facilitated.

In a pixel array 2 capable of carrying out a 256-gradation display, like a gradation transition in which a gradation changes from not more than 32-gradation to more than 32-gradation, in cases of increasing a tilt angle of the liquid crystal molecules starting from a state in which a low voltage is supplied between the electrodes 121*a* and 121*b*, the difference between the response speeds in the areas A and B drastically becomes great as compared with cases where a current gradation level is a gradation level of more than 32-gradation (for example, see FIG. 8). Note that FIG. 8 is a graph showing (i) image data D corresponding to a case where the pixel PIX(i, j) is driven from 0-gradation to 96-gradation, and (ii) brightness TA and TB in the respective areas A and B. Note also that the brightness is normalized so as to correspond to its target brightness (here, an example of 96-gradation brightness) shown in FIG. 8 through FIG. 10, FIG. 15, and FIG. 17, respectively.

Figure 9:
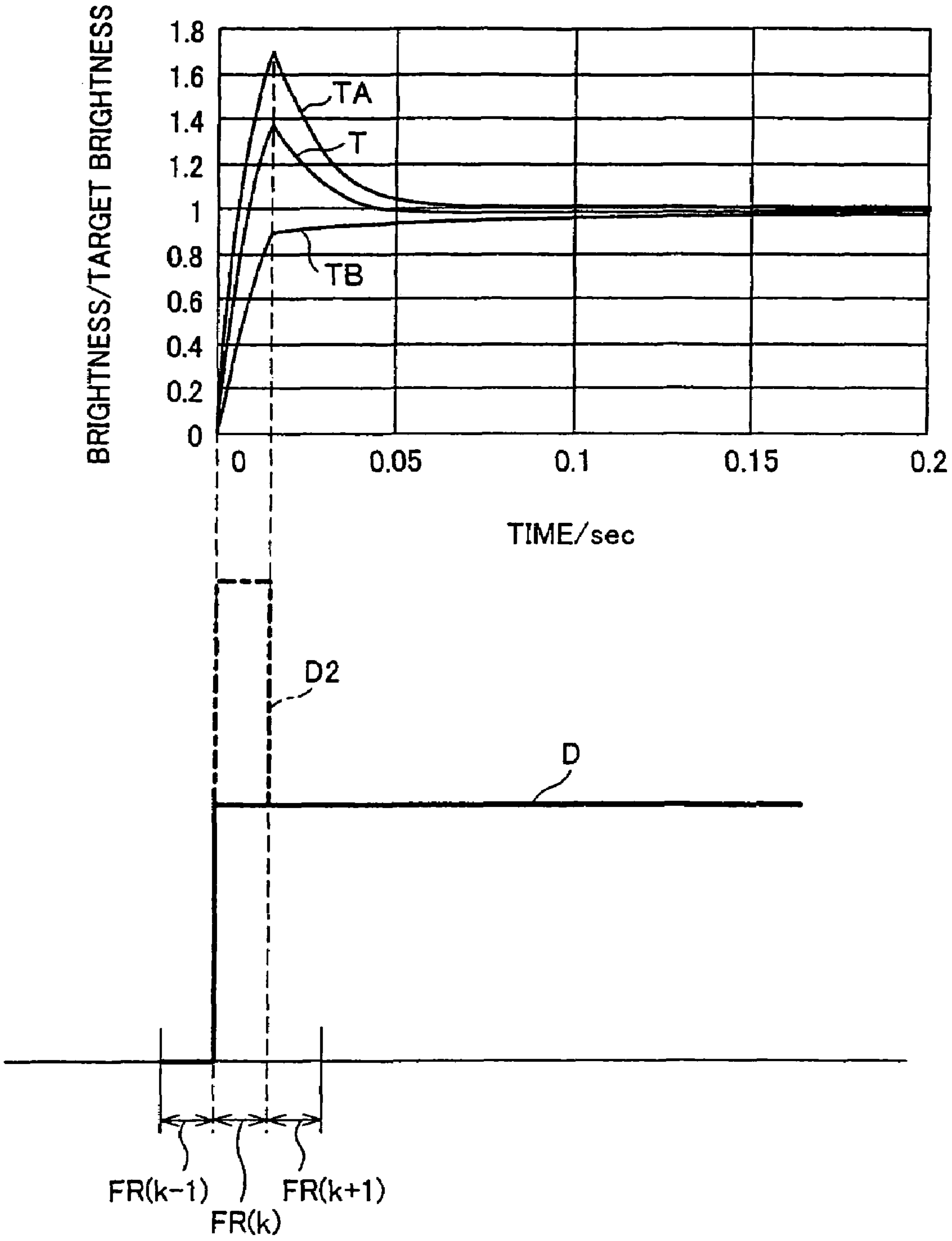
FIG. 9 is a graph showing how the brightness of each of the areas, the brightness of a pixel, and image data for driving the pixel change with time, respectively, when a gradation transition is facilitated so as to respond to an supplied voltage by one frame during driving a liquid crystal cell.

In this case, as shown in FIG. 9, when facilitating a gradation transition to such a degree as to reach a target gradation of the brightness TB in the area B (a gradation which the image data D(i, j, k) of the desired target frame FR(k)) indicate), the brightness TA in the area A drastically exceeds its target gradation. In spite of the fact that the excessive brightness is hard to be viewed and recognized by the user, this causes the excessive brightness in the area A to be viewed and recognized as a excessive brightness, because the area occupied by the area A is smaller than that of the entire pixel PIX(i, j).

Figure 10:
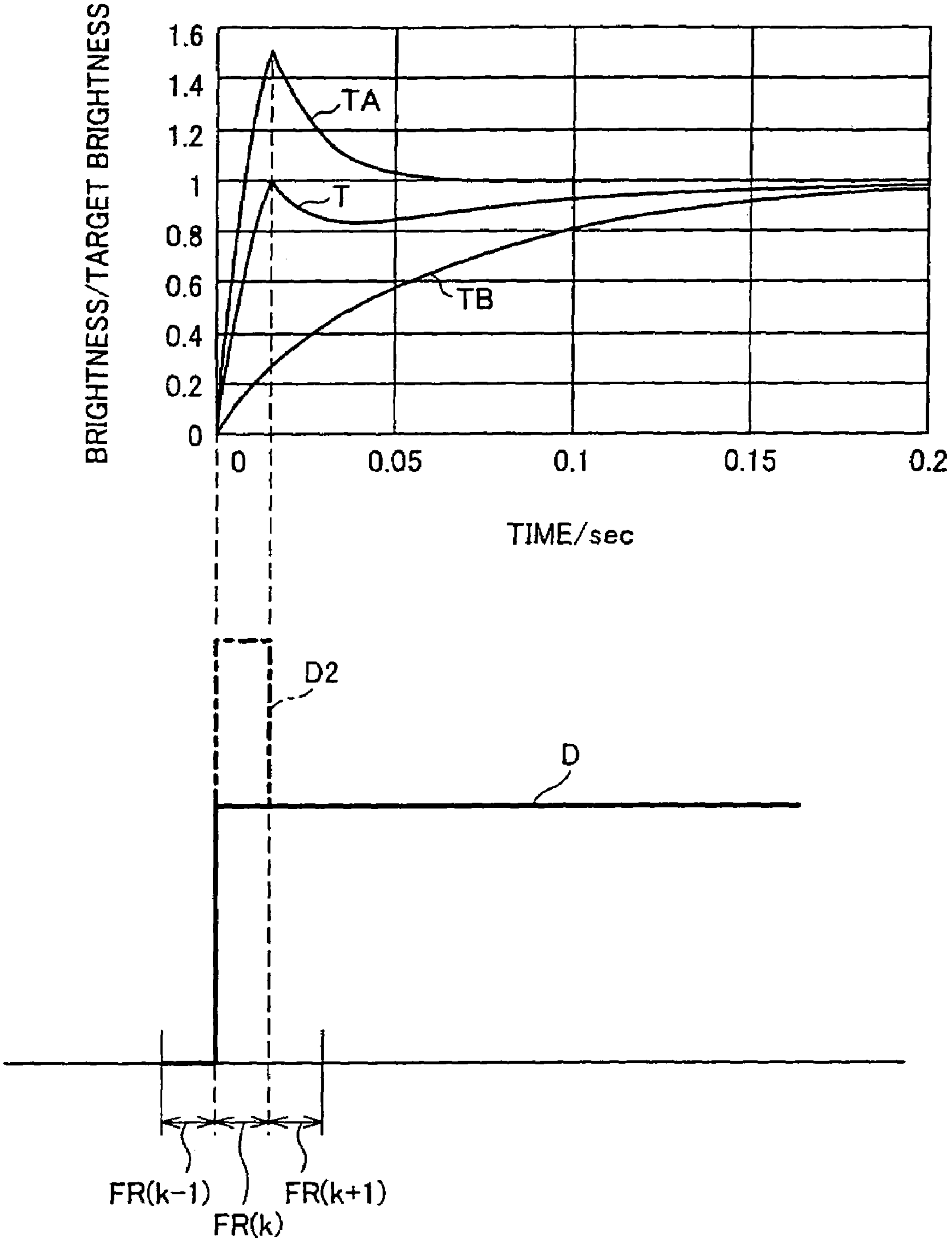
FIG. 10 is a graph showing how the brightness of each area, the brightness of a pixel, and image data for driving the pixel change with time, respectively, when a gradation transition is facilitated to such a degree that no excessive brightness occurs.

In contrast, as shown in FIG. 10, when controlling the facilitation of the gradation transition to such a degree that the excessive brightness is not viewed and recognized by the user even when the brightness TA in the area A exceeds its target gradation, the brightness TB in the area B can not reach its target gradation in succeeding several frames. As a result, when viewing the entire pixel PIX(i, j), the brightness T of the pixel PIX(i, j) dips from its target value in the succeeding several frames. This causes the user of the image display apparatus 1 to perceive it as a black trail.

In the present specification, this phenomenon is referred to as an angular response in which, even if the gradation transition is facilitated so as to drive the pixel PIX(i, j), the gradation of the pixel PIX(i, j) can not reach a target gradation in the succeeding several frames. This is because the response speeds are drastically different from area to area in the pixel.

Thus, in cases where the areas in which response speeds are drastically different from each other coexist, an excessive brightness or an angular response occurs in an arrangement in which a gradation transition is facilitated in accordance with the image data D(i, j, k) and D(i, j, k−1), without correcting the image data D(i, j, k) of the desired target frame FR(k) and the image data D(i, j, k−1) of the current frame FR(k−1).

Note that the display quality is less reduced in the occurrence of the angular response than in the occurrence of the excessive brightness. In the following arrangement without angular response countermeasure process section 33, the facilitation of the gradation transition cannot help but be controlled to such a degree that no excessive brightness occurs. This causes the display gradation of the pixel PIX(i, j) to dip from a target gradation in the succeeding several frames.

In contrast, the modulation driving process section 21 of the present embodiment includes an angular response countermeasure process section 33 that corrects the image data D(i, j, k) and D(i, j, k−1) to be supplied to the modulation process section 32, thereby controlling (suppressing) the angular response.

More specifically, the angular response countermeasure process section 33 includes a judgment process section 41 that carries out a judgment step, a first replacement process section 42 (one example of first replacement means, and adjusting means) that carries out a first replacement step, a judgment result frame memory 43, and a second replacement process section 44 (one example of second replacement means, and adjusting means) that carries out a second replacement step. The judgment process section 41 judges whether or not a combination of the image data D(i, j, k) and D(i, j, k−1), which are supplied via the input terminal T1 and the frame memory 31, respectively, corresponds to a specific predetermined combination that corresponds to an area in which an angular response occurs.

When a judgment result F(i, j, k) of the desired target frame FR(k) indicates that the combination corresponds to the specific combination (in the case of truth in the judgment), the first replacement process section 42 outputs to the modulation process section 32 a predetermined first value C1 in place of the image data D(i, j, k) of the desired target frame FR(k). The judgment result frame memory 43 stores the judgment result F(i, j, k) of the desired target frame FR(k) corresponding to the amount of one frame. When a judgment result F(i, j, k−1) of the current frame FR(k−1) that is read out from the judgment result frame memory 43 is true, the second replacement process section 44 outputs to the modulation process section 32 a predetermined second value C2 in place of the image data D(i, j, k−1) of the current frame FR(k−1).

Note that the specific combination (the area in which the angular response occurs) corresponds to a combination in which the response speeds of the respective liquid crystal molecules in the pixel are greatly different from each other. According to this combination, when the modulation driving process section 21 generates without correcting the image data D(i, j, k) and D(i, j, k−1), it is supposed that (i) the excessive brightness occurs or (ii) the angular response occurs such that the display gradation of the pixel PIX(i, j) comes short in at least succeeding several frames.

According to the present embodiment, an area in which the angular response occurs is set as a combination that (i) causes at least three (3) frames to be taken for an arrival gradation in the area B to reach its target gradation, when facilitating the gradation transition to such a degree that the arrival gradation in the area A does not exceed 110 percent of a target gradation in the area A, and (ii) causes an arrival gradation in the area A to exceed 110 percent of a target gradation in the area A when facilitating the gradation transition to such a degree that it takes less than three (3) frames for an arrival gradation in the area B to reach its target gradation.

Note also that the first value C1 is specified beforehand such that a combination of the image data D(i, j, k) of the desired target frame FR(k) and image data D(i, j, k+1) does not correspond to the specific combination, regardless of the image data D(i, j, k+1) of the next frame FR(k+1).

Note that the second value C2 is specified beforehand as a gradation which the foregoing boundary area B of the PIX((i, j) reaches when image data D(i, j, k−2) of the previous frame FR(k−2) is replaced with the first value C1 in the case of facilitating a gradation transition from a previous frame FR(k−2) to a current frame FR(k−1).

According to the present embodiment, further provided is a temperature sensor 34 for measuring a temperature of the panel 11 of the image display apparatus 1. The judgment process section 41 changes the specific combination in accordance with the temperature measured by the temperature sensor 34. The modulation process section 32 of the present embodiment changes a degree to which the gradation transition should be facilitated in accordance with the temperature measured by the temperature sensor 34.

With the arrangement, the judgment process section 41 can judge whether or not the gradation transition from a current frame FR(k−1) to a desired target frame FR(k) belongs to the specific combination (an area in which an angular response occurs) without any problem even when the response speed of the liquid crystal cell 111 changes and an area in which an angular response occurs changes accordingly. The modulation process section 32 can facilitate, without any problem, the gradation transition to such a degree as to be suitable for an actual panel temperature, even when the response speed changes due to the fluctuation of the panel temperature and a degree of the facilitation of an appropriate gradation transition changes accordingly.

The modulation process section 32 of the present embodiment includes a LUT (Look Up Table) 51. The LUT 51 stores correction image data D2(i, j, k) to be outputted in response to an inputted combination of the image data D(i, j, k−1) of the current frame FR(k−1) and the image data D(i, j, k) of the desired target frame FR(k). On this account, it is possible to accurately output data in accordance with the combination of the inputted image data D(i, j, k−1) and D(i, j, k) with a relatively small sized circuit, even in cases where it is not possible to calculate, with a small sized circuit, a formula for approximating the data corresponding to each of the combinations with high accuracy.

Note that the modulation process section 32 may derive the image data D2(i, j, k) by storing in the LUT 51 a plurality of data corresponding to all of the combinations of image data D(i, j, k−1) and D(i, j, k), and outputting the data (the correction image data D2(i, j, k)) which corresponds to the inputted combination. However, the present invention is not limited to this. More specifically, in the present embodiment, in order to reduce the memory capacity required for the LUT 51, (i) the arrival gradations stored in the LUT 51 are not for all of the combinations but are limited to predetermined combinations, and (ii) the modulation process section 32 derives the correction image data D2(i, j, k) from interpolation calculations. Because of this, the modulation process section 32 includes a calculation circuit 52 that (i) interpolates the correction image data corresponding to each of the combinations stored in the LUT 51, and (ii) calculates the correction image data D2(i, j, k) corresponding to the combination of image data D(i, j, k−1) and D(i, j, k). The following is an example.

The image data D(i, j, k−1) of the current frame FR(k−1) and the image data D(i, j, k) of the desired target frame FR(k) are divided into eight areas, respectively. Correction image data are stored for combinations of (i) nine image data D(i, j, k) that become both ends of the respective eight areas, and (ii) nine image data D(i, j, k−1) that become both ends of the respective eight areas.

The present embodiment includes a plurality of LUTs 51 such that change the correction image data D2(i, j, k) is changed in response to the temperature sensor 34. During deriving of the correction image data D2(i, j, k), the calculation circuit 52 switches and selects the LUTs 51 in response to the temperature sensor 34.

For example, in the present embodiment, the modulation process section 32 of the present embodiment includes four LUTs 51 for 5, 10, 15, and 20 degrees centigrade, respectively, and the calculation circuit 52 switches and selects the LUTs 51 in response to the temperature sensor 34. Note that the calculation circuit 52 may derive the correction image data D2(i, j, k) by referring only to a LUT 51 for a temperature that is proximate to a temperature (an actual panel temperature) which the temperature sensor 34 indicates. Alternatively, the calculation circuit 52 may derive the correction image data D2(i, j, k) by (i) referring to two LUTs 51 for respective temperatures that are close to the actual panel temperature, and (ii) interpolating between the two correction image data that are calculated from the two LUTs 51. Note that FIG. 11 through FIG. 14 respectively show the numerical values of the correction image data D2(i, j, k) corresponding to the respective combinations of the image data D(i, j, k−1) of the current frame FR(k−1) and the image data D(i, j, k) of the desired target current frame FR(k), in cases where the image data D can express the 256-gradation (i.e., in cases of 8-bit image data D).

In a comparative example of an image display apparatus in which the angular response countermeasure process section 33 is removed, it was confirmed by experiments that areas in which the angular response occurs corresponded to an area X enclosed by a broken line and an area Y enclosed by a dashed line for each temperature in FIG. 11 through FIG. 14. Note that it is possible to perceive from the measured brightness the occurrence of the angular response in the area Y in FIG. 11 through FIG. 14, but, in the area Y, the angular response occurs to such a degree that the user does not perceive the deterioration of the display quality. In contrast, in the area X, the user perceives the deterioration of the display quality due to the angular response.

For example, it may be possible to judge to be or not to be the specific combination in accordance with a LUT that stores information as to whether each of the combinations of the image data D(i, j, k−1) of the current frame FR(k−1) and the image data D(i, j, k) of the desired target frame FR(k) corresponds to the area X or the area Y. However, in the present embodiment, in order to reduce the circuit size, the judgment process section 41 determines that a combination corresponds to the specific combination only when (i) the image data D(i, j, k−1) is smaller than a threshold value T1, (ii) the image data D(i, j, k) falls within a predetermined range, and (iii) the image data D(i, j, k−1) is smaller than the image data D(i, j, k).

The judgment process section 41 of the present embodiment changes, in accordance with the panel temperature, the judgment whether or not a combination corresponds to an area in which an angular response occurs. In cases where the current panel temperature is not less than 15 degrees centigrade, a combination is determined to be the area in which the angular response occurs, when 0□D(i, j, k−1)<32, 16□D(i, j, k)<96, and D(i, j, k−1)<D(i, j, k) are respectively satisfied. Further, in cases where the current panel temperature is less than 15 degrees centigrade, a combination is determined to be the area in which the angular response occurs, when 0□D(i, j, k−1)<32, 32□D(i, j, k)<160, and D(i, j, k−1)<D(i, j, k) are respectively satisfied.

Further, in the present embodiment, the first value C1 is set as an upper limit value (a threshold value: 32-gradation) of the area in which the angular response occurs. The second value C2 is set so as to be equal to the first value C1 (32-gradation). In the LUT 51 of the modulation process section 32, the correction image data D2(i, j, k) for causing the area B (see FIG. 7) of the PIX(i, j) to have the first value C1 is stored in a memory area corresponding to D(i, j, k−1)=C2.

With the arrangement, when the gradation transition from the current frame FR(k−1) to the desired target frame FR(k) corresponds to an area in which the angular response occurs, the judgment process section 41 instructs the first replacement process section 42 such that the image data D(i, j, k) of the desired target frame FR(k) is replaced with the first value C1.

Figure 15:
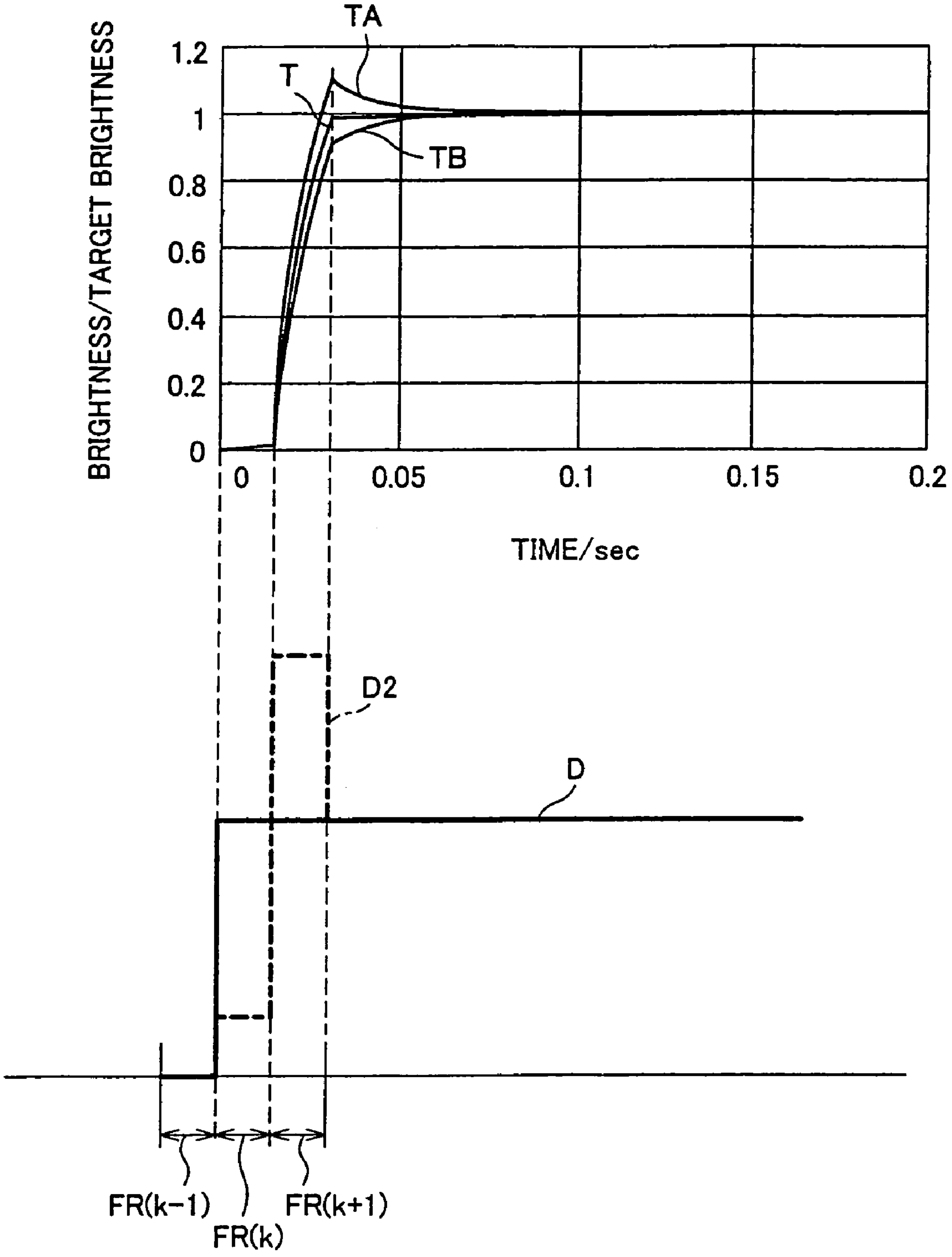
FIG. 15 is a graph showing how the brightness of each area, the brightness of a pixel, and image data for driving the pixel change with time, respectively.

On this account, for example, like FIG. 10, when an image signal DAT, which causes a gradation transition of the pixel PIX(i, j) from 0 to 96 to occur and to maintain the gradation of 96, is supplied, the judgment process section 41 outputs a judgment result F(i, j, k) indicative of true to the first replacement process section 42. As a result, as shown in FIG. 15, in the desired target frame FR(k), the modulation process section 32 (i) receives, as the image data D(i, j, k−1) of the current frame FR(k−1), 0-gradation, and (ii) receives, as the image data D(i, j, k) of the desired target frame FR(k), 32-gradation (=C1). The modulation process section 32, as indicated by D2 in FIG. 15, facilitates a gradation transition from 0-gradation to 32-gradation.

Figure 7:
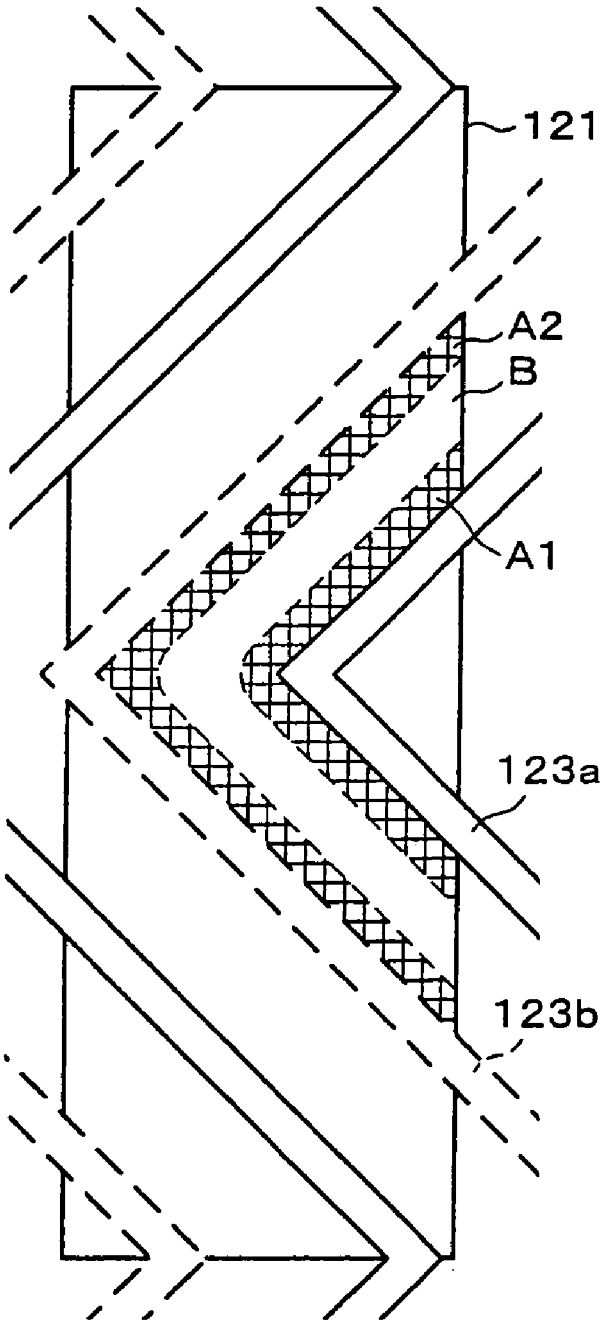
FIG. 7 is an explanatory diagram showing how areas, in which response speeds are fast or slow, respectively, distribute in the liquid crystal cell.

Note that because the gradation transition from 0-gradation to 32-gradation falls within an area in which the angular response occurs, the gradation in the area A drastically exceeds the 32-gradation, when the modulation process section 32 facilitates the gradation transition such that the area B shown in FIG. 7 becomes 32-gradation. This causes the entire pixels PIX(i, j) to exceed the 32-gradation. However, as described above, the gradation transition will not be perceived as an excessive brightness by the user, because the actual image data D(i, j, k) of the desired target frame FR(k) has 96-gradation.

Meanwhile, the judgment result F(i, j, k) is accumulated by the judgment result frame memory 43, and is stored till the next frame FR(k+1). In the next frame FR(k+1), the judgment result F(i, j, k) is outputted to the second replacement process section 44 as the judgment result F(i, j, k) of the current frame FR(k). Thus, in the next frame FR(k+1), the image data D(i, j, k+1) of the desired target frame FR(k+1) is supplied to the modulation process section 32 as it is, and the image data D(i, j, k) of the current frame FR(k) is replaced with the second value C2. Accordingly, in the case of FIG. 15, the modulation process section 32 corrects the image data D(i, j, k+1) of the desired target frame FR(k+1) so as to facilitate the transition from 32-gradation to 96-gradation.

Note that the driving in the frame FR(k) allows the gradation transition from the frame FR(k) to the frame FR(k+1) to be away from an area in which the angular response occurs. Thus, the pixel PIX(i, j) is in a state, at the end of the frame FR(k), in which scarcely any difference exists between the response speeds in the respective areas A and B, i.e., when appropriately facilitating the gradation transition, a state can be realized in which neither excessive brightness nor angular response occurs in the pixel PIX(i, j) and the area B can respond at an enough speed. Accordingly, in the frame FR(k+1), when the pixel PIX(i, j) is driven in accordance with the correction image data D2(i, j, k+1), the brightness of the pixel PIX(i, j) can reach its target gradation (96-gradation) without any excessive brightness and any black trail.

Thus, the modulation driving process section 21 of the present embodiment adjusts a gradation transition of the desired target frame FR(k) to be clamped to a preliminary gradation transition, when the gradation transition from the current frame FR(k−1) to the desired target frame FR(k) corresponds to (belongs to) a gradation transition in an area in which the angular response occurs. More specifically, the gradation in the area B in which the response speed is slow is adjusted so as to reach near a gradation (i) which the image data D(i, j, k) of the desired target frame FR(k) indicates and (ii) which does not cause the display gradations of the entire pixels PIX(i, j) to substantially change.

On this account, unlike the case shown in FIG. 9, no excessive brightness occurs. Furthermore, it is possible to shorten the response time of the pixel PIX(i, j) as compared with the case shown in FIG. 10, thereby suppressing the occurrence of the black trail. FIG. 15 deals with the case where the gradation transition occurs from 0-gradation to 96-gradation. In contrast, in the frame FR(k), irrespective of the gradation of the image data D(i, j, k) of the desired target frame FR(k), the gradation transition is facilitated such that the gradation in the area B shown in FIG. 7 reaches the first value C1. Accordingly, like the transition from 0-gradation to 32-gradation, in cases where the gradation of the image data D(i, j, k) of the desired target frame FR(k) is close to the first value C1, it is likely that the brightness of the pixel PIX(i, j) in the frame FR(k) exceeds the image data D(i, j, k).

Even in this case, in an arrangement in which no angular response countermeasure process section 33 is provided, the amount of occurrence of the excessive brightness is drastically suppressed, as compared with a case where the gradation transition is facilitated to such a degree that the pixels PIX(i, j) have the above same response speed. Further, in this case, the gradation of the image data D(i, j, k) of the desired target frame FR(k) is close to the first value C1, and is a relatively low gradation. In the present embodiment, the first value C1 is set to 32-gradation, the 32-gradation being such a fully dark gradation that is less than 1 present of the white brightness in a general gamma setting (for example, 2.2). Accordingly, it is hard for the user to perceive the gradation as an excessive brightness even if such an excessive brightness occurs. As is clear from this, the above arrangement ensures the display quality that is substantially similar to that of an arrangement in which the angular response countermeasure process section 33 is not provided, and further ensures to improve the response speed.

Further, in the present embodiment, the first value C1 is set to an upper limit value of the area in which the angular response occurs, among the values (0, 16, 32, . . . , 255, in FIG. 11 through FIG. 14) of the correction image data, corresponding to the combination of the image data D(i, j, k−1) and D(i, j, k), stored in the LUT 51. Note that the upper limit value of the area in which the angular response occurs is a minimum gradation among such gradations that no combination of a current gradation and a desired target gradation corresponds to (belongs to) the area in which the angular response occurs, irrespective of which gradation comes next. This ensures to avoid the occurrence of the excessive brightness in almost of the area in which the angular response occurs.

In addition, the above description deals with the case where (i) the second value C2 is set so as to be equal to the first value C1, and (ii) the correction image data D2(i, j, k) for causing the area B (see FIG. 7) of the PIX(i, j) to have the first value C1 is stored in the memory area corresponding to D(i, j, k−1)=C2 in the LUT 51 of the modulation process section 32. However, the present invention is not limited to this case. For example, it may be arranged such that (i) the correction image data D2(i, j, k) for causing the entire of the PIX(i, j) to have the first value C1 is stored in the memory area corresponding to D(i, j, k−1)=C2 in the LUT 51 of the modulation process section 32, and (ii) the second value C2 is set to a gradation (for example, 24-gradation) which the correction image data D2(i, j, k) causes the area B of the PIX(i, j) to have. In this case, subtle angular response occurs during the second gradation transition, i.e., during a gradation in which the second replacement process section 44 replaces the image data D(i, j, k) of the current frame FR(k) with the second value C2, but it is possible to perfectly avoid the occurrence of the excessive brightness.

(Second Embodiment)

The first embodiment has dealt with the case where (i) when it is judged to be an area in which an angular response occurs, the image data D(i, j, k) of the desired target frame FR(k) is replaced with a constant value (the first value C1) in a desired target frame FR(k), and (ii) the image data D(i, j, k) of the current frame FR(k) is replaced with another constant value (the second value C2) in the next frame FR(k+1). The way to adjust each degree of the facilitation of the gradation transition in each of the frames FR(k) and FR(k+1) is not limited to this. In cases where a combination of a current gradation and a desired target gradation corresponds to a predetermined combination that causes the deterioration of the display quality because the response speeds are different from area to area, the similar effect is obtainable when adjusting (one example of an adjusting step) both the degree of the facilitation of the desired target gradation transition and the degree of the facilitation of the next gradation transition so as to reduce the deterioration of the display quality.

More specifically, in cases where areas in which response speeds are different from each other coexist in a pixel, when a degree of the facilitation of the gradation transition is set so as to be optimum to one area, such a degree is not optimum to the other area. Thus, when trying to carry out a gradation transition of the pixel to a desired target gradation via a single facilitation of the gradation transition, (i) an area in which an excessive brightness occurs comes out in the pixel because the gradation transition is facilitated too much or (ii) a response time increases and a black trail etc. occurs because the gradation transition is not fully facilitated. This causes the display quality to deteriorate.

However, with the above arrangement, when a combination of the current gradation and the desired target gradation corresponds to the predetermined combination that causes the deterioration of the display quality because the response speeds are different from area to area, both the degree of the facilitation of the desired target gradation transition and the degree of the facilitation of the next gradation transition are respectively adjusted.

By thus adjusting both the degree of the facilitation of the desired target gradation transition and the degree of the facilitation of the next gradation transition, the gradation transition of the pixel to the desired target gradation transition is carried out. This ensures to reduce the degree of the occurrence of the excessive brightness as compared with a case where, in the arrangement in which a desired target gradation is tried via a single facilitation of the gradation transition although the combination of the current gradation and the desired target gradation corresponds to the above first combination, a degree of the facilitation of the gradation transition is set such that a response time is equal to that of the present embodiment. Thus, a liquid crystal display apparatus having higher display quality is realized.

The present embodiment deals with another way of adjustment in which, when it is judged to be the area in which the angular response occurs, in a current frame FR(k), (i) a predetermined value a is added to image data D(i, j, k) of the frame FR(k), and (ii) a predetermined value β is subtracted from the image data D(i, j, k) of the current frame FR(k) in the next frame FR(k+1).

Figure 16:
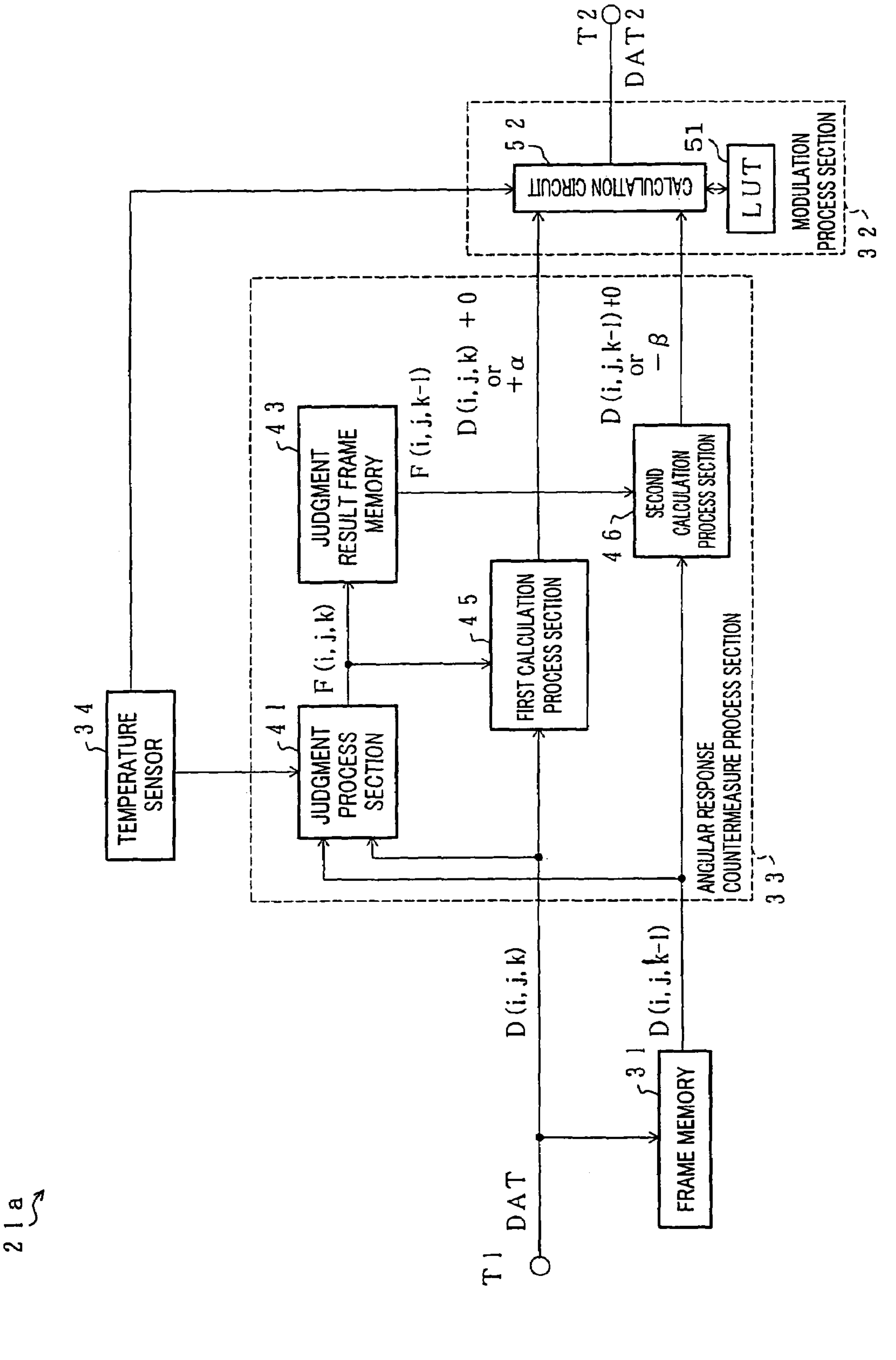
FIG. 16 is a block diagram showing a main part of an modulation driving process section of an image display apparatus.

Namely, as shown in FIG. 16, a modulation driving process section 21*a* has an arrangement similar to the modulation driving process section 21 except that first and second calculation process sections 45 and 46 (one example of first and second calculation means, and adjusting means) are provided in place of the first and second replacement process sections 42 and 44, respectively. The first calculation section 45 adds the value a to the image data D(i, j, k) of the desired target frame FR(k) (one example of a first calculating step, and adjusting step), when a judgment result F(i, j, k) outputted from a judgment process section 41 indicates true. The second calculation section 46 subtracts the value β from image data D(i, j, k−1) of the frame FR(k−1) (one example of a second calculating step, and adjusting step), when a judgment result F(i, j, k−1) outputted from a judgment result frame memory 43 indicates true.

Note that it is preferable to set the values α and β as large as possible within such a range that no excessive brightness occurs. According to the present embodiment, the range in which no excessive brightness occurs is set to such a range that the gradation to be reached in the area A does not exceed 110 percent of the target gradation.

The following description deals with determining the values α and β, and the grounds therefor. A first, the way to optimize the values α and β is as follows.

When the primary purpose is to improve the response speed, it would seem to be preferable that the values α and β are set to be as large as possible. However, this is not preferable because an observer perceives an excessive brightness and a black trail, when an error of not less than 10 percent of a target gradation occurs.

A response error caused by the value α may be corrected by the value β in a succeeding field. However, a response error caused by the value β will not be corrected in another succeeding field.

Furthermore, in order to effectively function the value β, it is necessary for a gradation in the area B in which the response speed is slow to be fully pulled up. As such, as to the value α that is used before the value β, it is preferable to set it as large as possible.

In view of the circumstances, the values α and β are set such that the excessive brightness and the black trail are not outstanding, and such that a gradation reaches within a range from 90 percent to 110 percent of the target gradation. It is more preferable to set the value α such that the gradation in the area B fully uprises in response to the first correction, and such that a gradation reaches a value within a range from 100 percent to 110 percent of the target gradation. It is most preferable to set the value α such that a gradation reaches a value within a range of from 105 percent to 110 percent of the target gradation.

It is preferable to set the value β such that a gradation reaches a value within a range from 95 percent to 105 percent of the target gradation. This is because a correction based on the value β is a final one. It is more preferable to set the value β such that a gradation reaches a value within a range from 100 percent to 105 percent of the target gradation.

The above description deals with the case where the tolerance limit of the perception is set to about 10 percent. Note that this tolerance limit, in some degree, varies in accordance with how the liquid crystal panel is used.

In other words, it is necessary for the error to be less than 10 percent for a high definition television, a PC monitor, or the like. This is because the observer's tolerance for the image is low. In contrast, with respect to a small-size television, a mobile television, or the like, it is often preferable that the error is set to such a value that the response speed becomes faster, even if the error exceeds 10 percent in some degree. This is because a request for clearly reading target information relatively or the like becomes great, as compared with a request for the high grade such as the smoothness of image.

Note that it is likely that the optimum values α and β differ from gradation to gradation, because the response speed differs from gradation to gradation. It is not so preferable that optimum correcting values for various gradations are stored in a separate memory devices. This is because the increasing of the scale of the circuitry for storing values causes a great cost rise, whereas it permits much less relative improvement in the response speed.

As such, in view of the circumstances, it is preferable to set fixed values α and β that are appropriately adjusted such that more gradations fall within an optimum correcting range in a gradation region adopting the correcting values. It should be appreciated that the fixed values α and β can further be varied in accordance with the temperature. This is because such variation in accordance with the temperature does not cause a controversial cost rise.

Concrete examples of the values α and β are as follows.

The value α satisfies $-16<\alpha<16$ when the image data D(i, j, k) can express 265-gradation. It is preferable to satisfy $2<\alpha<16$. It is more preferable to satisfy $4<\alpha<12$. The value β satisfies $2<\beta<16$. It is preferable to satisfy $2<\beta<12$. It is more preferable to satisfy $4<\beta<8$. Note that, in the pixel PIX, the difference, between the response speeds in an area A in which a response speed is fast and in an area B in which a response speed is slow, becomes drastically great. When the value α is set to a positive one, the gradation transition of the frame FR(k) is facilitated too much. When the difference of the transmittances between the areas A and B thus becomes great to an unsufferable degree, the value α is set to satisfy $-16<\alpha<0$.

With the arrangement, when it is judged to be an area in which an angular response occurs in a frame FR(k), the second calculation section 46 subtracts the value β from the image data D(i, j, k) of the frame FR(k). As such, a degree of the facilitation of the gradation transition in a next frame FR(k+1) is increased.

Since the gradation transition of the frame FR(k) corresponds to an area in which the angular response occurs, a gradation in the area B (see FIG. 7) in the frame FR(k+1) does not reach a target gradation. In the circumstances, a gradation of the pixel PIX(i, j) dips from its target gradation in a succeeding several frames, if the modulation driving process section 21 outputs correction image data D2(i, j, k) which is appropriate when the gradation in the area B has reached the target gradation.

In contrast, according to the above arrangement, when it is judged in the frame FR(k) to be a gradation transition in an area in which the angular response occurs, (i) the first calculation section 45 adds the value a within the above range to the image data D(i, j, k) of the frame FR(k), and (ii) the second calculation section 46 increases the degree of the facilitation of the gradation transition in the next frame FR(k+1).

Figure 17:
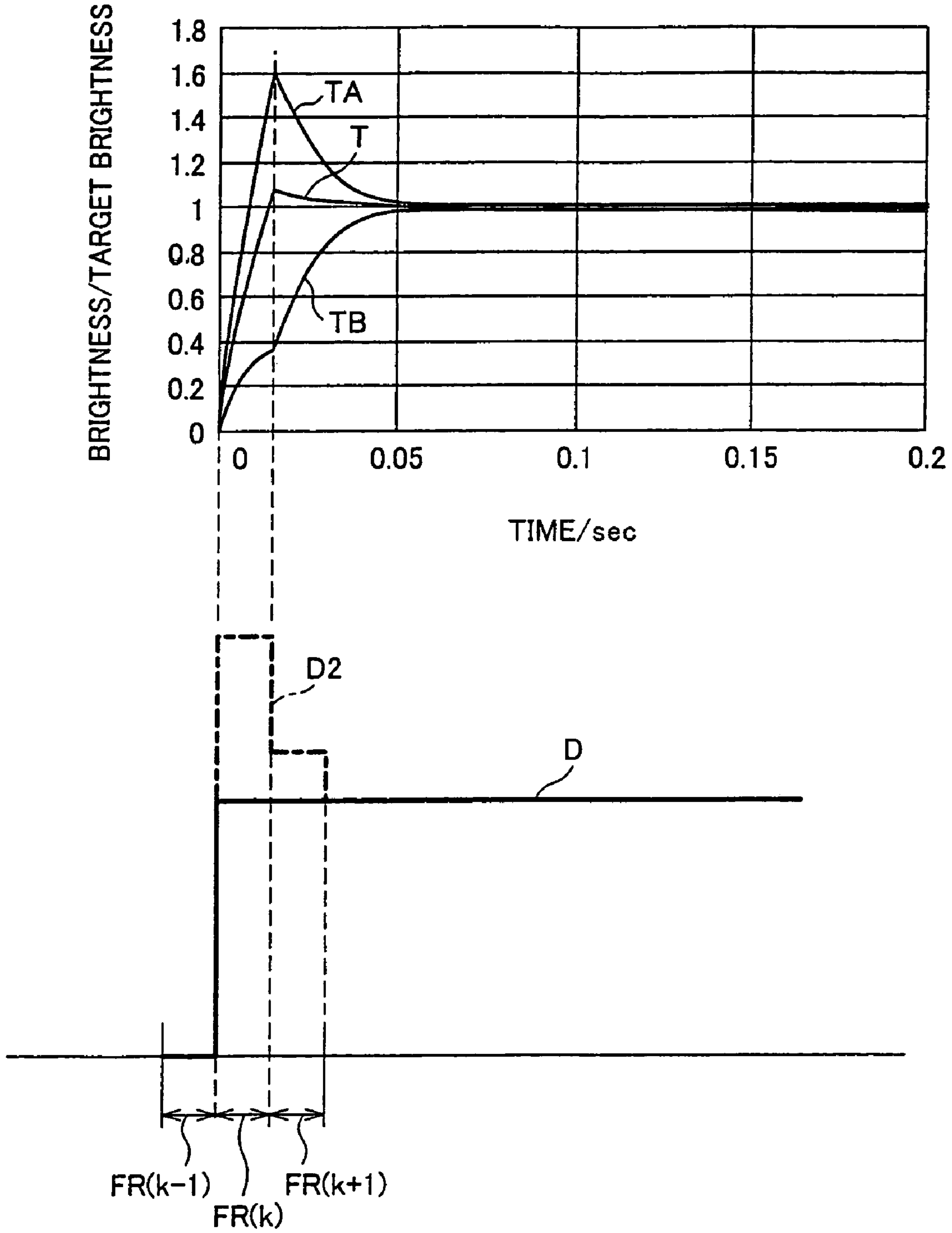
FIG. 17 is a graph showing how the brightness of each of the areas, the brightness of a pixel, and image data for driving the pixel change with time, respectively.

Here, it is assumed that the value α is set to 8-gradation and the value β is set to 6-gradation. When an image signal DAT that causes a gradation transition of the pixel PIX(i, j) from 0 to 96 to occur and then to maintain the gradation of 96 is supplied like FIG. 10, the judgment process section 41 outputs a judgment result F(i, j, k) indicative of true to the first calculation process section 45. On this account, as shown in FIG. 17, (i) 0-gradation is supplied to the modulation process section 32 as image data D(i, j, k−1) of the frame FR(k−1), (ii) 104(=96+α)-gradation is supplied to the modulation process section 32 as image data D(i, j, k) of the frame FR(k). This allows the modulation process section 32 to facilitate the gradation transition from 0-gradation to 104-gradation, as indicated by D2 shown in FIG. 17.

Since the transition from 0-gradation to 104-gradation corresponds to an area in which the angular response occurs, as earlier described, in cases where an adjustment is made to such a degree that a single facilitation of the gradation transition is carried out, as shown in FIG. 10, an angular response occurs so as to be perceived as a black trail by a user of the image display apparatus 1, if the facilitation of the gradation transition is suppressed to such a degree that no excessive brightness occurs.

In contrast, according to the present embodiment, in the frame FR(k+1), the judgment result F(i, j, k) in the frame FR(k) is true. This allows the second calculation section 46 to output 90(=96-β)-gradation as the image data D(i, j, k) of the frame FR(k−1), and allows the modulation process section 32 to facilitate the transition from 90-gradation to 96-gradation.

On this account, in the pixel PIX(i, j), the gradation in an area causing the black trail, i.e., the gradation in the area B in which the response speed is slow is boosted by the facilitation of the gradation transition, and reaches a target gradation (96-gradation) earlier than the arrangement shown in FIG. 10.

Thus, according to the present embodiment, the gradation transition of the frame FR(k) causes the display gradations of the entire pixels PIX (i, j), i.e., the average of the display gradations in the respective areas A and B to be close to the image data D(i, j, k) of the frame FR(k). The gradation transition of the next frame FR(k+1) causes the display gradation in the area B to be boosted to a gradation which the image data D(i, j, k) indicates. On this account, it is possible to avoid that the angular response occurs, although the gradation transition of the frame FR(k) corresponds to an area in which the angular response occurs.

In the above arrangement, the calculation process section 46 adjusts not the correction image data D2(i, j, k) but the image data D(i, j, k−1) of the frame FR(k−1) to be supplied to the modulation process section 32. Therefore, although the calculation process section 46 subtracts the value β, which is set so as to fall within the foregoing range, from the image data D(i, j, k−1), the breadth of the adjustment of the correction image data D2(i, j, k) varies depending on the respective image data D(i, j, k) and D(i, j, k−1). The breadth of the adjustment has nothing to do with the image data D(i, j, k−1) of the frame FR(k−1) and the image data D(i, j, k) of the frame FR(k), respectively. Accordingly, without increasing the circuit size, it is possible to adjust the gradations belonging to the lower gradation. Namely, it is possible to adjust the correction image data D2(i, j, k) greater in the gradations requiring greater corrections than in the gradations requiring smaller corrections.

(Third Embodiment)

The present embodiment deals with an arrangement in which, in cases where a response of the pixel PIX(i, j) is not enough during a gradation transition from a previous frame to a current frame, the angular response countermeasure process section 33 shown in FIG. 1 stops its angular response countermeasure process, even when the gradation transition from the current frame to a desired target frame corresponds to an area in which an angular response occurs.

Figure 18:
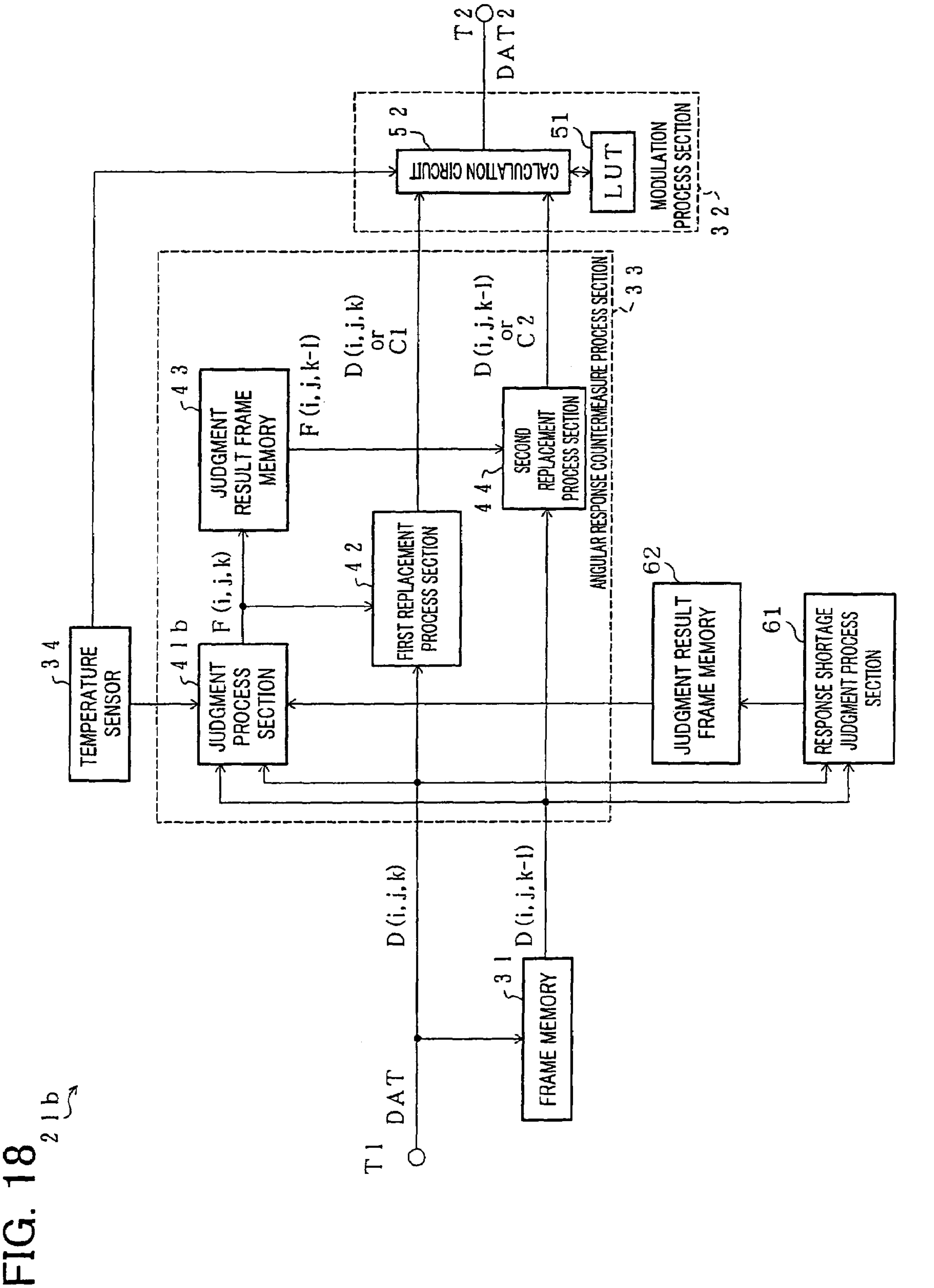
FIG. 18 is a block diagram showing a main part of a modulation driving process section of an image display apparatus.

More specifically, as shown in FIG. 18, in accordance with the present embodiment in addition to arrangement of the modulation driving process section 21 shown in FIG. 1, a modulation driving process section 21*b* in accordance with the present embodiment includes (i) a response shortage judgment process section 61 that compares the image data D(i, j, k−1) of the current frame FR(k−1) with the image data D(i, j, k) of the desired target frame FR(k), and (ii) a judgment result frame memory 62 that stores a judgment result F2(i, j, k) of the response shortage judgment process section 61 till the next frame(k+1). The response shortage judgment process section 61 outputs a judgment result F2(i, j, k) indicative of true, when a combination of the image data D(i, j, k−1) and D(i, j, k) corresponds to a predetermined combination by which the gradation of the pixel PIX(i, j) does not fully come down because of shortage in response of the pixel PIX(i, j) even when facilitating the gradation transition. Otherwise, the response shortage judgment process section 61 outputs a judgment result F2(i, j, k) indicative of false.

Meanwhile, a judgment process section 41*b* (one example of a judgment means) that is provided in place of the judgment process section 41 outputs a judgment result F(i, j, k) indicative of false, when the judgment result F2(i, j, k), of the frame FR(k−1) which has been read out from the judgment result frame memory 62, indicates true. This has nothing to do with whether or not the gradation transition corresponds to an area in which the angular response occurs.

The response shortage judgment process section 61 outputs a judgment result F2(i, j, k) indicative of true, when a gradation level of the image data D(i, j, k) of the frame FR(k) is lower than that of the image data D(i, j, k−1) of the frame FR(k−1), i.e., when a gradation transition (decay) in which the brightness is reduced is facilitated, for example.

During a gradation transition from the previous frame FR(k−2) to the current frame FR(k−1), in cases where the gradation of the pixel PIX(i, j) does not fully come down even when the gradation transition is facilitated, the difference between the response speeds in the areas A and B shown in FIG. 7 is small even when the image data D(i, j, k−1) indicates a gradation which causes a great difference between the response speeds, i.e., even when the image data D(i, j, k−1) indicates a gradation, for example, corresponding to cases where liquid crystal molecules whose alignment direction is not determined remain in the area B shown in FIG. 7. This is because the alignment direction has, in fact, already been determined. This avoids an angular response occuring, even when the gradation transition from a current frame FR(k−1) to a desired target frame FR(k) corresponds to an area in which the angular response occurs.

Meanwhile, when the angular response countermeasure process section 33 carries out the angular response countermeasure process so as to replace the image data D(i, j, k) of the frame FR(k) with the first value C1, the pixel PIX(i, j) is driven so as to reach the first value C1, not the image data D(i, j, k) of the frame FR(k). Accordingly, in cases where the difference between the response speeds is small and no angular response occurs without the angular response countermeasure process carried out by the angular response countermeasure process section 33, it is likely that it will take longer for the pixel PIX(i, j) to reach a target gradation when the angular response countermeasure process section 33 carries out the angular response countermeasure process.

In contrast, according to the present embodiment, during a gradation transition from the previous frame FR(k−2) to the current frame FR(k−1), in cases where the gradation of the pixel PIX(i, j) does not fully come down even when the gradation transition is facilitated, the judgment process section 41*b* outputs a judgment result F(i, j, k) indicative of false, even if the gradation transition from the frame FR(k−1) to the frame FR(k) corresponds to an area in which the angular response occurs. This is because the response shortage judgment process section 61 stores the F2(i, j, k−1) indicative of true in the judgment result frame memory 62 during the frame FR(k−1). Accordingly, the pixel PIX(i, j) is driven so as to reach the image data D(i, j, k) of the frame FR(k), like the case where the gradation transition corresponds to an area outside the area in which the angular response occurs. This ensures to avoid that it takes long for the pixel PIX(i, j) to reach a target gradation because of unnecessary angular response countermeasure process.

The above description deals with the case where the response shortage judgment process section 61 outputs the F2(i, j, k) indicative of true in the case of the decay in which the gradation transition is carried out from the current frame FR(k−1) to the desired target frame FR(k). The present invention is not limited to this, and the similar effects are obtainable, provided that the response shortage judgment process section 61 outputs a judgment result F2(i, j, k) indicative of true, in cases where, during the gradation transition from the current frame FR(k−1) to the desired target frame FR(k), the gradation of the pixel PIX(i, j) does not fully come down because of shortage in response of the pixel PIX(i, j) even when facilitating the gradation transition.

For example, the response shortage judgment process section 61 may output a judgment result F2(i, j, k) indicative of true, in cases where (i) a gradation transition from a current frame FR(k−1) to a desired target frame FR(k) is a decay, and (ii) the difference between image data D(i, j, k−1) and image data D(i, j, k) is not less than a predetermined value.

With the arrangement, even though a gradation transition from a current frame FR(k−1) to a desired target frame FR(k) is a decay, the angular response countermeasure process of the angular response countermeasure process section 33 is blocked, in cases where (i) the difference between the image data D(i, j, k−1) and D(i, j, k) is small, and (ii) it is presumed that the facilitation of the modulation process section 32 with regard to the gradation transition allows the pixel PIX(i, j) to respond at a fully fast speed. This ensures to avoid that it takes long for the pixel PIX(i, j) to reach a target gradation because of unnecessary angular response countermeasure process.

(Fourth Embodiment)

Figure 19:
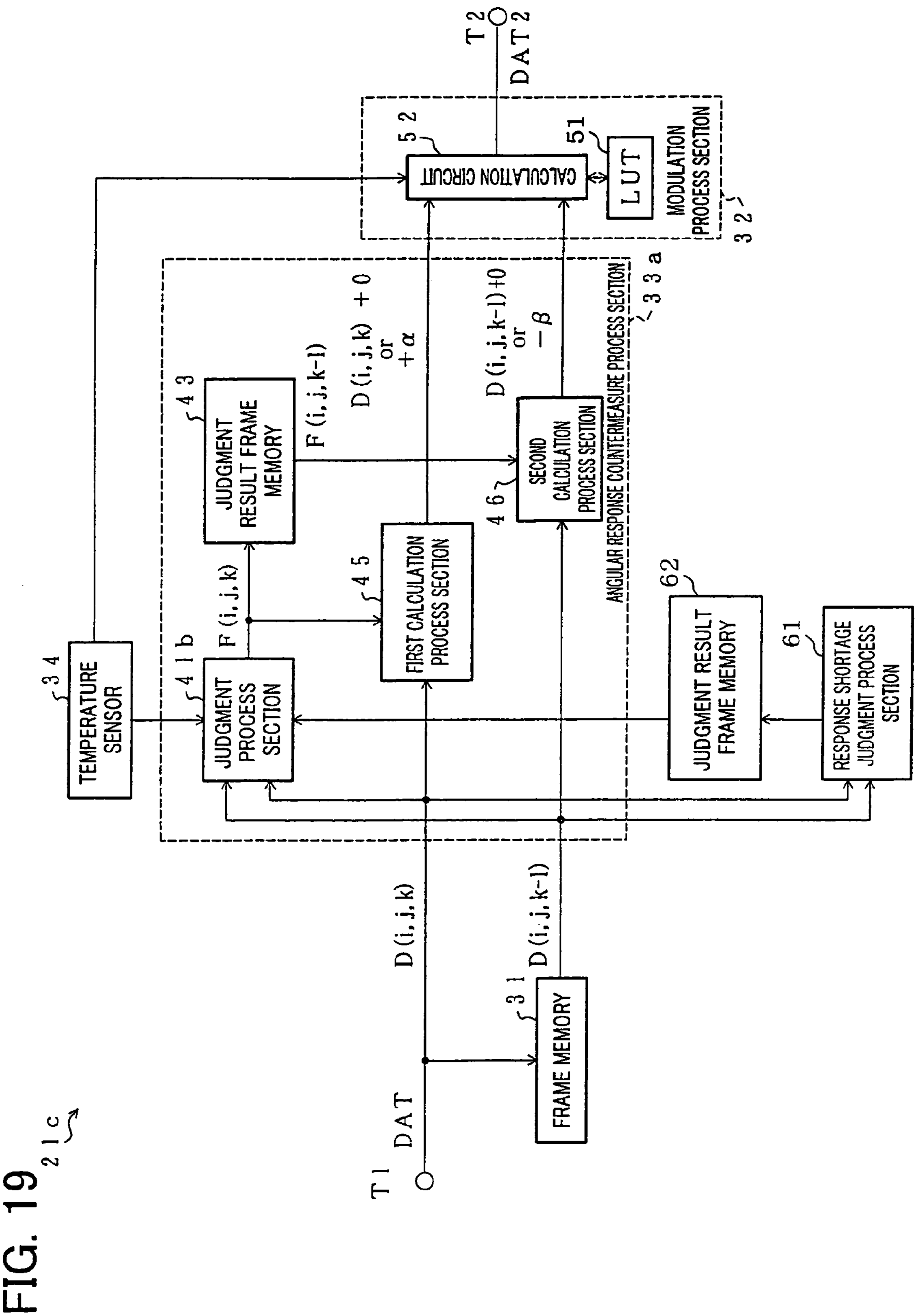
FIG. 19 is a block diagram showing a main part of a modulation driving process section of an image display apparatus.

The present embodiment deals with an arrangement in which the response shortage judgment process section 61 is added to an angular response countermeasure. process section 33*a* described in the second embodiment. More specifically, as shown in FIG. 19, in addition to the arrangement of the modulation driving process section 21*a* shown in FIG. 16, a modulation driving process section 21*c* of the present embodiment includes a response shortage judgment process section 61 and a judgment result frame memory 62 that are similar to those described in the third embodiment. Further, like the third embodiment, a judgment process section 41*b* is provided in place of the judgment process section 41.

Note that, according to the second embodiment, the angular response countermeasure process section 33*a* carries out the angular response countermeasure process so as to reduce the image data D(i, j, k) of the frame FR(k) during the next frame FR(k+1), thereby increasing the degree of the facilitation of the gradation transition. On this account, it is likely that the gradation of the pixel PIX(i, j) goes over a target gradation (the image data D(i, j, k+1)) during the frame FR(k+1), so as to be perceived by the user as an excessive brightness, when carrying out the angular response countermeasure process in spite of no occurrence of an angular response.

In contrast, in the modulation driving process section 21*c*, like the third embodiment, in cases where a response of the pixel PIX(i, j) is not enough during a gradation transition from a previous frame to a current frame, the angular response countermeasure process section 33*a* stops the angular response countermeasure process, even when the gradation transition from the current frame to a desired target frame corresponds to an area in which an angular response occurs. This avoids the unnecessary angular response countermeasure process, thereby avoiding the occurrence of the excessive brightness.

(Fifth Embodiment)

Note that, in the third and fourth embodiments, it is judged whether or not the shortage in response occurs during the gradation transition from the current frame FR(k−1) to the desired target frame FR(k), and then the judgment result is stored till next frame FR(k+1). Based on this storing, it is judged whether or not the shortage in response has occurred during the gradation transition from the previous frame FR(k−2) to the current frame FR(k−1).

In contrast, the present embodiment deals with an arrangement in which (i) the image data D(i, j, k) of the frame FR(k) is stored till the frame (k+2) that is after the next frame (k+1), and (ii) the comparison of the image data D(i, j, k−1) of the frame FR(k−1) and the image data D(i, j, k−2) of the frame FR(k−2) is made so as to judge the occurrence of the shortage in response. The arrangement can be applied to the third and fourth embodiments, respectively. The following description deals with a case in which the arrangement is applied to the third embodiment, for convenience.

Figure 20:
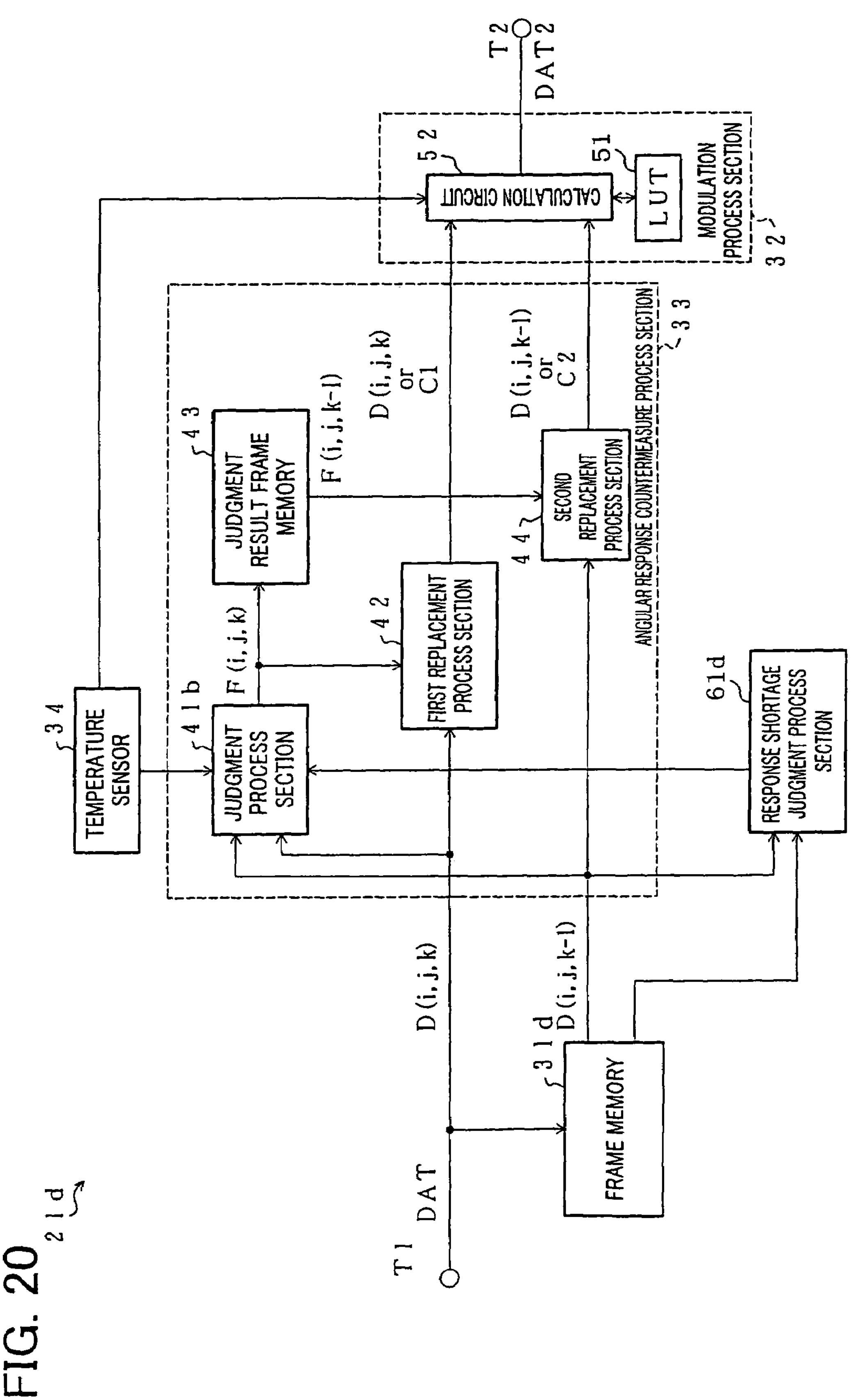
FIG. 20 is a block diagram showing a main part of a modulation driving process section of an image display apparatus.

More specifically, as shown in FIG. 20, a modulation driving process section 21*d* in accordance with the present embodiment has substantially a similar arrangement to the modulation driving process section 21*b* of the third embodiment, except that provided is a frame memory 31*d* that stores the image data D(i, j, k) of the frame FR(k) till the frame FR(k+2) after the next frame FR(k+1), in place of the frame memory 31 that stores the image data D(i, j, k) of the frame FR(k) is stored till the next frame FR(k+1).

Further, in the present embodiment, provided is a response shortage judgment process section 61*d* that compares the image data D(i, j, k−2) of the frame FR(k−2) that has been read out from the frame memory 31*d* with the image data D(i, j, k−1) of the frame FR(k−1), in place of the response shortage judgment process section 61 that compares the image data D(i, j, k−1) of the frame FR(k−1) and the image data D(i, j, k) of the frame FR(k).

The response shortage judgment process section 61*d* outputs a judgment result F2(i, j, k) indicative of true, when a combination of the image data D(i, j, k−2) and D(i, j, k−1) corresponds to a predetermined combination by which the gradation of the pixel PIX(i, j) does not fully come down because of shortage in response of the pixel PIX(i, j) even when facilitating the gradation transition. Otherwise, the response shortage judgment process section 61*d* outputs a judgment result F2(i, j, k) indicative of false.

Further, in the present embodiment, a judgment result frame memory 62 is omitted, and the judgment process section 41*b* outputs a judgment result F(i, j, k) indicative of false irrespective of an area in which the angular response occurs, when the judgment result F2(i, j, k) of the response shortage judgment process section 61*d* indicates true. The response shortage judgment process section 61*d* judges in the same manner as the third embodiment, except that the judgment is made in accordance with the image data D(i, j, k−1) of the frame FR(k−1) and the image data D(i, j, k−2) of the frame FR(k−2). The frame memory 31*d* may (i) reduce the amount of information of the image data D(i, j, k−1) of the frame FR(k−1) to such a degree that the judgment of the response shortage judgment process section 61*d* is carried out without any problem, and then (ii) store the image data D(i, j, k−1) thus reduced till the next frame FR(k+1). As an example, the frame memory 31*d* may store some bits (for example, 6 bits among 8 bits) of the image data D(i, j, k−1) of the frame FR(k−1) until the next frame FR(k+1).

With the arrangement, in cases where it is judged that the shortage in response of the pixel PIX(i, j) has occurred during a gradation transition from the frame FR(k−2) to the frame FR(k−1), the angular response countermeasure process section 33 stops the angular response countermeasure process, even when the gradation transition from the frame FR(k−1) to the frame FR(k) corresponds to an area in which an angular response occurs. Like the third embodiment, this avoids the unnecessary angular response countermeasure process, thereby avoiding that the prolonging of the response time.

Figure 21:
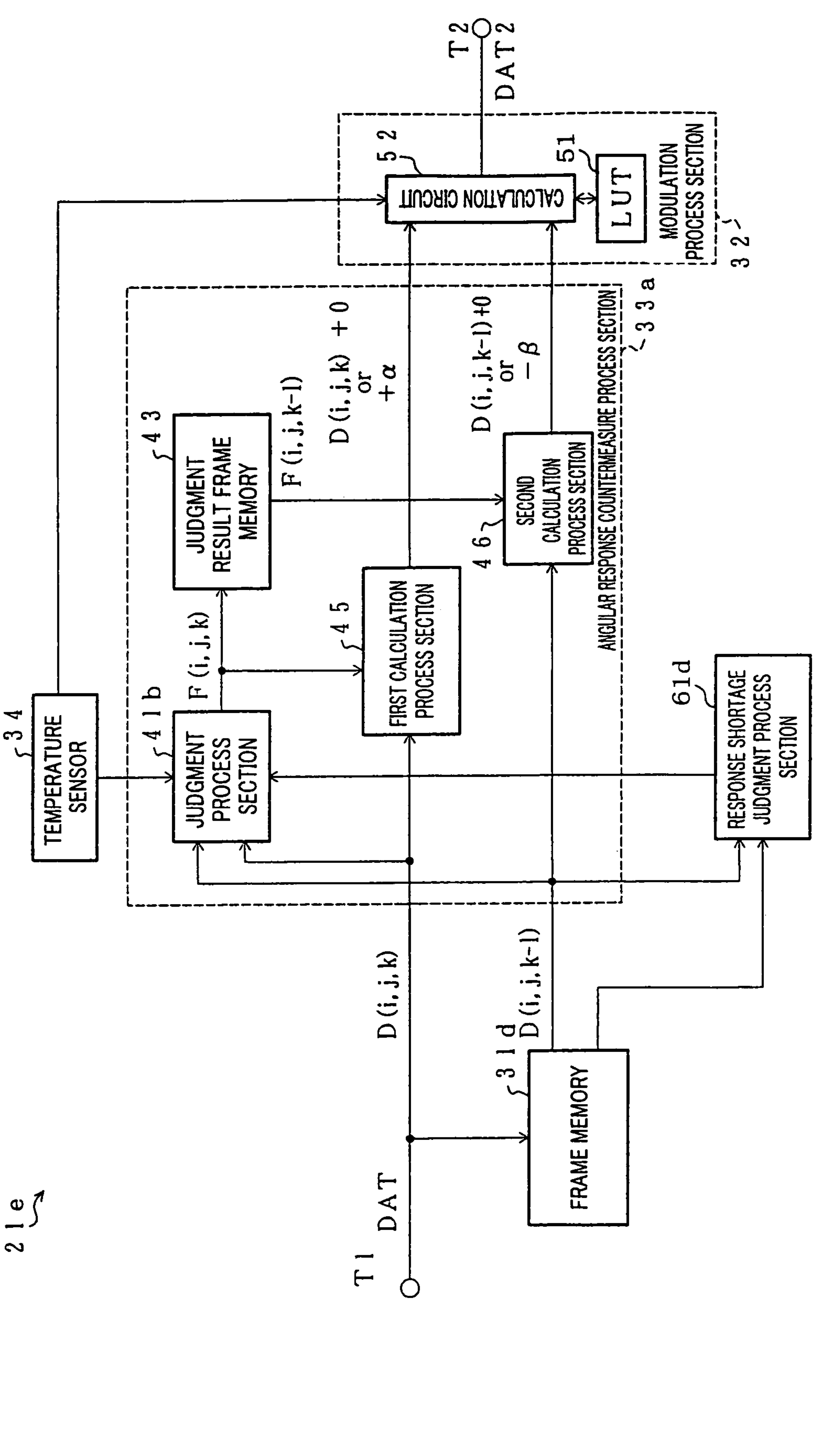
FIG. 21 is a block diagram showing a modified example of the modulation driving process section.

As shown in FIG. 21, according to an arrangement in which the arrangement of the present embodiment is applied to the fourth embodiment, in cases where it is judged that the shortage in response of the pixel PIX(i, j) has occurred during a gradation transition from the frame FR(k−2) to the frame FR(k−1), the angular response countermeasure process section 33*a* stops the angular response countermeasure process, even when the gradation transition from the frame FR(k−1) to the frame FR(k) corresponds to an area in which an angular response occurs. Like the fourth embodiment, this avoids the unnecessary angular response countermeasure process, thereby avoiding the occurrence of the excessive brightness.

Note that the first through fifth embodiments have dealt with the cases where (i) the adjustment process of the facilitation of the gradation transition of the modulation process section 32 and (ii) the judgment process of the judgment process section 41 (41*b*) are carried out in accordance with the panel temperature of the image display apparatus 1, respectively. Alternatively, at least one of the judgment process and the facilitation process of the gradation transition may be fixed to the process for the panel temperature, in cases where (i) the panel temperature changes not so much, and (ii) it is possible to suppress the occurrences of the angular response and the excessive brightness without adjusting the judgment process or the facilitation process of the gradation transition.

(Sixth Embodiment)

Figure 22:
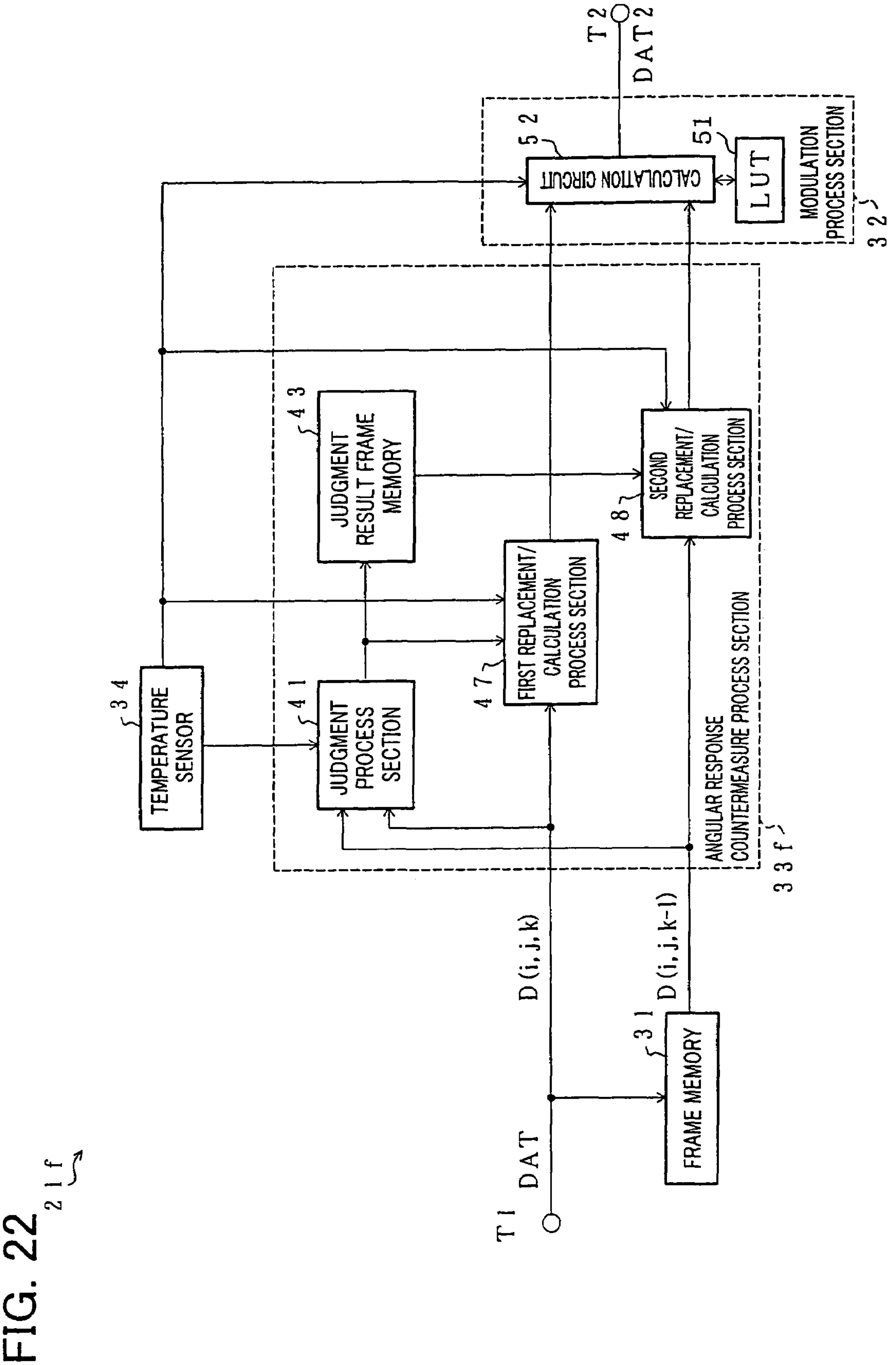
FIG. 22 is a block diagram showing a main part of a modulation driving process section of an image display apparatus.

In a modulation driving process section 21*f* in accordance with the present embodiment, as shown in FIG. 22, in place of the angular response countermeasure process section 33 or 33*a*, provided is an angular response countermeasure process section 33*f* that is switchable and selects one of the functions of the angular response countermeasure process section 33 and 33*a* in accordance with the panel temperature. Note that the arrangement can be applied to the first through fifth embodiments, respectively. The following description deals with a case in which the arrangement is applied to the first embodiment, for convenience.

More specifically, the modulation driving process section 21*f* of the present embodiment has a substantially same arrangement as the modulation driving process section 21, except that first and second replacement/calculation process sections 47 (one example of the first replacement means, first calculation means, adjusting means) and 48 are provided in place of the first and second replacement process sections 42 and 44. The first replacement/calculation process section 47 functions as the first replacement process section 42 when the panel temperature is lower than a predetermined threshold, and functions as the second calculation device 45 when the panel temperature is higher than the predetermined threshold. In like manner, the second replacement/calculation process section 48 (one example of the second replacement means, second calculation means, and adjusting means) functions as the second replacement process section 44 when the panel temperature is lower than a predetermined threshold, whereas functions as the second calculation process section 46 when the panel temperature is higher than the predetermined threshold.

When the gradation transition from the current frame FR(k−1) to the desired target frame FR(k) corresponds to an area in which the angular response occurs, the angular response countermeasure process section 33 facilitates the gradation transition so as to reach not the image data D(i, j, k) of the frame FR(k) but the first value C1. On this account, during the next gradation transition, (i) it is possible to facilitate the gradation such that the angular response and the excessive brightness are both suppressed, and (ii) it is likely that the rising of the brightness of the pixel PIX(i, j) becomes slower as compared with an arrangement having no angular response countermeasure process section 33.

When the gradation transition from the current frame FR(k−1) to the desired target frame FR(k) corresponds to an area in which the angular response occurs, the angular response countermeasure process section 33*a* (i) adds the value a to the image data D(i, j, k) of the frame FR(k) to, and (ii) subtracts the value $\beta$ from the image data D(i, j, k) of the frame FR(k) in the next frame FR(k+1). On this account, during the gradation transition from the frame FR(k−1) to the frame FR(k), the gradation transition is facilitated so as to reach a gradation (the image data D(i, j, k) plus $\alpha$) that corresponds to a target gradation. This allows the rising of the brightness of the pixel PIX(i, j) to become faster, as compared with the case where the angular response countermeasure process section 33 carries out the angular response countermeasure process.

However, it is hard for the values $\alpha$ and $\beta$ to be set to great values within such a range that neither excessive brightness nor angular response occurs regardless of the image data D(i, j, k−1), D(i, j, k), and D(i, j, k+1) of the respective frames FR(k−1), FR(k), and FR(k+1). This causes the following problem when the panel temperature is low, for example: it is likely not to fully suppress the occurrence of the angular response when it is required to greatly facilitate the gradation transition from the frame FR(k) to the frame FR(k+1) so as to suppress the occurrence of the angular response.

In contrast, the angular response countermeasure process section 33*f* of the present embodiment (i) functions as the angular response countermeasure process section 33*a* when the temperature sensor 34 indicates that the panel temperature is not less than the threshold and when the angular response countermeasure process section 33*a* can fully suppress the occurrence of the angular response, and (ii) functions as the angular response countermeasure process section 33 when the panel temperature is less than the threshold and when the angular response countermeasure process section 33*a* can not fully suppress the occurrence of the angular response.

Therefore, it is possible to suppress the occurrences of the excessive brightness and the angular response without reducing the rising speed of the brightness of the pixel PIX(i, j), and it is also possible to suppress the occurrences of the excessive brightness and the angular response even when the panel temperature is lower than the threshold.

The first through sixth embodiments have dealt with one example in which, irrespective of the panel temperature, the angular response countermeasure process section 33 (33*a* and 33*f*) carries out the angular response countermeasure process when the gradation transition from the current frame FR(k−1) to the desired target frame FR(k) corresponds to the area in which the angular response occurs. The present invention is not limited to this.

The angular response countermeasure process section 33 (33*a* and 33*f*) may stop the angular response countermeasure process, when the panel temperature is higher than a predetermined threshold. When the difference between the response speeds in the areas A and B shown in FIG. 7 is small, such a predetermined threshold is set to a threshold which allows the modulation process section 32 to facilitate the gradation transition without any angular response countermeasure process and without the occurrences of the excessive brightness and the angular response. It is possible to avoid the unnecessary angular response process, accordingly.

Each of the foregoing embodiments has dealt with the case where the liquid crystal cell 111 is arranged as shown in FIG. 4 through FIG. 6 and the alignment directions of the liquid crystal molecules in the pixel are divided into four. However, the present invention is not limited to this.

For example, in place of the arrangement in which the pixel electrode 121*a* includes the sequence of the projections 123*a*, the pixel electrode 121*a* may include the slits 123*b*. Further, in place of the arrangement in which the opposed electrode 121*b* includes the slits 123*b*, the opposed electrode 121*b* may include the sequence of the projections 123*a*. In either arrangement, the oblique electric field is formed in the vicinity of the sequence of the projections 123*a* or the slits 123*b* when a voltage is supplied. The liquid crystal molecules in the vicinity of these members (the sequence of the projections 123*a* or the slits 123*b*), i.e., the liquid crystal molecules in the area A align in accordance with the oblique electric field thus formed. In contrast, the alignment direction of the liquid crystal molecules in an area (the area B) that is away from the sequence of the projections 123*a* or the slits 123*b* is determined by the continuity of the liquid crystal, after the alignment direction in the area A is determined. Even when a liquid cell having the above arrangement is adopted as the liquid crystal of the pixel array 2, the effects similar to those of the foregoing respective embodiments can be obtained.

Figure 23:
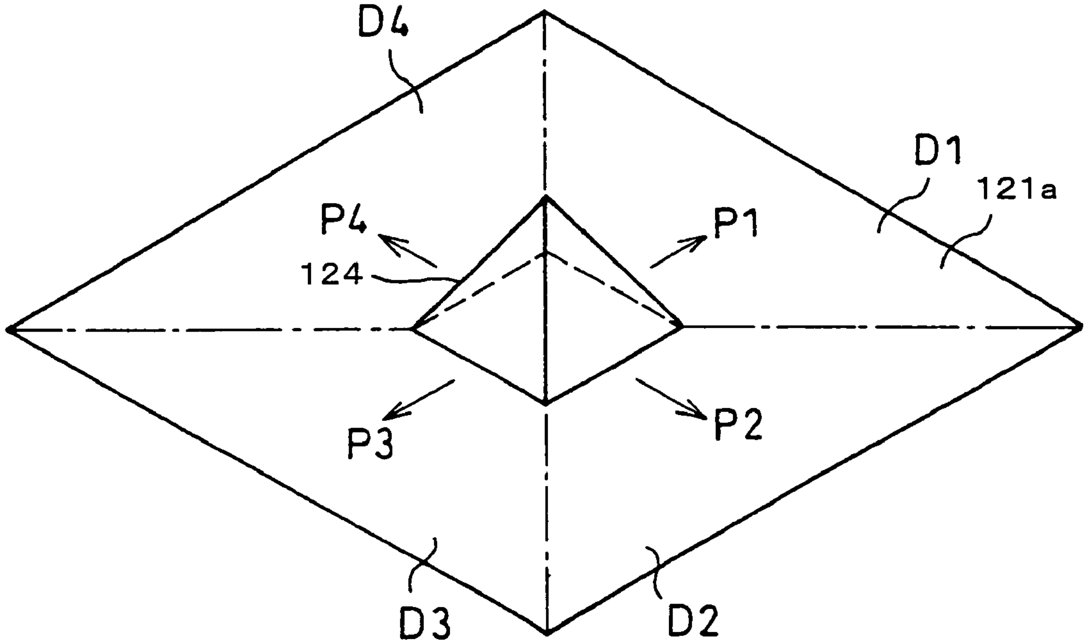
FIG. 23 is a perspective illustration showing a pixel electrode.

In another arrangement in which the liquid crystal adopts a pixel electrode 121*a* shown in FIG. 23, the sequence of the projections 123*a* and the slits 123*b* are omitted, and the pixel electrode 121*a* includes a quadrangular projection 124. Note that the projection 124 can be obtained by applying the photosensitive resin onto the pixel electrode 121*a* and by carrying out a fabricating with use of a photolithography process, like the formation of the sequence of the projections 123*a*.

In the arrangement, in the vicinity of the projection 124, the liquid crystal molecules align so as to be perpendicular to each of the oblique planes of the projection 124. Further, when a voltage is supplied, the electric field of the projection 124 inclines in a direction parallel to the oblique plane of the projection 124. Therefore, when the voltage is supplied, the in-plane components of the alignment angle of the liquid crystal molecule are equal to those (the direction P1, P2, P3, or P4) of the normal line direction of the nearest oblique plane. Thus, the pixel area is divided into four domains D1 through D4 that have different alignment directions during the inclination. The alignment direction of the liquid crystal molecules in the area (in the area B) away from the projection 124 is determined by the continuity of the liquid crystal after the alignment direction of the liquid crystal molecules in the vicinity of the projection 124 (in the area A) is determined.

Because of this, even in the liquid crystal cell having the above arrangement, the difference between the response speeds in the areas A and B becomes larger in a state in which the alignment direction in the area B is not determined, as compared with a case where the alignment direction has already determined. On this account, even when a liquid crystal cell having the above arrangement is adopted as the liquid crystal cell of the pixel array 2, the effects similar to those of the foregoing respective embodiments are obtainable.

Note that the size of each pixel is great as 1-mm-square, when preparing a large-sized liquid crystal television of such as 40-inch, for example. In the circumstances, only the provision of one projection 124 for each pixel electrode 121*a* causes the alignment to be unstable, because the controlling of the alignment weakens. Accordingly, it is preferable to provide a plurality of projections 124 on the respective pixel electrodes 121*a*, in cases where the shortage in the controlling of the alignment occurs, like the above case.

Figure 24:
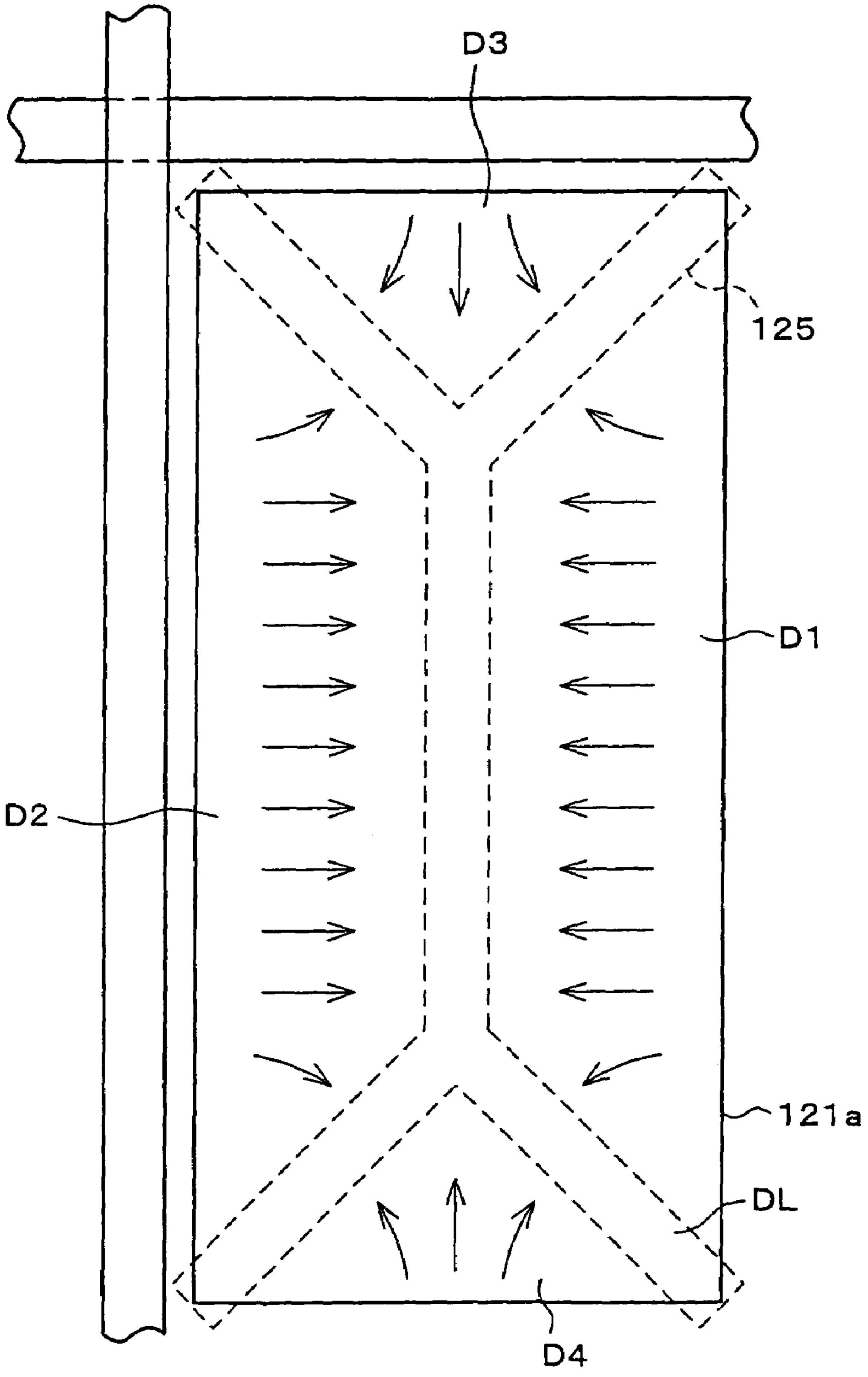
FIG. 24 is a plan view showing the vicinity of a pixel electrode.

Further, for example, as shown in FIG. 24, it is also possible to realize the multiple-domain alignment by providing an alignment control window 125 which is formed by Y-shaped slits, symmetrically interconnected in an up-and-down direction, on the opposed electrode 121*b* of the opposed substrate 111*b*. The up-and-down direction corresponds to a direction parallel to some one of the sides of the pixel electrode 121*a* having substantially an orthogon shape. The alignment control window 125 corresponds to areas in which no electrode is provided.

In the arrangement, in an area, directly underneath the alignment control window 125, of the surface of the opposed substrate 111*b*, no electric field which causes the liquid crystal molecules to incline is generated, even when a voltage is supplied. This allows the liquid crystal molecules to vertically align. In contrast, in an area, around the alignment control window 125, of the surface of the opposed substrate 111*b*, generated is the electric field which extends around the alignment control window 125 as it comes closer to the opposed substrate 111*b*. The liquid crystal molecules incline in such a direction that their major axes are perpendicular to the electric field. This causes the liquid crystal molecules to have in-plane components of the alignment direction that is substantially perpendicular to each of the sides of the alignment control window 125 as indicated by arrows shown in FIG. 24.

The alignment direction of the liquid crystal molecules in the area (in the area B) away from the alignment control window 125 is also determined by the continuity of the liquid crystal after the alignment direction of the liquid crystal molecules in the vicinity of the alignment control window 125 (in the area A) is determined. Because of this, even in the liquid crystal cell having the above arrangement, the difference between the response speeds in the areas A and B becomes larger in a state in which the alignment direction in the area B is not determined, as compared with a case where the alignment direction has already been determined. On this account, even when a liquid crystal cell having the above arrangement is adopted as the liquid crystal cell of the pixel array 2, the effects similar to those of the foregoing respective embodiments are obtainable.

The foregoing description deals with the case where the alignment directions are divided into four. The adoption of a liquid crystal cell 111 having a radial alignment direction (see FIG. 25 and FIG. 26) also brings about the effects similar to those of the foregoing respective embodiments.

Figure 25:
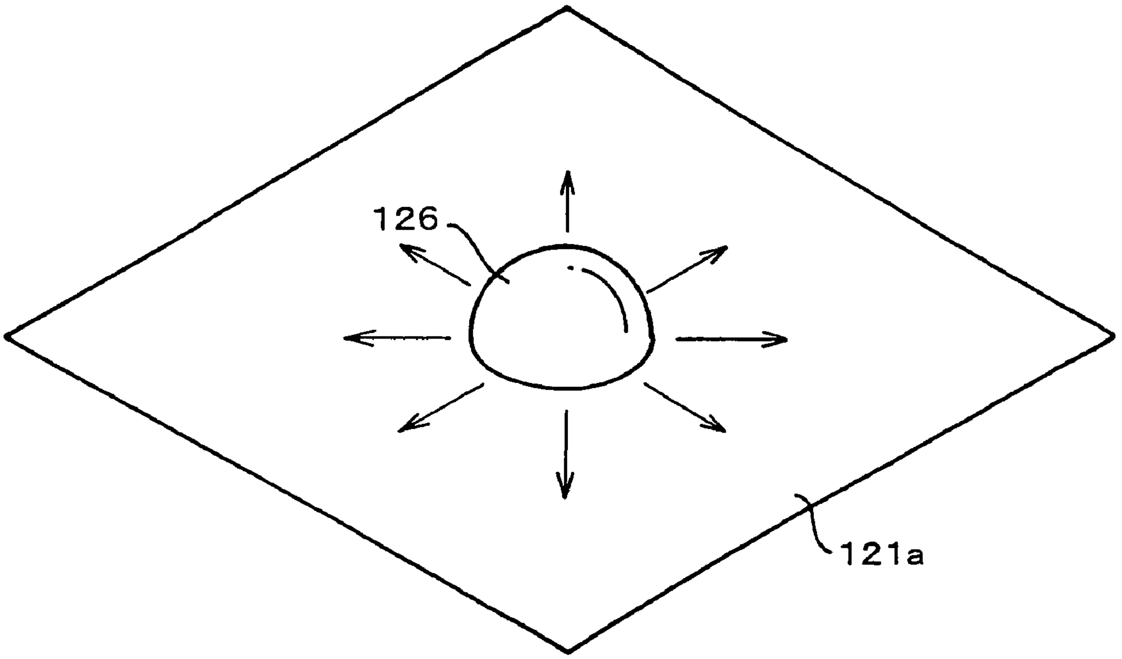
FIG. 25 is a perspective illustration showing a pixel electrode.

More specifically, in the arrangement shown in FIG. 25, substantially a semispherical projection 126 is provided, in place of the projection 24 shown in FIG. 23. In this case, in the vicinity of the projection 126, the liquid crystal molecules align so as to be perpendicular to a surface of the projection 126. Further, when a voltage is supplied, the electric field of the projection 126 inclines so as to be parallel to the surface of the projection 126. On this account, the liquid crystal molecules are easy to radially incline with a central focus on the projection 126, when the liquid crystal molecules incline in response to the voltage supply. This allows the respective liquid crystal molecules of the liquid crystal cell 111 to radially and obliquely align. The projection 126 can also be obtained in accordance with the steps similar to those of the projection 124. Like the projection 124, it is preferable to provide a plurality of projections 126 on the respective pixel electrodes 121*a*, in cases where the shortage in the controlling of the alignment occurs.

With the arrangement, the alignment direction of the liquid crystal molecules in the area (in the area B) away from the projection 126 is also determined by the continuity of the liquid crystal after the alignment direction of the liquid crystal molecules in the vicinity of the projection 126 (in the area A) is determined. On this account, even when a liquid crystal cell having the above arrangement is adopted as the liquid crystal cell of the pixel array 2, the effects similar to those of the foregoing respective embodiments are obtainable.

Figure 26:
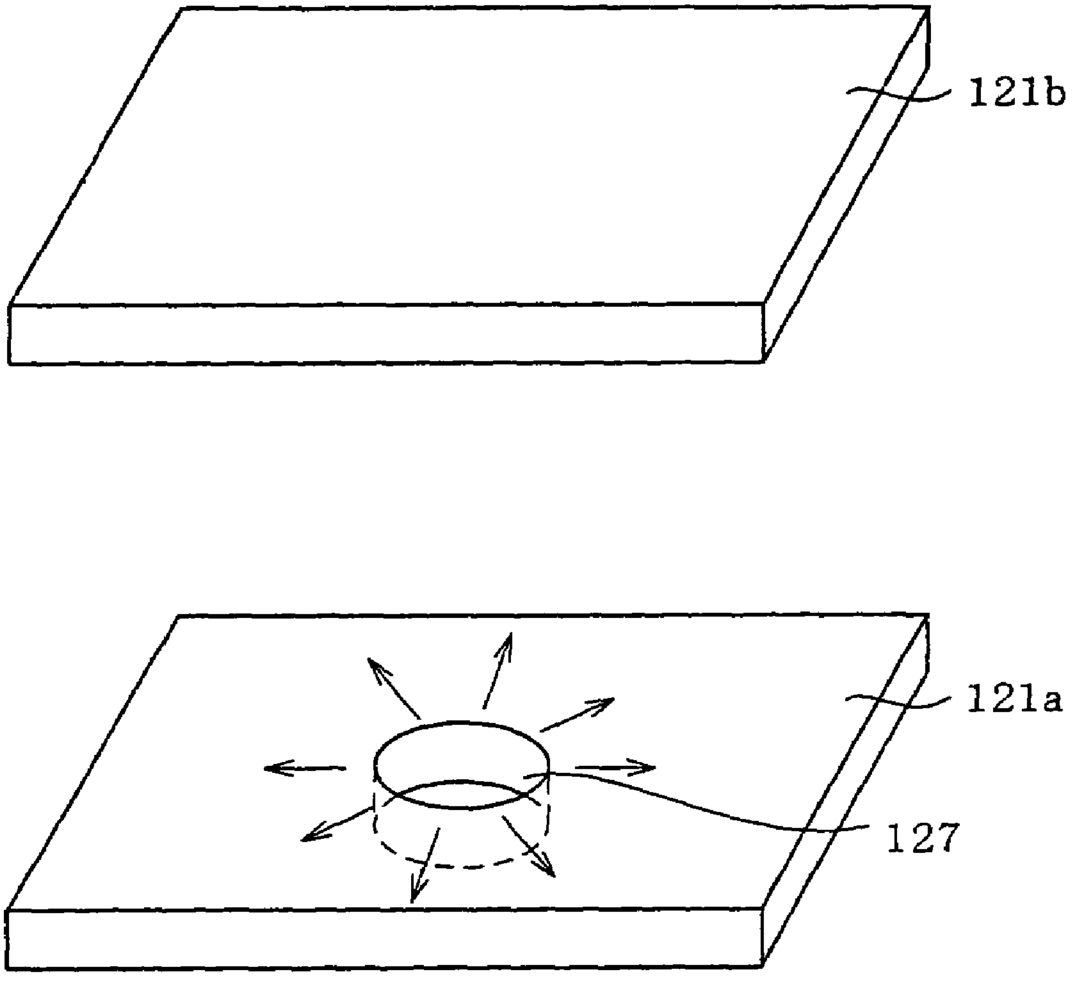
FIG. 26 is a perspective illustration showing a pixel electrode and an opposed electrode, respectively.

In the arrangement shown in FIG. 26, a circular slit 127 is provided in the pixel electrode 121*a*, in place of the projection 124 shown in FIG. 23. On this account, in an area, directly above the circular slit 127, of the surface of the pixel electrode 121*a*, no electric field which causes the liquid crystal molecules to incline is generated in response to the voltage supply. This causes the liquid crystal molecules to vertically align in such an area. In contrast, in an area, in the vicinity of the circular slit 127, of the surface of the pixel electrode 121*a*, generated is the electric field which extends around the slit 127 as it comes closer to the slit 127 in a thickness direction.

The liquid crystal molecules incline in such a direction that their major axes are perpendicular to the electric field. The liquid crystal molecules away from the slit 127 also align in the similar direction because of the continuity of the liquid crystal. Accordingly, when the voltage is supplied to the pixel electrode 121*a*, the respective liquid crystal molecules align such that their in-plane components of the alignment direction are radially extend with a center focus on the slit 127. Namely, the respective liquid crystal molecules align such that the in-plane components of the alignment direction are axisymmetric with respect to the center of the slit 127.

The inclination of the electric field varies depending on the supplied voltage. Accordingly, it is possible to control the components of the normal line direction of the substrate, i.e., to control the tilt angle of the liquid crystal molecules in accordance with the supplied voltage. When the supplied voltage increases, the tilt angle with respect to the normal line direction of the substrate increases, accordingly. This allows the respective liquid crystal molecules to align (i) substantially parallel to the surface of the display screen and (ii) radially in the in-plane. Like the projection 126, it is preferable to provide a plurality of slits 127 on the respective pixel electrodes 121*a*, in cases where the shortage in the controlling of the alignment occurs.

With the arrangement, the alignment direction of the liquid crystal molecules in the area (in the area B) away from the slit 127 is also determined by the continuity of the liquid crystal after the alignment direction of the liquid crystal molecules in the vicinity of the slit 127 (in the area A) is determined. On this account, even when a liquid crystal cell having the above arrangement is adopted as the liquid crystal cell of the pixel array 2, the effects similar to those of the foregoing respective embodiments are obtainable.

Further, in the pixel electrode 121*a*, the area in which no electrode is provided (i.e., the slit) and the area in which the electrode is provided may be replaced with each other. More specifically, in the pixel electrode 121*a* shown in FIG. 27, a plurality of slits 128 are provided such that the centers of the respective silts 128 form the tetragonal lattice, and a solid-core section (hereinafter, referred to as a unit solid-core section) 129 has an elliptical shape. The unit solid-core section 129 is substantially enclosed by four slits 128, each of which is disposed on each of four lattice points that constitute one unit lattice. Each slit 128 has four edges, each of the edges has a quadrant arch. The slit 128 has a starlike outer shape, and has a four-fold axis at its center.

Note that the pixel electrode 121*a* is constituted by a conductive film such as ITO film. For example, after providing the conductive film, the conductive film is removed so as to have the starlike outer shapes, and then the plural slits 128 are formed. The plurality of slits 128 are formed for each pixel electrode 121*a*. In contrast, the solid-core section 129 is basically constituted by a single continuous conductive film.

With the arrangement, the electric field oblique to the surface of the substrate is formed in an area (an edge area) in the vicinity of the boundary between the solid-core section 129 and the slit 128, when a voltage is supplied to the pixel electrode 121*a*. The liquid crystal molecules in the edge area align in accordance with the oblique electric field thus formed. In contrast, the alignment direction of the liquid crystal molecules in an area (the area B) that is away from the edge area is determined by the continuity of the liquid crystal, after the alignment direction in the vicinity of the slit 128 (in the area A) is determined. Even when a liquid cell having the above arrangement is adopted as the liquid crystal of the pixel array 2, the effects similar to those of the foregoing respective embodiments can be obtained.

The above description deals with the arrangement in which the slits 128 are provided such that each center of the slit 128 constitutes the tetragonal lattice. The present invention is not limited to this. The slits 128 may be provided so as to constitute a lattice of other shape such as a rectangular shape. The above description deals with the case where the slit 127 and the solid-core section 129 have substantially a circular shape. The present invention is not limited to this. They may have another shape, including but not limited to an elliptical shape, a rectangular shape, etc.

In either arrangement, if a liquid crystal cell satisfies the following (i) and (ii), the similar effects may be obtained: (i) the liquid crystal molecules vertically align when no voltage is supplied, whereas the electric field oblique to the surface of the substrate is formed in the area (the edge area) in the vicinity of the boundary between the area in which the electrode is provided and the area in which no electrode is provided, when the voltage is supplied to the pixel electrode; and (ii) the alignment direction of liquid crystal molecules is determined in accordance with the oblique electric field thus formed.

Figure 27:
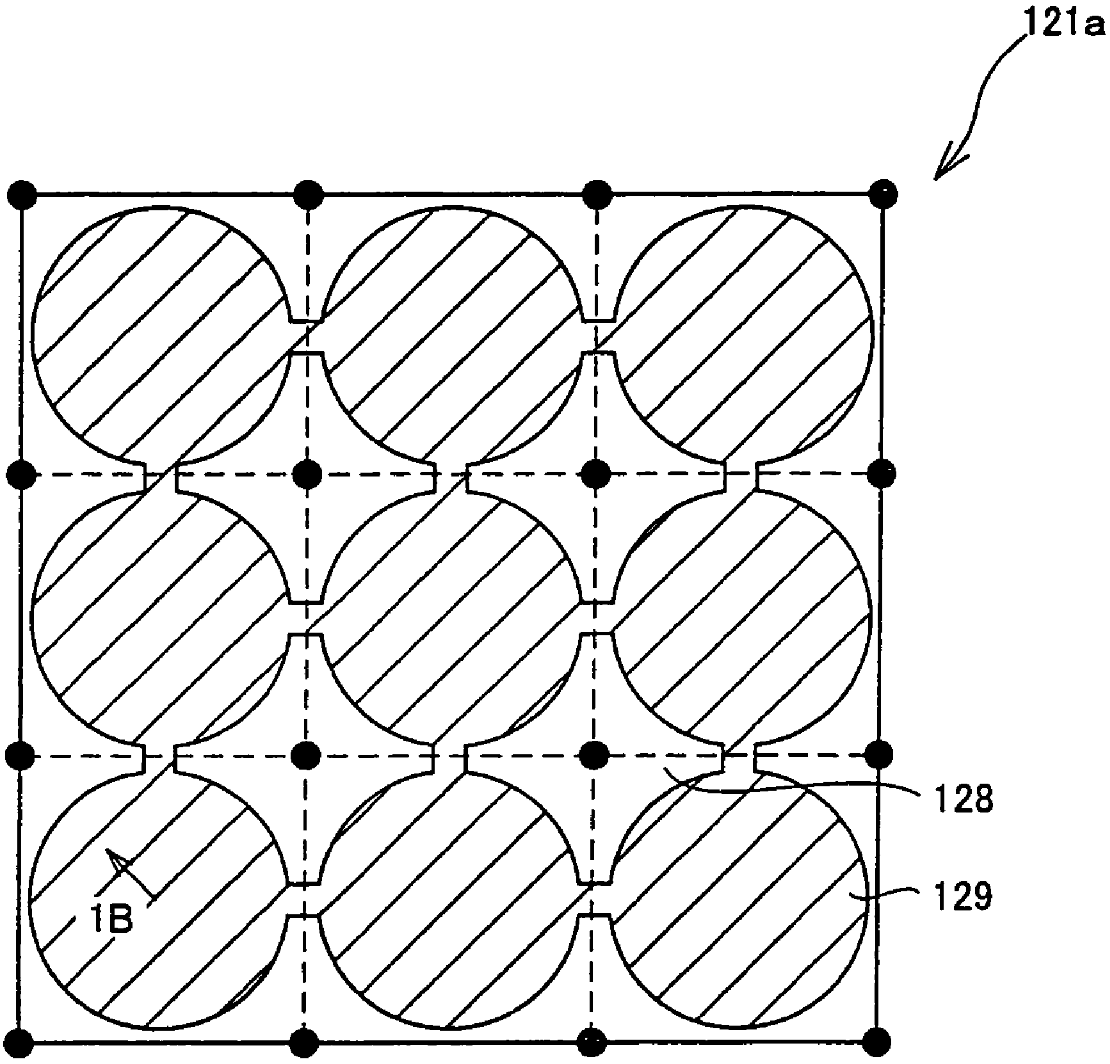
FIG. 27 is a plan view showing a pixel electrode.

Note that, as shown in FIG. 27, when each center of the slit 128 constitutes the tetragonal lattice and the solid-core section 129 has an elliptical shape, it is possible to uniformly disperse the alignment directions of the liquid crystal molecules in the pixel PIX(i, j). This permits the realizing of an image display apparatus 1 having a better viewing angle property.

The foregoing embodiments have dealt with the case where each member constituting the modulation driving process section is realized by hardware only. However, the present invention is not limited to this. All or one part of the respective members may be realized by a combination of a program for carrying out the foregoing functions and the hardware (computer) for executing the program.

As an example, the modulation driving process section may be realized by an arrangement in which a computer, linked to an image display apparatus, functions as a device driver that is used during the driving of the image display apparatus. When (i) the modulation driving process section is realized as a conversion substrate that is embedded in or externally attached, and (ii) the operation of a circuit that realizes the modulation driving process section can be changed by rewriting the program such as firmware, the circuit may be operated as the modulation driving process section of the foregoing embodiments by distributing the software and changing the operation of the circuit.

In these cases, if the hardware that can execute the foregoing functions is prepared, it is possible to realize the modulation driving process section of the present embodiments only by making the hardware execute the program.

The foregoing description has dealt with the liquid crystal display apparatus in which the liquid crystal cell of vertically aligned mode is driven in the normally black mode. The present invention is not limited to this. In cases of a liquid crystal display apparatus in which areas whose response speeds are different from each other coexist, substantially the similar effects are obtainable by setting the gradation transition that causes the deterioration of the display quality to occur because of the difference between the response speeds to the gradation transition (the first combination) corresponding to the area in which the angular response occurs.

As has been earlier described, a driving method of a liquid crystal display apparatus, in accordance with at least one embodiment of the present invention, in which a liquid crystal cell of vertically aligned mode is driven in a normally black mode, is characterized by comprising the step of (a) correcting a desired target gradation so as to facilitate a gradation transition from a current gradation to the desired target gradation, said method further comprising the steps of: (b) judging whether or not a combination of the current gradation and the desired target gradation corresponds to a predetermined first combination which causes (i) a time required for a gradation in a second area of a pixel to reach a second target gradation to become not less than a predetermined second tolerance, when facilitating the gradation transition to such a degree that a gradation in a first area of the pixel does not exceed a predetermined first tolerance indicative of a first target gradation, and (ii) the gradation in the second area of the pixel to exceed the first tolerance, when facilitating the gradation transition to such a degree that a time required for the gradation in the first area of the pixel to reach the first target gradation becomes less than the second tolerance; (c) replacing the desired target gradation with a predetermined first gradation prior to the step (a) such that a combination of the desired target gradation and a next gradation does not correspond to the first combination irrespective of the next gradation, when the combination of the current gradation and the desired target gradation corresponds to the first combination; and (d) replacing the current gradation with a predetermined second gradation to be reached by a current gradation transition, prior to the step (a), when a combination of the current gradation and a previous gradation corresponds to the first combination.

Here, in the liquid crystal cell of vertically aligned mode, the liquid crystal molecules align almost vertically to the substrate substantially when no voltage is supplied. In the liquid crystal cell, the electric field oblique to the surface of the substrate is generated in response to the voltage supplied to the pixel electrode. The oblique electric field causes the liquid crystal molecules, in the area (referred to as the first region) in the vicinity of the pixel electrode generating the oblique electric field, to obliquely align at an angle that varies depending on the supplied voltage. The liquid crystal molecules in the area (referred to as the second region) away from the pixel electrode obliquely align at the same angle because of the continuity of the liquid crystal.

In the liquid crystal cell, the alignment direction of the liquid crystal molecules in the second region is determined by the continuity of the liquid crystal. This causes the response speed in the second region to have a tendency of being slower than the first region. In particular, when (i) the alignment direction (in-plane components of the alignment direction that are parallel to the substrate) of the liquid crystal molecules in the second area is not determined and (ii) both of the alignment direction and the tilt angle are determined by the continuity of the liquid crystal, the difference between the response speeds in the respective areas becomes drastically great as compared with the case where the alignment direction has already been determined and only the tilt angle should be determined.

In this case, in the correcting step, the gradation in the second area of the pixel exceeds the first tolerance, when facilitating the gradation transition to such a degree that a time required for the gradation in the first area of the pixel to reach the first target gradation becomes less than the second tolerance, thereby causing the user to perceive this as the excessive brightness. Meanwhile, when facilitating the gradation, in the area of the pixel in which the response speed is fast, to such a degree that a gradation in the first area of the pixel does not exceed the first tolerance indicative of the second target gradation, the following phenomenon occurs. Namely, the time required for the gradation in the second area of the pixel to reach the first target gradation to become not less than the second tolerance.

Hereinafter, this kind of phenomenon is referred to as angular response. In this case, the gradation in the area of the pixel in which the response speed is fast is reduced to the desired target gradation after the facilitation of the gradation transition. On this account, the gradations of the entire pixels are reduced, so as to be perceived as the black trail by the user of the liquid crystal display apparatus.

In other words, when a combination of the current gradation and the desired target gradation corresponds to the first combination, the excessive brightness or the black trail occurs no matter how the degree of the facilitation of the gradation transition may be set.

In contrast, according to the driving method of the liquid crystal display apparatus having the foregoing arrangement, when it is judged that the combination of the current gradation and the desired target gradation corresponds to the first combination, the desired target gradation is replaced with the first gradation prior to the desired target correcting step (the first correcting step), and the current gradation is replaced with the second gradation prior to the next correcting step (the second correcting step).

Since the first gradation is predetermined such that the combination of the desired target gradation and the next gradation does not correspond to the first combination irrespective of the next gradation, it is possible to set the facilitation of the gradation transition in the second correcting step to such a degree that both the excessive brightness and the angular response do not occur. As such, although the combination of the desired target gradation and the next gradation corresponds to the first combination, it is possible to reach the desired gradation until the gradation after next is specified, i.e., by the first and second gradation transitions.

As a result, in an arrangement in which it is intended to carry out a gradation transition to a desired gradation via a single facilitation of the gradation transition although the combination of the current gradation and the desired target gradation corresponds to the first combination, it is possible to more suppress the degree of the occurrence of the excessive brightness, as compared with a case where the occurrence of the black trail is avoided by setting the facilitation of the gradation transition to such a degree as to obtain the same response time as that of the present invention. This ensures the realizing of a liquid crystal display apparatus having a higher display quality.

By the way, like the case where the first and second replacing steps are not included, the gradation transition may be facilitated in the correcting step. However, when (i) the degree, to which the gradation transition is facilitated in the second correcting step, is more appropriately set, and (ii) it is required for the second correcting step to cause reaching a target gradation more accurately, an arrangement may be added to the above arrangement. According to such an arrangement, the second gradation is set to be equal to the first gradation, and in the step (a), the gradation transition is facilitated such that a gradation, in an area which has a slowest response speed among response speeds in respective areas in the pixel, reaches the first gradation, when carrying out a gradation transition to the first gradation.

With the arrangement, when it is instructed to carry out the gradation transition to the first gradation, the gradation transition is facilitated such that the gradation, in the area which has the slowest response speed among the response speeds in the respective areas in the pixel, reaches the first gradation. Accordingly, at the time when the second correcting step is carried out, the alignment direction of the liquid crystal molecules has already been determined in the above-described second region (the area in which the response speed is slow). As a result, the second correcting step gives rise to getting to the target gradation more accurately.

During the gradation transition to the first gradation, because the gradation transition is facilitated such that the gradation, in the area which has the slowest response speed among the response speeds in the respective areas in the pixel, reaches the first gradation, the following result will be obtained in terms of the entire pixels. More specifically, even when an actually reached gradation exceeds the first gradation, a gradation that has not been subject to the replacement in the first replacing step or a gradation that has not been subject to the calculation in the first calculating step (later described) will never exceed the actually reached gradation, in most of the first combinations (combinations in which the desired target gradation do not correspond to the first gradation). Therefore, such a gradation will not be perceived as an excessive brightness.

Further, an arrangement may be added to the foregoing arrangement. In such an arrangement, the liquid crystal cell can carry out a 256-gradation display, and the first gradation is set to 32-gradation, when a greater gradation is required as brightness is higher.

With the arrangement, because the first gradation is set to 32-gradation, it is possible to shorten the time required for the pixel to reach the target gradation without the occurrence of the excessive brightness, in the liquid crystal cell which can carry out a 256-gradation display.

Another driving method of a liquid crystal display apparatus in accordance with an embodiment of the present invention, in place of the first and second replacing steps, may be arranged so as to further comprising the steps of adding a predetermined first value to the desired target gradation prior to the correcting step, when the combination of the current gradation and the desired target gradation corresponds to the first combination; and subtracting a predetermined second value from the current gradation, prior to the correcting step, when a combination of the current gradation and a previous gradation corresponds to the first combination.

In the case where the gradation transition from the previous gradation to the current gradation corresponds to the first combination, the angular response occurs when trying to facilitate the gradation transition from the previous gradation to the current gradation. On this account, it takes long for the brightness of the pixel to reach the target brightness.

In contrast, according to the above arrangement, when it is judged that the gradation transition from the previous gradation to the current gradation corresponds to the first combination, the second value is subtracted from the current gradation, prior to the correcting step, in the second calculating step. Accordingly, the gradation transition from the current gradation to the desired target gradation is facilitated more drastically as compared with the case where the second calculating step is not carried out, thereby ensuring to shorten the time for the pixel to reach the target gradation.

As a result, in an arrangement in which it is intended to carry out a gradation transition to a desired gradation via a single facilitation of the gradation transition although the combination of the current gradation and the desired target gradation corresponds to the first combination, it is possible to more suppress the degree of the occurrence of the excessive brightness, as compared with a case where the occurrence of the black trail is avoided by setting the facilitation of the gradation transition to such a degree as to obtain the same response time as that of an embodiment of the present invention. As such, a liquid crystal display apparatus having a higher display quality is realized.

Further, the second calculating step is carried out prior to the correcting step. On this account, although the second value is subtracted from the current gradation irrespective of the current gradation and the desired target gradation that have not been subject to the second calculating step, the degree to which the gradation transition is facilitated varies depending on the above both gradations that have not been subject to the second calculating step. Accordingly, it is possible to facilitate the lower gradations, i.e., to facilitate the gradation transition in which the response speed is slow and a greater correction is required, without increasing the circuit size or the calculation amount, for carrying out the second calculating step.

In addition to the arrangement, the liquid crystal cell may be arranged such that the liquid crystal cell can carry out a 256-gradation display, and when a greater gradation is required as brightness is higher, (i) the first value is set to be not less than −16-gradation and not more than +16-gradation, and (ii) the second value is set to be not less than 2-gradation and not more than 16-gradation.

With the arrangement, because the first and second values are set to the above ones, respectively, it is possible to shorten the time for the pixel to reach the target gradation without the occurrence of the excessive brightness, in the liquid crystal cell that can carry out the 256-gradation display.

In addition to the arrangement, the liquid crystal cell may be arranged such that the liquid crystal cell can carry out a 256-gradation display, and when a greater gradation is required as brightness is higher, (i) the first value is set to be not less than 2-gradation and not more than 16-gradation, and (ii) the second value is set to be not less than 2-gradation and not more than 12-gradation.

With the arrangement, because the first and second value are set to the above ones, respectively, it is possible to further shorten the time for the pixel to reach the target gradation without the occurrence of the excessive brightness, in the liquid crystal cell that can carry out the 256-gradation display.

By the way, irrespective of including the first and second replacing steps or including the first and second calculating steps, in addition to the arrangement, it may be arranged such that, in the judging step, it is judged to be the first combination, when (i) the current gradation is smaller than a predetermined threshold, (ii) the desired target gradation falls within a predetermined range, and (iii) the desired target gradation has greater brightness than the current gradation.

With the arrangement, it is possible to reduce the circuit size or the calculation amount for carrying out the judging step, because it is judged whether or not the combination of the current gradation and the desired target gradation corresponds to the first combination only by comparing the current gradation with the threshold and judging whether or not the desired target gradation falls within the above range.

In addition to the arrangement, the threshold and the range may be changed in accordance with a panel temperature of the liquid crystal cell. With the arrangement, even when the response speed of the pixel changes in response to the panel temperature, it is possible to change the threshold and the range into those suitable for the current panel temperature in accordance with the panel temperature. This ensures more appropriately to judge whether or not the combination corresponds to the first combination.

Accordingly, it is possible to avoid the occurrence of the excessive brightness or the occurrence of the reduction in the rising speed of the brightness of the pixel because of the misjudging. As such, a liquid crystal display apparatus having a high display quality is realized.

Further, in addition to the arrangement, the liquid crystal cell may be arranged such that the liquid crystal cell can carry out a 256-gradation display, the threshold is set to 32-gradation when a greater gradation is required as brightness is higher, and the range falls within a range of not less than 32-gradation and less than 160-gradation.

With the arrangement, because the threshold and the range are set to the above ones, it is possible to appropriately judge whether or not the combination of the current gradation and the desired target gradation corresponds to the first combination in the liquid crystal cell that can carry out the 256-gradation display. As such, a liquid crystal display apparatus having a high display quality is realized.

In place of the above settings, the liquid cell may be arranged such that the liquid crystal cell can carry out a 256-gradation display, the threshold is set to 32-gradation when a greater gradation is required as brightness is higher, and the range falls within a range of not less than 16-gradation and less than 96-gradation.

With the arrangement, in the case where the panel temperature is not less than 15 degrees centigrade, it is possible more appropriately to judge whether or not the combination of the current gradation and the desired target gradation corresponds to the first combination in the liquid crystal cell that can carry out the 256-gradation display. Accordingly, it is possible to realize a liquid crystal display apparatus having a higher display quality in cases where the liquid crystal display apparatus is used at an ambient temperature of not less than 15 degrees centigrade.

In addition to the arrangement, the liquid crystal cell may be arranged such that the liquid crystal cell can carry out a 256-gradation display, and in a case where a greater gradation is required as brightness is higher, (i) the threshold is set to 32-gradation and the range is set to fall within a range of not less than 32-gradation and less than 160-gradation, when a panel temperature of the liquid crystal cell is less than 15 degrees centigrade, and (ii) the threshold is set to 32-gradation and the range is set to fall within a range of not less than 16-gradation and less than 96-gradation, when a panel temperature of the liquid crystal cell is not less than 15 degrees centigrade.

With the arrangement, in the liquid crystal cell that can carry out the 256-gradation display, the threshold and the range are adjusted based on whether or not the panel temperature is not less than 15 degrees centigrade. Accordingly, it is possible to avoid the occurrence of the excessive brightness or the occurrence of the reduction in the rising speed of the brightness of the pixel because of the misjudging. As such, a liquid crystal display apparatus having a high display quality is realized.

Further, in addition to the arrangement, it may be arranged such that when a combination of the current gradation and the previous gradation corresponds to a predetermined second combination that causes a shortage in response in spite of facilitating the gradation transition, the steps (c) and (d) are not carried out.

For example, it may be judged to be the second combination when the brightness of the current gradation is smaller than that of the previous gradation. Alternatively, it may be judged to be the second combination, when the brightness of the current gradation is smaller than that of the previous gradation, and when the brightness difference between the both gradations is greater than a predetermined threshold. Alternatively, it may be judged whether or not the combination of the current gradation and the previous gradation corresponds to the second combination based on the previous gradation that has been stored. Alternatively, it may be judged whether or not the combination of the current gradation and the previous gradation corresponds to the second combination based on a judged result of whether or not the combination of the current gradation and the desired target gradation corresponds to the second combination, the judged result being stored untill the next time.

In the case where the gradation transition from the previous gradation to the current gradation corresponds to the combination that causes a shortage in response in spite of facilitating the gradation transition, the actual pixel has a small difference of the response speeds (the alignment direction in the second area has already determined) because of the shortage in the response during the gradation transition from the previous gradation to the current gradation, even when the gradation transition from the current gradation to the desired target gradation corresponds to the first combination. Because of this, when carrying out the first and second replacing steps or the first and second calculating steps, it is likely that the excessive brightness or the reduction in the rising speed of the brightness of the pixel because of the misjudging occurs.

In contrast, according to the arrangement of an embodiment of the present invention, when the gradation transition from the previous gradation to the current gradation corresponds to the combination that causes a shortage in response, like the case where it is judged not to correspond to the first combination in the judging step, the first and second replacing steps or the first and second calculating steps are stopped (are not carried out). This permits avoiding the occurrence of the excessive brightness because of the carrying out of the first and second calculating steps or the occurrence of the reduction in the rising speed of the brightness of the pixel because of the carrying out of the first and second replacing steps. Accordingly, it is possible to realize a liquid crystal display apparatus having a higher display quality.

As has been earlier described, a driving method of a liquid crystal display apparatus, in accordance with an embodiment of the present invention, wherein areas in which response speeds are different from each other coexist, is characterized by comprising the step of (a) correcting a desired target gradation so as to facilitate a gradation transition from a current gradation to the desired target gradation, (b) adjusting corrections in a desired target correcting and a next correcting such that deterioration of display quality due to different response speeds in the respective areas is reduced, when a combination of the current gradation and the desired target gradation corresponds to a first combination that causes the deterioration of the display quality to occur.

In the case where the areas in which response speeds are different from each other coexist in the pixel, when a degree of the facilitation of the gradation transition is set so as to be optimum to one area, such a degree is not optimum to the other areas. Thus, when intending to carry out the gradation transition of the pixel to the desired target gradation based on a single facilitation of the gradation transition, (i) the area in which an excessive brightness occurs comes out in the pixel because the gradation transition is facilitated too much or (ii) a response time increases and a black trail etc. occurs because the gradation transition is not fully facilitated. This causes the display quality to deteriorate.

In contrast, according to the arrangement of an embodiment of the present invention, the corrections in the desired target correcting step and the next correcting step are respectively carried out, when the combination of the current gradation and the desired target gradation corresponds to the predetermined first combination that causes the deterioration of the display quality to occur.

Thus, because the gradation transition of the pixel to the desired target gradation is carried out by the first and second correcting steps, not by a single correcting step. On this account, in an arrangement in which the gradation transition of the pixel to the desired target gradation is intended to be carried out based on a single correcting step even though the combination of the current gradation and the desired target gradation corresponds to the first combination, it is possible to more suppress the degree of the occurrence of the excessive brightness as compared with a case where the occurrence of the black trail is avoided by setting the facilitation of the gradation transition to such a degree as to obtain the same response time as that of the present invention. As such, a liquid crystal display apparatus having a higher display quality is realized.

Further, in addition to the arrangement, in the adjusting step, it may be arranged such that the correction in the desired target correcting is preliminarily carried out such that a transition is carried out to a gradation that (i) causes a gradation, in an area whose response speed is slow, to reach near the desired target gradation in accordance with the correction in the next correcting, and (ii) causes display gradations of the entire pixels not to substantially change.

With the arrangement, the preliminary correction is carried out in the first correcting step such that the gradation transition to the vicinity of the desired target gradation can be achieved in the second correcting step. On this account, in an arrangement in which the gradation transition of the pixel to the desired target gradation is intended to be carried out based on a single correcting step even though the combination of the current gradation and the desired target gradation corresponds to the first combination, it is possible to more suppress the degree of the occurrence of the excessive brightness as compared with a case where the occurrence of the black trail is avoided by setting the facilitation of the gradation transition to such a degree as to obtain the same response time as that of an embodiment of the present invention. As such, a liquid crystal display apparatus having a higher display quality is realized.

In place of the preliminary correction, in the adjusting step, it may be arranged such that the correction in the desired target correcting is carried out such that an average of the respective brightness of the entire pixels reaches near the desired target gradation, and the correction in the next correcting is carried out such that a gradation in an area whose response speed is slow is boosted up to the desired target gradation.

With the arrangement, the gradation transition is facilitated such that, in the first correcting step, the respective brightness of the entire pixels reach near the desired target gradation, and such that, in the second correcting step, the gradation in the area in which the response speed is slow is boosted up to the desired target gradation. On this account, in an arrangement in which the gradation transition of the pixel to the desired target gradation is intended to be carried out based on a single correcting step even though the combination of the current gradation and the desired target gradation corresponds to the first combination, it is possible to more suppress the degree of the occurrence of the excessive brightness as compared with a case where the occurrence of the black trail is avoided by setting the facilitation of the gradation transition to such a degree as to obtain the same response time as that of the present invention. As such, a liquid crystal display apparatus having a higher display quality is realized.

As has been earlier described, a driving apparatus of a liquid crystal display apparatus in which a liquid crystal cell of vertically aligned mode is driven in a normally black mode is characterized by comprising (a) correction means for correcting a desired target gradation so as to facilitate a gradation transition from a current gradation to the desired target gradation, (b) judgment means for judging whether or not a combination of the current gradation and the desired target gradation corresponds to a predetermined first combination which causes (i) a time required for a gradation in a second area of a pixel to reach a second target gradation to become not less than a predetermined second tolerance, when facilitating the gradation transition to such a degree that a gradation in a first area of the pixel does not exceed a predetermined first tolerance indicative of a first target gradation, and (ii) the gradation in the second area of the pixel to exceed the first tolerance, when facilitating the gradation transition to such a degree that a time required for the gradation in the first area of the pixel to reach the first target gradation becomes less than the second tolerance; (c) first replacement means for replacing the desired target gradation with a predetermined first gradation such that a combination of the desired target gradation and a next gradation does not correspond to the first combination irrespective of the next gradation, when the combination of the current gradation and the desired target gradation corresponds to the first combination, and for supplying the first gradation to said correction means; and (d) second replacement means for replacing the current gradation with a predetermined second gradation to be reached by a current gradation transition, when a combination of the current gradation and a previous gradation corresponds to the first combination, the second gradation, and for supplying the second gradation to said correction means.

The driving apparatus of the liquid crystal display apparatus having the above arrangement can drive the liquid crystal cell of the vertically aligned mode in the normally black mode based on the driving method of the liquid crystal display apparatus, the method comprising the foregoing first and second replacing steps. On this account, in an arrangement in which the gradation transition of the pixel to the desired target gradation is intended to be carried out based on a single correcting step even though the combination of the current gradation and the desired target gradation corresponds to the first combination, it is possible to more suppress the degree of the occurrence of the excessive brightness as compared with a case where the occurrence of the black trail is avoided by setting the facilitation of the gradation transition to such a degree as to obtain the same response time as that of the present invention. As such, a liquid crystal display apparatus having a higher display quality is realized.

As has been earlier described, another driving apparatus of a liquid crystal display apparatus is characterized by comprising, in place of the first and second replacement means, first calculation means for adding a predetermined first value to the desired target gradation, when the combination of the current gradation and the desired target gradation corresponds to the first combination, and for supplying an added result to said correction means; and second calculation means for subtracting a predetermined second value from the current gradation, when a combination of the current gradation and a previous gradation corresponds to the first combination, and for supplying a subtracted result to said correction means.

The driving apparatus of the liquid crystal display apparatus having the above arrangement can drive the liquid crystal cell of the vertically aligned mode in the normally black mode based on the driving method of the liquid crystal display apparatus, the method comprising the foregoing first and second replacing steps. On this account, in an arrangement in which the gradation transition of the pixel to the desired target gradation is intended to be carried out based on a single correcting step even though the combination of the current gradation and the desired target gradation corresponds to the first combination, it is possible to more suppress the degree of the occurrence of the excessive brightness as compared with a case where the occurrence of the black trail is avoided by setting the facilitation of the gradation transition to such a degree as to obtain the same response time as that of an embodiment of the present invention. As such, a liquid crystal display apparatus having a higher display quality is realized.

As has been described earlier, a further driving apparatus of a liquid crystal display apparatus, in accordance with an embodiment of the present invention, wherein areas in which response speeds are different from each other coexist, is characterized by comprising correction means for correcting a desired target gradation so as to facilitate a gradation transition from a current gradation to the desired target gradation, and adjustment means for respectively adjusting first and second corrections of said correction means such that deterioration of display quality due to different response speeds in the respective areas is reduced, when a combination of the current gradation and the desired target gradation corresponds to a first combination that causes the deterioration of the display quality to occur, the first and second corrections being consecutively carried out.

In addition to the arrangement, the adjustment means preliminarily may adjust the first correction of the correction means such that a transition is carried out to a gradation that (i) causes a gradation in an area whose response speed is slow to reach near the desired target gradation in accordance with an adjustment of the second correction of said correction means, and (ii) causes display gradations of the entire pixels not to substantially change.

Further, in place of the preliminary adjustment of the adjustment means, the adjustment means may adjust the first correction of the correction means such that an average of the respective brightness of the entire pixels reaches near the desired target gradation, and the adjustment means may adjust the second correction of said correction means such that a gradation in an area whose response speed is slow is boosted up to the desired target gradation.

These driving apparatus of the liquid crystal display apparatus having the above respective arrangements can drive the liquid crystal display apparatus in accordance with the foregoing driving method of the liquid crystal display apparatus, the method including the foregoing adjusting steps. Thus, like these driving methods of the liquid crystal display apparatus, in an arrangement in which the gradation transition of the pixel to the desired target gradation is intended to be carried out based on a single correcting step even though the combination of the current gradation and the desired target gradation corresponds to the first combination, it is possible to more suppress the degree of the occurrence of the excessive brightness as compared with a case where the occurrence of the black trail is avoided by setting the facilitation of the gradation transition to such a degree as to obtain the same response time as that of an embodiment of the present invention. As such, a liquid crystal display apparatus having a higher display quality is realized.

Furthermore, as described above, a liquid crystal television in accordance with the present invention includes any one of the driving apparatuses having the respective arrangements, a liquid crystal display apparatus that is driven by the driving apparatus, and a tuner section. Note that it is possible to realize both of the improvement in the response speed and the prevention of image deterioration, although the driving apparatus drives the liquid crystal display apparatus in which areas whose response speeds are different from each other coexist in the pixel. This allows the liquid crystal television to be suitably used for a movie display (for a display for motion picture). Accordingly, the liquid crystal television can suitably display the television image signal outputted from the tuner section.

A liquid crystal monitor in accordance with the present invention, as described above, includes any one of the driving apparatuses having the respective arrangements, a liquid crystal display apparatus that is driven by the driving apparatus, and a signal processing section. Note that it is possible to realize both of the improvement in the response speed and the prevention of image deterioration, although the driving apparatus drives the liquid crystal display apparatus in which areas whose response speeds are different from each other coexist in the pixel. Accordingly, the liquid crystal monitor can suitably display the monitor image signal.

In addition to the arrangement, the adjustment means switches and selects one of first and second operations in accordance with a panel temperature of a liquid crystal panel of the liquid crystal display apparatus, the first operation causes the adjustment means to preliminarily adjust the second correction of the correction means such that a transition is carried out to a gradation that (i) causes a gradation in an area whose response speed is slow to reach near the desired target gradation in accordance with an adjustment of the first correction of the correction means, and (ii) causes display gradations of the entire pixels not to substantially change, and the second operation causes the adjustment means to adjust the first correction of the correction means such that an average of the respective brightness of the entire pixels reaches near the desired target gradation, and causes the adjustment means to adjust the second correction of the correction means such that a gradation in an area whose response speed is slow is boosted up to the desired target gradation. With the arrangement, it is possible to switch and select one of the first and second operations in accordance with the panel temperature, thereby ensuring to maintain suppressing of the occurrence of the excessive brightness and the angular response, respectively.

A method of driving a liquid crystal display apparatus including a plurality of areas with different response speeds, can include sensing a temperature of at least a portion of the liquid crystal apparatus (using the temperature 34 of FIG. 1 for example); and determining which of a first and second submethod to execute based upon the temperature sensed. The first submethod can include:

determining whether or not a gradation transition from a current frame to a target frame exceeds a gradation transition tolerance, replacing gradation data of the target frame with gradation data of a first gradation value when a gradation transition from the current frame to the target frame is determined to exceed a gradation transition tolerance, the first gradation value enabling at least one of an increase in response speed and a decrease in undesirable brightness, and correcting at least one of the gradation data and data of a first gradation value of the target frame so as to facilitate a gradation transition from the current frame to the target frame. Further, the second submethod can include:

determining whether or not a gradation transition from a current frame to a target frame exceeds a gradation transition tolerance, adding a first value to the gradation data of the target frame when a gradation transition from the current frame to the target frame is determined to exceed a gradation transition tolerance, the first value enabling at least one of an increase in response speed and a decrease in undesirable brightness, and correcting at least one of the gradation data and data of a first gradation value of the target frame so as to facilitate a gradation transition from the current frame to the target frame.

The first submethod can further include replacing gradation data of the current frame with gradation data of a second value upon replacing gradation data of the target frame with gradation data of the first gradation value. Additionally, the second submethod can include subtracting a second value from the current gradation when the first value is added.

A liquid crystal display apparatus including a plurality of areas with different response speeds, can further include a temperature sensor, adapted to sense a temperature of at least a portion of the liquid crystal apparatus; and a device for determining which of a first and second subsystem to utilize based upon the temperature sensed. The first subsystem includes a device for determining whether or not a gradation transition from a current frame to a target frame exceeds a gradation transition tolerance, a device for replacing gradation data of the target frame with gradation data of a first gradation value when a gradation transition from the current frame to the target frame is determined to exceed a gradation transition tolerance, the first gradation value enabling at least one of an increase in response speed and a decrease in undesirable brightness, and a device for correcting at least one of the gradation data and data of a first gradation value of the target frame so as to facilitate a gradation transition from the current frame to the target frame. The second subsystem includes a device for determining whether or not a gradation transition from a current frame to a target frame exceeds a gradation transition tolerance, a device for adding a first value to the gradation data of the target frame when a gradation transition from the current frame to the target frame is determined to exceed a gradation transition tolerance, the first value enabling at least one of an increase in response speed and a decrease in undesirable brightness, and a device for correcting at least one of the gradation data and data of a first gradation value of the target frame so as to facilitate a gradation transition from the current frame to the target frame.

In such an apparatus, the first subsystem can further include a device for replacing gradation data of the current frame with gradation data of a second value upon replacing gradation data of the target frame with gradation data of the first gradation value. The liquid crystal display apparatus further can be of a vertically aligned mode and of a normally black mode. In addition, the second subsystem can include a device for subtracting a second value from the current gradation when the first value is added.

It should be noted that any of the various embodiments of the liquid crystal display apparatus and method expressed above can be used in any number of devices. For example, any of the various embodiments of the liquid crystal display apparatus and method expressed above can be used as a screen for a word processor, a computer, or a television. Thus, a liquid crystal television including any of the aforementioned embodiments of the liquid crystal display apparatus is encompassed within the present application.

By the way, the driving apparatus of the liquid crystal display apparatus may be realized by hardware. However, the present invention is not limited to this. A computer (or any device including a computer or any type of computer device) may execute a program so as to perform any the driving methods claimed. More specifically, a program in accordance with any embodiment of the present invention is adapted to cause the computer to execute the above described respective steps of any respective method. When the program is executed by the computer, the computer can drive the liquid crystal display apparatus based on each of the driving methods of the liquid crystal display apparatus.

A computer signal may embody or include the program. Further, any type of computer readable medium may also embody or include the program. Additionally, such a computer readable medium may be adapted to cause a computer to perform any of the aforementioned methods.

Finally, throughout the embodiments described above, correcting a gradation level of at least one pixel to facilitate a transition from a current gradation level to a target gradation level has been described broadly. This is intended to include various driving techniques, including overshoot driving techniques wherein a driving signal may be corrected, modulated or varied if needed (wherein additional voltage/current may be added, if necessary) to permit display of a desired target gradation value of a pixel, from display of a current gradation value of a pixel. The display may be a display of variable response, such as a liquid crystal display. The driving signal may be corrected, modulated or varied from a desired gradation value to account for inherent delays in the liquid crystal structure, to improve display and to permit a display reflecting the desired gradation value. This is intended to include various overshoot driving techniques where the gradation level is increased from a desired gradation level to facilitate a transition from a current gradation level to a desired gradation level.

On this account, like the driving methods, in an arrangement in which the gradation transition of the pixel to the desired target gradation is intended to be carried out based on a single correcting step even though the combination of the current gradation and the desired target gradation corresponds to the first combination, it is possible to more suppress the degree of the occurrence of the excessive brightness as compared with a case where the occurrence of the black trail is avoided by setting the facilitation of the gradation transition to such a degree as to obtain the same response time as that of an embodiment of the present invention. As such, a liquid crystal display apparatus having a higher display quality is realized.

As examples of various modulation processing devices and overall modulation configurations to which the embodiments of the present invention apply, reference is made to co-pending and commonly assigned U.S. patent application Ser. No. 10/679,477, by Shiomi et al., filed Oct. 7, 2003 and entitled "METHOD OF DRIVING A DISPLAY, DISPLAY, AND COMPUTER PROGRAM FOR THE SAME; co-pending and commonly assigned U.S. patent application Ser. No. 10/743,767 by Shiomi et al., filed on even date with the present application and entitled "METHOD OF DRIVING A DISPLAY, DISPLAY, AND COMPUTER PROGRAM THERFOR. The entire contents of each of the above commonly assigned applications are hereby incorporated by reference herein.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A driving method of a liquid crystal display apparatus including a liquid crystal cell of vertically aligned mode driven in a normally black mode, said method comprising:

(a) correcting a desired target gradation so as to facilitate a gradation transition from a current gradation to the desired target gradation;

(b) judging whether or not a combination of the current gradation and the desired target gradation corresponds to a predetermined first combination which causes a time required for a gradation in a second area of a pixel to reach a second target gradation to become not less than a predetermined second tolerance, when facilitating the gradation transition to such a degree that a gradation in a first area of the pixel does not exceed a predetermined first tolerance indicative of a first target gradation, and which causes the gradation in the second area of the pixel to exceed the first tolerance, when facilitating the gradation transition to such a degree that a time required for the gradation in the first area of the pixel to reach the first target gradation becomes less than the second tolerance;

(c) adding a predetermined first value to the desired target gradation prior to the step (a), when the combination of the current gradation and the desired target gradation corresponds to the first combination; and (d) subtracting a predetermined second value from the current gradation, prior to the step (a), when a combination of the current gradation and a previous gradation corresponds to the first combination.

2. The driving method as set forth in claim 1, wherein: the liquid crystal cell is for a 256-gradation display, and when a greater gradation is required as brightness is relatively higher, the first value is set to be not less than −16-gradation and not more than +16-gradation, and the second value is set to be not less than 2-gradation and not more than 16-gradation.

3. The driving method as set forth in claim 1, wherein: the liquid crystal cell is for a 256-gradation display, and when a greater gradation is required as brightness is higher, the first value is set to be not less than 2-gradation and not more than 16-gradation, and the second value is set to be not less than 2-gradation and not more than 12-gradation.

4. The driving method as set forth in claim 1, wherein:

in the step (b), it is judged to be the first combination, when the current gradation is relatively smaller than a predetermined threshold, the desired target gradation falls within a predetermined range, and the desired target gradation has a relatively greater brightness than the current gradation.

5. The driving method as set forth in claim 1, wherein:

when a combination of the current gradation and the previous gradation corresponds to a predetermined second combination that causes a shortage in response in spite of facilitating the gradation transition, the steps (c) and (d) are not carried out.

6. A computer readable medium having a program stored thereon, the program, when run on a computer, adapted to cause the computer to execute the method of claim 1.

* * * * *